United States Patent
Gomez

(10) Patent No.: US 12,397,438 B2
(45) Date of Patent: Aug. 26, 2025

(54) BEHAVIOR CONTROL DEVICE, BEHAVIOR CONTROL METHOD, AND PROGRAM

(71) Applicant: HONDA MOTOR CO., LTD., Tokyo (JP)

(72) Inventor: Randy Gomez, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 17/923,921

(22) PCT Filed: Jun. 22, 2021

(86) PCT No.: PCT/JP2021/023545
§ 371 (c)(1),
(2) Date: Nov. 8, 2022

(87) PCT Pub. No.: WO2021/261474
PCT Pub. Date: Dec. 30, 2021

(65) Prior Publication Data
US 2023/0173683 A1   Jun. 8, 2023

(30) Foreign Application Priority Data

Jun. 24, 2020 (JP) ................................ 2020-108946
Jul. 16, 2020 (JP) ................................ 2020-122009
Aug. 5, 2020 (JP) ................................ 2020-132962

(51) Int. Cl.
*G10L 25/51* (2013.01)
*B25J 11/00* (2006.01)
(Continued)

(52) U.S. Cl.
CPC ........... *B25J 11/001* (2013.01); *G05B 13/027* (2013.01); *G06N 3/09* (2023.01); *G06N 3/092* (2023.01);
(Continued)

(58) Field of Classification Search
CPC .......... G10L 15/20; G10L 15/22; G10L 25/51
See application file for complete search history.

(56) References Cited

U.S. PATENT DOCUMENTS 10,402,501 B2 * 9/2019 Wang ...................... G10L 15/22
10,977,452 B2 * 4/2021 Wang .................. G10L 15/1822
(Continued)

FOREIGN PATENT DOCUMENTS

| JP | 2007-125645 | 5/2007 |
|---|---|---|
| JP | 2013-225192 | 10/2013 |

(Continued)

OTHER PUBLICATIONS

Extended European Search Report for European Patent Application No. 21829758.8 dated Feb. 5, 2024.
(Continued)

*Primary Examiner* — Vijay B Chawan
(74) *Attorney, Agent, or Firm* — Amin, Turocy & Watson, LLP

(57) ABSTRACT

A social ability generation device includes a perception unit that acquires person information on a person, extracts feature information on the person from the acquired person information, perceives an action that occurs between a communication device performing communication and the person, and perceives an action that occurs between people, a learning unit that multimodally learns an emotional interaction of the person using the extracted feature information on the person, and an operation generation unit that generates a behavior on the basis of the learned emotional interaction information of the person.

6 Claims, 37 Drawing Sheets

(51) Int. Cl.
    *G05B 13/02*     (2006.01)
    *G06N 3/09*     (2023.01)
    *G06N 3/092*     (2023.01)
    *G06V 40/16*     (2022.01)
    *G06V 40/20*     (2022.01)

(52) U.S. Cl.
    CPC ............ *G06V 40/174* (2022.01); *G06V 40/20* (2022.01); *G10L 25/51* (2013.01)

(56) References Cited

U.S. PATENT DOCUMENTS

| | | | | |
|---|---|---|---|---|
| 2017/0206064 | A1* | 7/2017 | Breazeal | G06F 8/36 |
| 2018/0056520 | A1* | 3/2018 | Ozaki | B25J 13/084 |
| 2018/0117762 | A1* | 5/2018 | Earwood | B25J 9/1605 |
| 2018/0133900 | A1* | 5/2018 | Breazeal | B25J 19/026 |
| 2018/0165554 | A1* | 6/2018 | Zhang | G06N 3/045 |
| 2018/0229372 | A1* | 8/2018 | Breazeal | B25J 11/0015 |
| 2018/0314689 | A1* | 11/2018 | Wang | G10L 15/1822 |
| 2019/0332680 | A1* | 10/2019 | Wang | G10L 15/07 |
| 2020/0009739 | A1* | 1/2020 | Moon | G06N 3/045 |
| 2022/0114405 | A1* | 4/2022 | Zhang | G06N 3/045 |

FOREIGN PATENT DOCUMENTS

| | | |
|---|---|---|
| JP | 2018-030185 | 3/2018 |
| JP | 2019-521449 | 7/2019 |
| JP | 2020-089947 | 6/2020 |
| WO | 2017/173141 | 10/2017 |

OTHER PUBLICATIONS

Isaacs, et al. "Controlling dynamic simulation with kinematic constraints, behavior functions and inverse dynamics", Computer Graphics, ACM, US, vol. 21, No. 4, Aug. 1, 1987 (Aug. 1, 1987), pp. 215-224, XP059139582, ISSN: 0097-8930, DOI : 10.1145/37402.37428.

International Search Report and Written Opinion for International Application No. PCT/JP2021/023545 mailed on Sep. 14, 2021, 15 pages.

E. Pot et al., "Choregraphe: a graphical tool for humanoid robot programming" in RO-MAN 2009—The 18th IEEE International Symposium on Robot and Human Interactive Communication, Sep. 2009, pp. 46-51.

* cited by examiner

FIG. 5
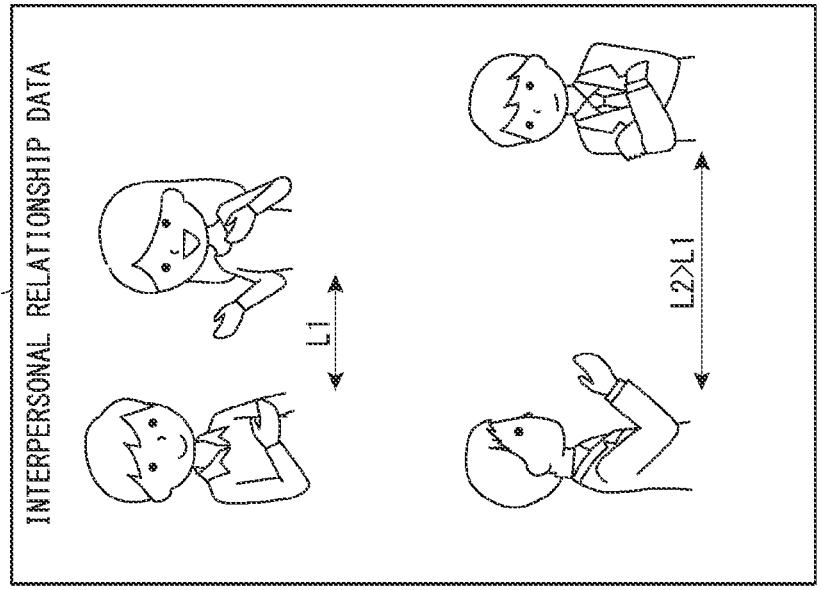
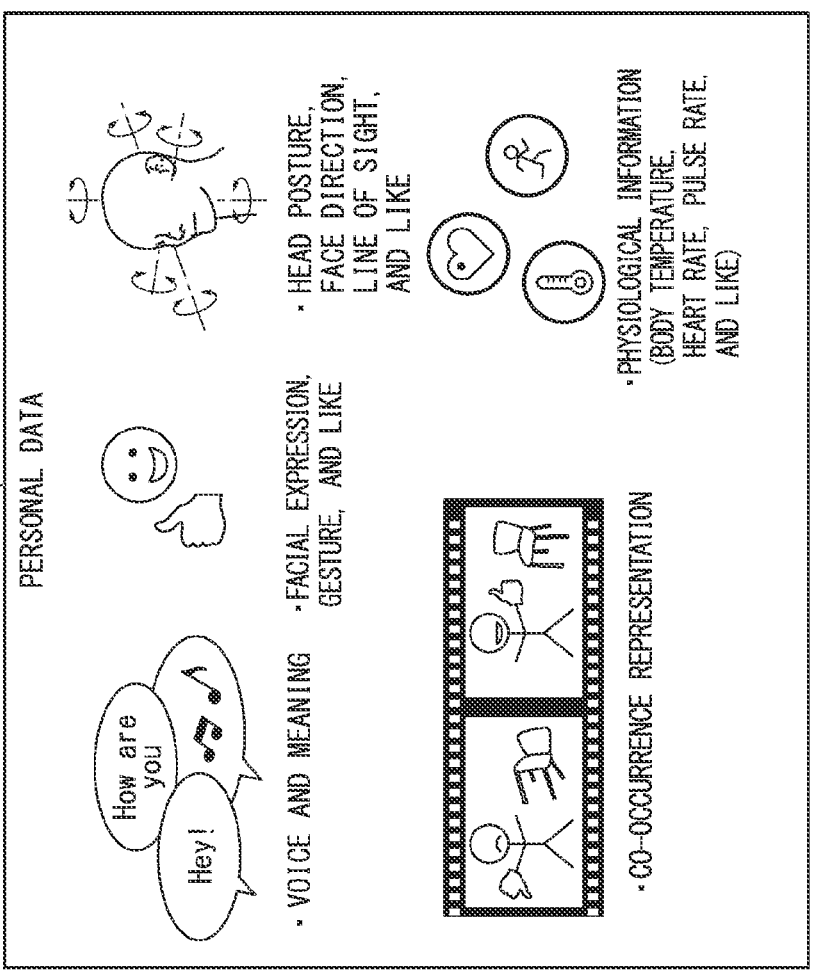

FIG. 17
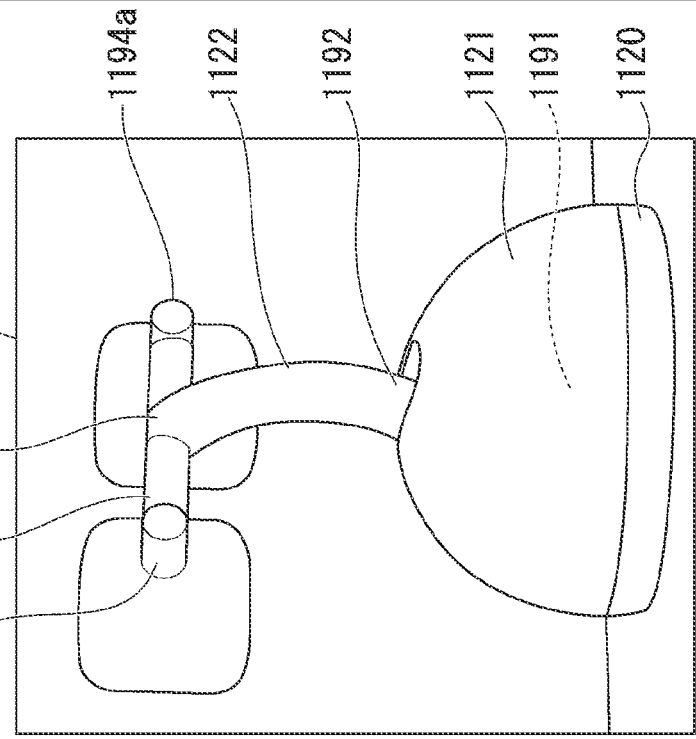
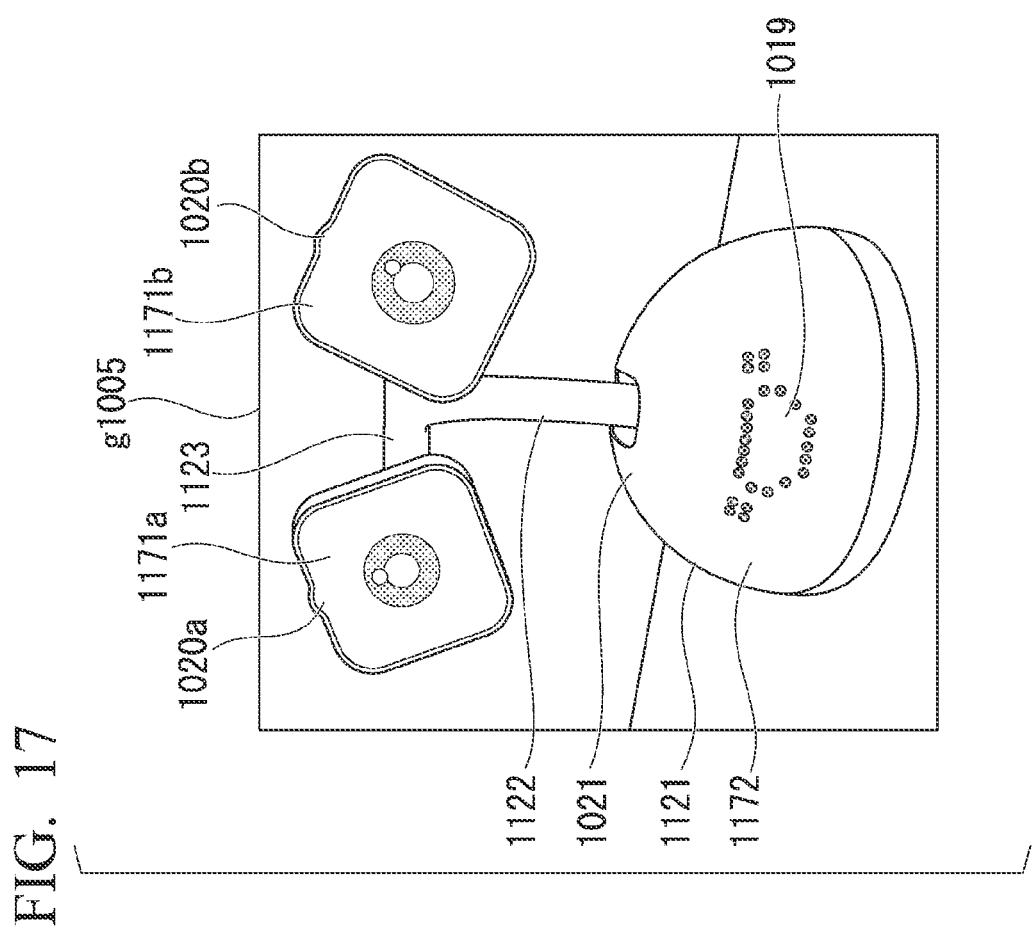

FIG. 30
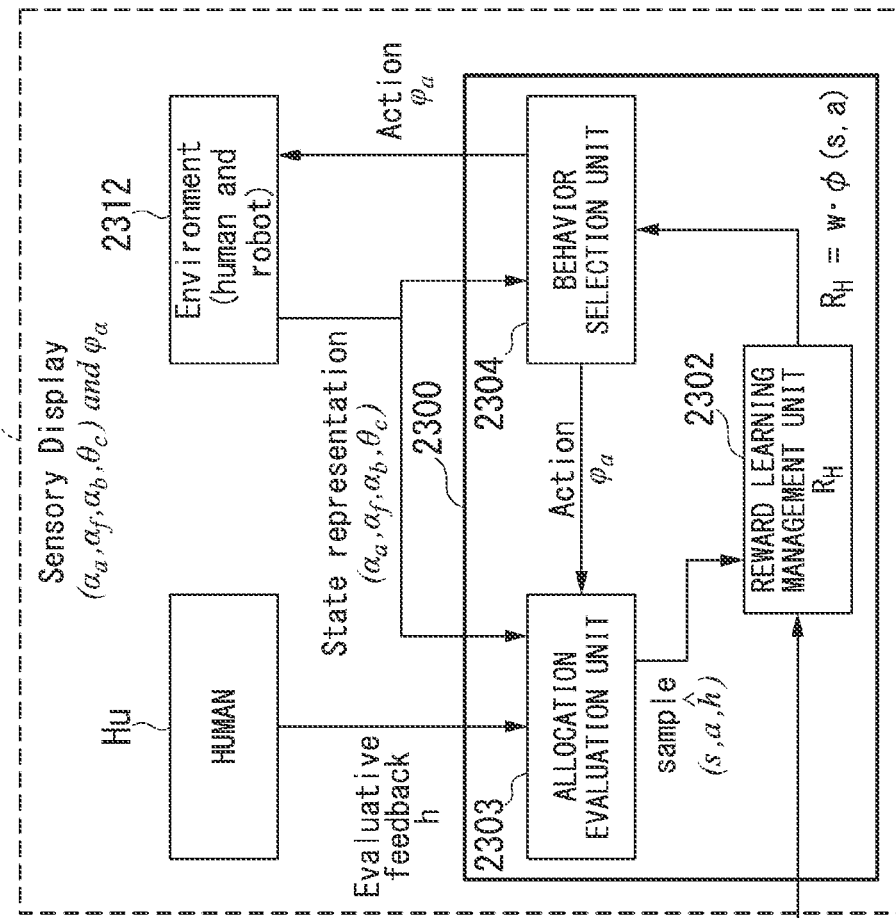
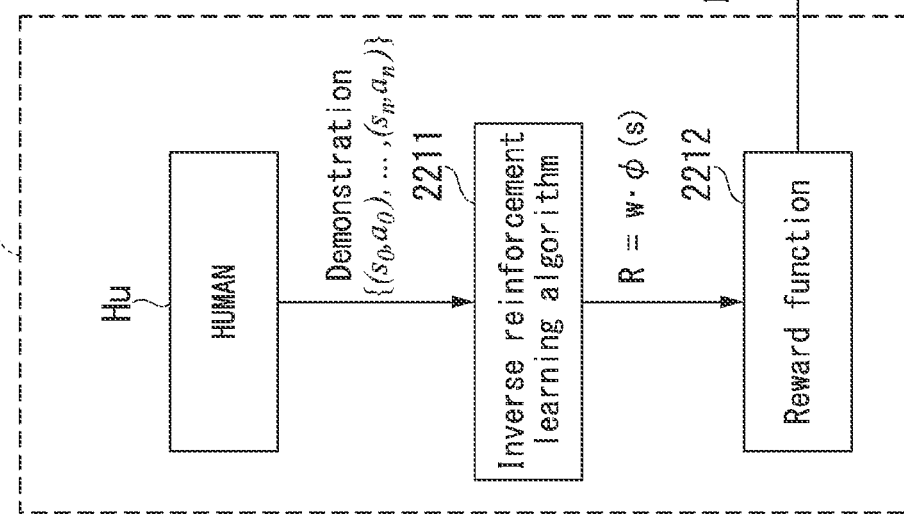

FIG. 31

| Algorithm 1: DIRL algorithm |
| --- |
| 1: Initialize reward function $R$, human reward function $\hat{R}_H$, action value function $Q(s, a)$ or state value function $V(s)$ |
| 2: Provide and record demonstrations |
| 3: while *true* do |
| 4:    Generate trajectories via value iteration (UCT or DP) |
| 5:    Optimize reward function $R$ via inverse reinforcement learning |
| 6: Initialize $\hat{R}_H$ with $R$ |
| 7: while *true* do |
| 8:    if *new human reward h is received* then |
| 9:      $\hat{h} \leftarrow creditAssign(sample, \vec{h})$ |
| 10:      $updateModel(\hat{R}_H, sample, \hat{h})$ |
| 11:    $s \leftarrow getState()$ |
| 12:    Select an action with reward function R |
| 13:    $takeAction(a)$ |
| 14:    wait for next time step |

FIG. 32

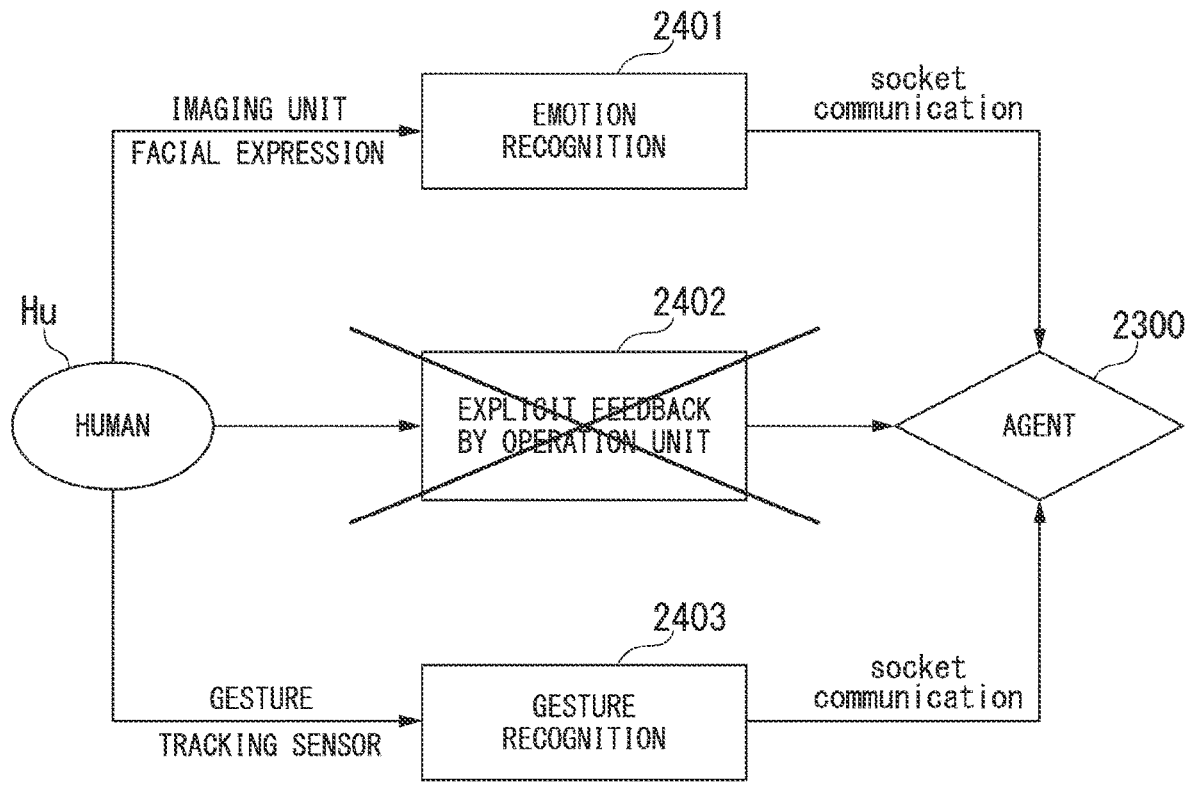

BEHAVIOR CONTROL DEVICE, BEHAVIOR CONTROL METHOD, AND PROGRAM

TECHNICAL FIELD

The present invention relates to a behavior control device, a behavior control method, and a program.

Priorities are claimed on No. 2020-108946 filed on Jun. 24, 2020, Japanese Patent Application No. 2020-122009 filed on Jul. 16, 2020, and Japanese Patent Application No. 2020-132962 filed on Aug. 5, 2020, the content of which is incorporated herein by reference.

BACKGROUND ART

Today, smart speakers or communication robots are being developed. In such a system, functions such as turning lights on or off, accessing a calendar, reading e-mail, and setting a schedule are focused upon according to instructions. In such a system, an input of the instruction is limited to, for example, a selection by a touch panel or a command determined by voice, and it is difficult to construct a relationship with a person.

For this reason, a system that allows people to have relationships is desired. For example, Patent Literature 1 proposes a system that allows a person to participate in dialogue or operation with a dialogue device for interaction between the person and the companion device. In a technology described in Patent Literature 1, the companion device detects an utterance or behavior with a user and expresses the utterance or behavior through movement, graphics, sound, light, and fragrance to provide a friendly presence.

Further, a movement of a humanoid robot is generated using an application such as a personal computer (see, for example, Non Patent Literature 1).

Because a robot operates in an environment in which a person lives, the robot and a human need to be able to perform learning quickly from ordinary people through natural interaction in order for the robot to become more useful. Reinforcement learning from evaluation feedback of the human can make it easier for non-technical people to teach a robot to do tasks. Learning from demonstration often leads to faster learning than evaluative feedback.

CITATION LIST

Patent Literature

[Patent Literature 1] Published Japanese Translation No. 2019-521449 of the PCT International Publication

Non Patent Literature

[Non Patent Literature 1] E. Pot, J. Monceaux, R. Gelin, and B. Maisonnier, "Choregraphe: a graphical tool for humanoid robot programming," in RO-MAN 2009—The 18th IEEE International Symposium on Robot and Human Interactive Communication, September 2009, pp. 46-51.

SUMMARY OF INVENTION

Technical Problem

With a technology described in Paten Literature 1, it was difficult to form an emotional connection between a robot and a person.

In recent years, there has been a demand for robots to operate like animations. Animation is widely accepted across different languages and cultures. For example, movies have successfully defined the expressive power of animated characters. It may be possible to design the expressive power of robots by causing the robots to operate like animations. With the related art, it was not possible to convert animations into an operation of a robot or design an operation.

With learning from evaluation feedback of a human in the related art, the robot performs learning through trial and error, which may make robot learning dangerous and costly. Further, learning from demonstration of the robot of the related art limits performance of a trainee, whereas learning from a reward of a human generally outperforms the performance of the trainee. For this reason, with the related art, it was difficult to perform learning through an interaction between robots and a human.

An aspect of the present invention has been made in view of the above problems, and an object of the present invention is to provide a behavior control device, a behavior control method, and a program that can perform autonomous learning through an interaction between a device and a human.

Solution to Problem (1) A social ability generation device according to an aspect of the present invention includes: a perception unit configured to acquire person information on a person, extract feature information on the person from the acquired person information, perceive an action that occurs between a communication device performing communication and the person, and recognize an action that occurs between people;
a learning unit configured to multimodally learn an emotional interaction of the person using the extracted feature information on the person; and
an operation generation unit configured to generate a behavior on the basis of the learned emotional interaction information of the person.

(2) In the aspect (1), the learning unit may perform learning using an implicit reward and an explicit reward, the implicit reward may be a multimodally learned reward using the feature information on the person, and the explicit reward may be a reward based on a result of evaluating a behavior of the communication device with respect to the person generated by the operation generation unit.

(3) In the aspect (1) or (2), the social ability generation device may further include: a sound pickup unit configured to pick up an acoustic signal; and an imaging unit configured to capture an image including a user, the perception unit may perform speech recognition processing on the picked-up acoustic signal to extract feature information on voice, and perform image processing on the captured image to extract feature information on a human behavior included in the image, the feature information on the person may include the feature information on a voice and the feature information on the human behavior, the feature information on a voice is at least one of an audio signal, information on a volume of sound, information on an intonation of sound, and a meaning of an utterance, and the feature information regarding a human behavior may be at least one of facial expression information of the person, information on a gesture performed by the person, head posture information of the person, face direction information of the person, line-of-sight information of the person, and a distance between people.

(4) In any one of the aspects (1) to (3), the learning unit may perform learning using social norms, social components, psychological knowledge, and humanistic knowledge.

(5) A social ability generation method according to an aspect of the present invention includes acquiring, by a perception unit, person information on a person, extracting feature information on the person from the acquired person information, perceiving an action that occurs between a communication device performing communication and the person, and perceiving an action that occurs between people; multimodally learning, by a learning unit, an emotional interaction of the person using the extracted feature information on the person; and generating, by an operation generation unit, a behavior on the basis of the learned emotional interaction information of the person.

(6) A communication robot according to an aspect of the present invention includes a perception unit configured to acquire person information on a person, extract feature information on the person from the acquired person information, perceive an action that occurs between a communication device performing communication and the person, and perceive an action that occurs between people; a learning unit configured to multimodally learn an emotional interaction of the person using the extracted feature information on the person; and an operation generation unit configured to generate a behavior on the basis of the learned emotional interaction information of the person.

(7) In the aspect (6), the operation generation unit may generate an image that maintains a relationship with the person as a good relationship by causing the person to perform a behavior for maximizing positive emotion, and display the generated image on the display unit.

(8) A robot operation generation device according to an aspect of the present invention includes a conversion unit configured to calculate a velocity and an acceleration of a trajectory of a movement of a joint for each joint for animation data including data of the movement of the joint, and extract a zero crossing point between the calculated acceleration of the trajectory of the movement of the joint for each joint and a time, and convert the data of the movement of the joint in an animation domain into data in a robot domain for each extracted zero crossing point.

(9) In the aspect (8), the conversion unit may convert the data of the movement of the joint in the animation domain into data in the robot domain for each zero crossing point using the following expression:

$$\eta_i(t)=T[\theta_i(t)]$$

$$|\eta_i'(t)|<v_{i,max}$$

$$|\eta_i''(t)|<a_{i,max}$$

$$\forall t_k|\theta_i'(t_k)=0 \Rightarrow \eta_i'(t_k)=0 \quad \text{[Math. 1]}$$

where $\theta_i(t)$ is the joint trajectory, $\theta_i'(t_k)$ is the velocity of the joint trajectory in the robot domain at time $t_k$, $\theta_i''(t_k)$ is the acceleration of the joint trajectory in the robot domain at time $t_k$, $v_{i,max}$ is a limit of the velocity in the animation domain, $a_{i,max}$ is a limit of the acceleration in the animation domain, T is the conversion function, $\eta_i'(t)$ is the velocity in the robot domain, $\eta_i''(t)$ is the acceleration in the robot domain, $\forall t_k|\theta_i'(t)$ may represent scaling, and the subscript $i$ may represent each joint.

(10) In the aspect (9), the animation data may include data of a movement of an eye, data of a movement of a mouth, and an audio signal, the conversion unit may create a phenotypic routine file by associating the data of the movement of the eye, the data of the movement of the mouth, and the audio signal with the converted data in the robot domain at a timing of the zero crossing point, and the data of the movement of the eye, the data of the movement of the mouth, the audio signal, and the phenotypic routine file may be associated and stored in a storage unit.

(11) In any one of the aspects (8) to (10), the joint may be at least one of a connection portion between a base portion of the robot and a housing of the robot, a connection portion between the housing of the robot and a neck of the robot, and a connection portion between the neck and eyes of the robot.

(12) A robot operation generation method according to an aspect of the present invention includes calculating, by a robot operation generation device, a velocity and an acceleration of a trajectory of a movement of a joint for each joint for animation data including data of the movement of the joint, and extracting, by the robot operation generation device, a zero crossing point between the calculated acceleration of the trajectory of the movement of the joint for each joint and a time, and converting the data of the movement of the joint in an animation domain into data in a robot domain for each extracted zero crossing point.

(13) A robot operation generation program according to an aspect of the present invention causes a computer to: calculate a velocity and an acceleration of a trajectory of a movement of a joint for each joint for animation data including data of the movement of the joint, and extract a zero crossing point between the calculated acceleration of the trajectory of the movement of the joint for each joint and a time, and convert the data of the movement of the joint in an animation domain into data in a robot domain for each extracted zero crossing point.

(14) A behavior control device according to an aspect of the present invention includes: a learning unit configured to generate a reward function through inverse reinforcement learning on the basis of a demonstration result; and an agent configured to select a behavior on the basis of the reward function and information fed back from a person and an environment.

(15) In the aspect (14), the agent may perform correction of a behavior using the reward function learned by the learning unit, and learn a prediction reward model on the basis of the information fed back from the person and the environment.

(16) In the aspect (15), the agent may include a reward learning management unit, an allocation evaluation unit, and a behavior selection unit, the allocation evaluation unit may calculate a probability of a previously selected behavior on the basis of feedback from the person and feedback from the environment, and set a state, a behavior, the probability of the previously selected behavior, and a supervised learning sample, the reward learning management unit may acquire the reward function generated by the learning unit, acquire the supervised learning sample output by the allocation evaluation unit, learn the prediction reward model, and update the reward function using the learned prediction reward model, and the behavior selection unit may select the behavior using information fed back from the person and the environment and the reward learning management unit.

(17) In any one of the aspects (14) to (16), the agent may estimate a state of the environment represented by a voice direction of the person, a direction of a face of the person, a direction of a body of the person, and a direction of an own device in a current direction of the own device, and select a behavior with a reward function having a greatest reward prediction value to select a behavior of turning the face to a person that the own device is paying attention to.

(18) In the aspect (16), the reward learning management unit may use the calculated probability h^ and a state-behavior pair as supervised learning samples, and update parameters on the basis of a least-squares gradient to learn a function R^H(s, a) obtained by approximating an expected value of a reward of the person received in an interaction experience,

[Math. 2]

$$\vec{\omega}_{t+1} = \vec{\omega}_t - \alpha \nabla_{\vec{\omega}} \frac{1}{2} \{h - \hat{R}_H(s, a)\}^2$$
$$= \vec{\omega}_t - \alpha \nabla_{\vec{\omega}} \frac{1}{2} \{h - \vec{\omega}^T \phi(s, a)\}^2$$
$$= \vec{\omega}_t + \alpha \{h - \vec{\omega}^T \phi(s, a)\} \phi(s, a)$$
$$= \vec{\omega}_t + \alpha \delta_t \Phi(s_t, a_t)$$

h may be a reward label of the human received by the agent at an arbitrary time step t, α may be a learning rate, s may be a state representation, a may be a selected behavior, $\vec{\omega} = (\omega_0, \ldots, \omega_{m-1})^T$ may be a column parameter vector, $\{(s_0, a_0), \ldots, (s_n, a_n)\}$ may be a state-operation pair and $\varphi(\vec{x}) = (\varphi_0(\vec{x}), \ldots, \varphi_{m-1}(\vec{x}))^T$ with $\varphi_i(\vec{x})$ as a basis function, m may be i=0, . . . , m−1 and be a total number of parameters, and $\delta_t$ may be a time difference error and may be expressed by the following equation.

$$\delta_t = h - \hat{R}_H(s,a) = h - \vec{\omega}^T \phi(s_t, a_t) \quad \text{[Math. 3]}$$

(19) A behavior control method according to an aspect of the present invention includes generating, by a learning unit, a reward function through inverse reinforcement learning on the basis of demonstration results; and selecting, by an agent, a behavior on the basis of the reward function and information fed back from a person and an environment.

(20) A behavior control program according to an aspect of the present invention causes a computer to: generate a reward function through inverse reinforcement learning on the basis of demonstration results; and select a behavior on the basis of the generated reward function and information fed back from a person and an environment.

Advantageous Effects of Invention

According to the aspects (1) to (7), an emotional connection can be formed between the robot and the person.

According to the aspect (2), it is possible to perform learning without using a large amount of teaching data.

According to the aspect (3), it is possible to acquire a large amount of information based on a human reaction.

According to the aspect (4), it is possible to navigate social scenarios socially and intelligently.

According to the aspect (7), it is possible to cause the person to perform a behavior for maximizing positive emotion, and maintain a relationship with the person in a good state.

According to the aspects (8) to (13), it is possible to convert a movement of the animation into an actual movement of the robot.

According to the aspect (10), synchronization of operations with multimedia elements is not lost.

According to the aspects (14) to (20), it is possible to perform autonomous learning through interaction between the device and the human.

According to the aspects (14) to (20), it is possible to enable the robot to perform learning from the demonstration and the evaluation feedback provided by the human, and to reduce the number of evaluations of the human required to obtain an optimal operation and, particularly, the number of mistakes (unexpected behaviors).

BRIEF DESCRIPTION OF DRAWINGS

FIG. 5 is a diagram illustrating an example of data that is recognized by a perception unit according to the embodiment.

FIG. 17 is a diagram illustrating an example of an appearance of the robot according to the embodiment.

FIG. 30 is a diagram illustrating an overview of an IRL-TAMER framework according to the embodiment.

FIG. 31 is a diagram illustrating an example of a processing algorithm that is performed by an agent according to the embodiment.

FIG. 32 is a diagram illustrating a framework for dialogue type RL from social feedback of a human according to the embodiment.

DESCRIPTION OF EMBODIMENTS

Figure 1:
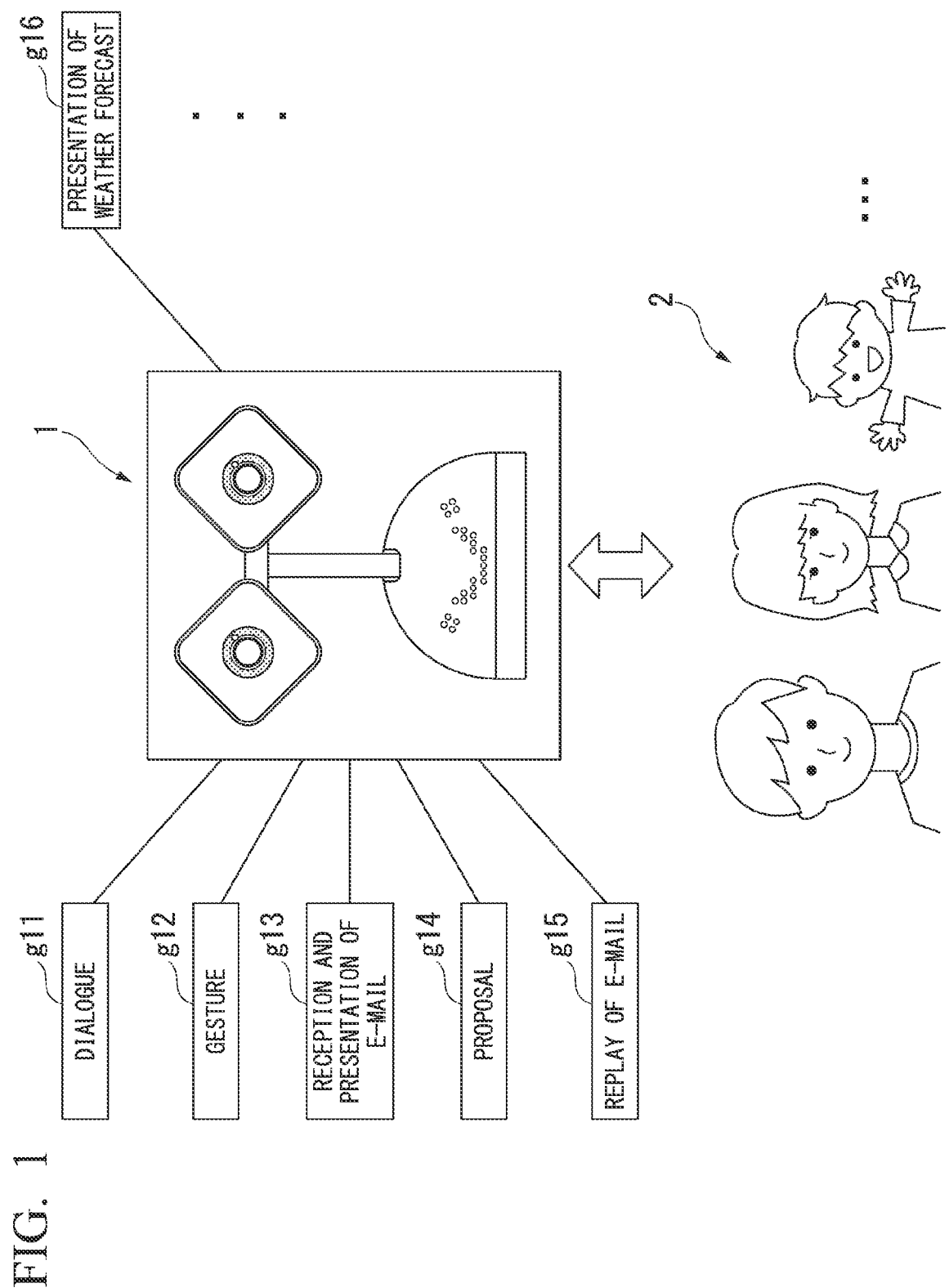
FIG. 1 is a diagram illustrating a communication example of a communication robot according to an embodiment.

Hereinafter, embodiments of the present invention will be described with reference to the drawings. Further, in the drawings to be used for the following description, a scale of respective members may be appropriately changed so that the respective members have a recognizable size.

Overview of First Embodiment

FIG. 1 is a diagram illustrating a communication example of a communication robot 1 according to the present embodiment. As illustrated in FIG. 1, the communication robot 1 communicates with an individual or a plurality of people 2. Communication is mainly a dialogue g11 and a gesture g12 (operation). The operation is represented by an image that is displayed on a display unit in addition to an actual operation. Further, when an e-mail is transmitted to the user via an Internet line or the like, the communication robot 1 receives the e-mail and informs the user that the e-mail has been received and the content (g14). Further, when the communication robot 1 needs to reply to the e-mail, for example, the communication robot 1 communicates with the user to see when advice is needed and makes a proposal g14. The communication robot 1 transmits a reply (g15). Further, the communication robot 1 performs presentation g19 of a weather forecast at a place according to a scheduled date and time or place, for example, according to a schedule of the user.

In the present embodiment, a social ability of the robot is generated so that an emotional connection can be formed between the robot and the person, and, for example, the robot communicates with the person according to a reaction or behavior of the person. In the present embodiment, the person and the robot communicate with each other with empathy at a level of emotion. In the present embodiment, communication between the person and a pet is realized by learning a social norm or the like. In the present embodiment, in the communication, the above is realized by learning a social background of the user, an interaction between people, and the like.

<Example of Configuration of Communication Robot 1>

Figure 2:
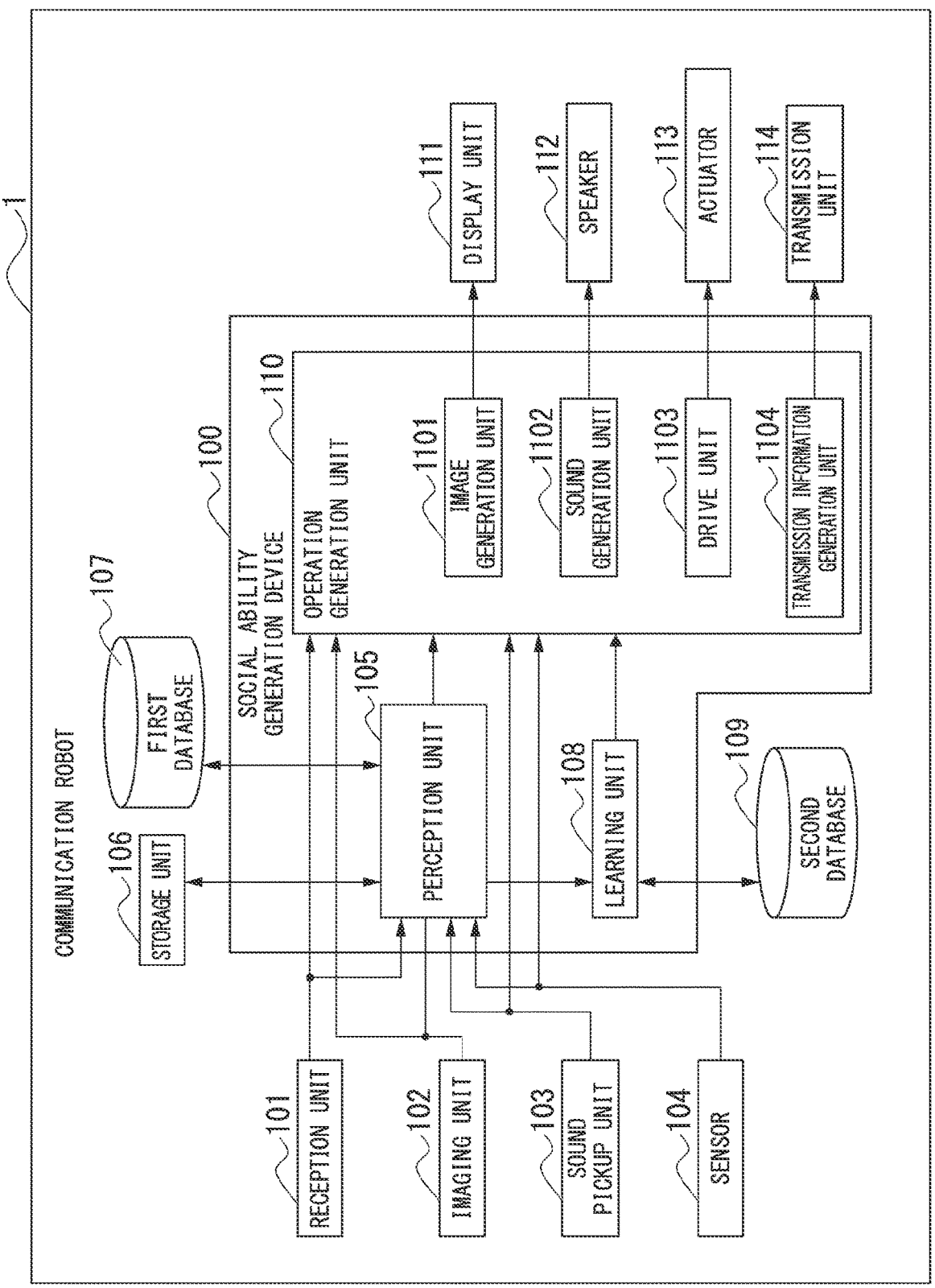
FIG. 2 is a block diagram illustrating an example of a configuration of the communication robot according to the embodiment.

Next, an example of a configuration of the communication robot 1 will be described. FIG. 2 is a block diagram illustrating an example of a configuration of the communication robot 1 according to the present embodiment. As illustrated in FIG. 2, the communication robot 1 includes a reception unit 101, an imaging unit 102, a sound pickup unit 103, a sensor 104, a social ability generation device 100, a storage unit 106, a first database 107, a second database 109, a display unit 111, a speaker 112, an actuator 113, and a transmission unit 114.

The social ability generation device 100 includes a perception unit 105 (perception means), a learning unit 108 (learning means), and an operation generation unit 110 (operation generation means). The operation generation unit 110 includes an image generation unit 1101, an audio generation unit 1102, a drive unit 1103 and a transmission information generation unit 1104.

<Function and Operation of the Communication Robot 1>

Next, a function and an operation of each functional unit of the communication robot 1 will be described with reference to FIG. 1.

The reception unit 101 acquires information (for example, e-mail, blog information, news, or weather forecast) from, for example, the Internet via a network, and outputs the acquired information to the perception unit 105 and the operation generation unit 110. Alternatively, for example, when the first database 107 is on a cloud, the reception unit 101 acquires information from the first database 107 on the cloud and outputs the acquired information to the perception unit 105.

The imaging unit 102 is, for example, a Complementary Metal Oxide Semiconductor (CMOS) imaging element, a Charge Coupled Device (CCD) imaging element, or the like. The imaging unit 102 outputs a captured image (person information which is information on a person; still image, continuous still image, and a moving image) to the perception unit 105 and the operation generation unit 110. The communication robot 1 may include a plurality of imaging units 102. In this case, the imaging units 102 may be attached to front side and a rear side of a housing of the communication robot 1, for example.

The sound pickup unit 103 is, for example, a microphone array configured of a plurality of microphones. The sound pickup unit 103 outputs acoustic signals (person information) picked up by the plurality of microphones to the perception unit 105 and the operation generation unit 110. The sound pickup unit 103 may sample each acoustic signal picked up by the microphone with the same sampling signal, convert an analog signal into a digital signal, and then output the digital signal to the perception unit 105.

The sensor 104 is, for example, a temperature sensor that detects a temperature of an environment, an illuminance sensor that detects an illuminance of the environment, a gyro sensor that detects a tilt of a housing of the communication robot 1, an acceleration sensor that detects a motion of the housing of the communication robot 1, and an atmospheric pressure sensor that detects an atmospheric pressure. The sensor 104 outputs the detection value to the perception unit 105 and the operation generation unit 110.

The storage unit 106 stores, for example, items to be recognized by the perception unit 105, various values (a threshold values or a constant) used for recognition, and an algorithm for recognition.

The first database 107 stores, for example, a language model database, an acoustic model database, a dialogue corpus database, an acoustic feature quantity that are used for speech recognition, and a comparison image database and an image feature quantity that are used for image recognition. Each piece of data and feature quantity will be described below. The first database 107 may be placed on a cloud or may be connected via a network.

The second database 109 stores data regarding a relationship between people, such as social components, social norms, social customs, psychology, and humanities, which are used at the time of learning. The second database 109 may be placed on a cloud or may be connected via a network.

The social ability generation device 100 perceives the action that occurs between the communication robot 1 and the person, or the action that occurs between the plurality of people, and learns an emotional interaction of the human on the basis of the perceived content and the data stored in the second database 109. The social ability generation device 100 generates the social ability of the communication robot 1 from the learned content. The social ability is, for example, an ability to interact between people, such as dialogue, behavior, understanding, and empathy between people.

The perception unit 105 perceives the action that occurs between the communication robot 1 and the person, or the actions that occur between a plurality of people. The perception unit 105 acquires the image captured by the imaging unit 102, the acoustic signal picked up by the sound pickup unit 103, and the detection value detected by the sensor 104. The perception unit 105 may acquire information received by the reception unit 101. The perception unit 105 perceives the action that occurs between the communication robot 1 and the person, or the action that occurs between the plurality of people on the basis of the acquired information and the data stored in the first database 107. A perception method will be described below. The perception unit 105 outputs a perceived perception result (a feature quantity regarding sound, and feature information related to a human behavior) to the learning unit 108. The perception unit 105 performs well-known image processing (for example, binarization processing, edge detection processing, clustering processing, and image feature quantity extraction processing) on the image captured by the imaging unit 102. The perception unit 105 performs well-known speech recognition processing (sound source identification processing, sound source localization processing, noise suppression processing, speech section detection processing, sound source extraction processing, acoustic feature quantity calculation processing, and the like) on the acquired acoustic signal. The perception unit 105 extracts an audio signal (or acoustic signal) of a target person, animal, or object from the acquired acoustic signal on the basis of the perception result, and outputs the extracted audio signal (or acoustic signal) to the operation generation unit 110 as a recognition result. The perception unit 105 extracts an image of a target person or object from the acquired image on the basis of the perception result, and outputs the extracted image to the operation generation unit 110 as a recognition result.

The learning unit 108 uses the perception result output by the perception unit 105 and the data stored in the second database 109 to learn the emotional interaction of the human. The learning unit 108 stores a model generated by learning. A learning method will be described below.

The operation generation unit 110 acquires the information received from the reception unit 101, the image captured by the imaging unit 102, the acoustic signal picked up by the sound pickup unit 103, and the recognition result from the perception unit 105. The operation generation unit 110 generates a behavior (an utterance, a gesture, and an image) for the user on the basis of the learning result and the acquired information.

The image generation unit 1101 generates an output image (a still image, continuous still images, or a moving image) to be displayed on the display unit 111 on the basis of the learning result and the acquired information, and displays the generated output image on the display unit 111. Thereby, the operation generation unit 110 causes the display unit 111 to display an animation such as a facial expression and present an image to be presented to the user, and communicate with the user. Images to be displayed include an image equivalent to a movement of eyes of a person, an image equivalent to a movement of a mouth of a person, information such as that on a destination of the user (a map, a weather map, weather forecast, information on shops or resorts, or the like), an image of a person TV-calling the user via an Internet line, and the like.

The audio generation unit 1102 generates an output audio signal to be output to the speaker 112 on the basis of the learning result and the acquired information, and causes the speaker 112 to output the generated output audio signal. Accordingly, the operation generation unit 110 causes the speaker 112 to output an audio signal to communicate with the user. The audio signal to be output is an audio signal according to a voice assigned to the communication robot 1, an audio signal of a person who TV-calls the user via an Internet line, or the like.

The drive unit 1103 generates a drive signal for driving the actuator 113 on the basis of the learning result and the acquired information, and drives the actuator 113 using the generated drive signal. Thereby, the operation generation unit 110 controls an operation of the communication robot 1 to express emotion or the like and communicates with the user.

On the basis of the learning result and the acquired information, the transmission information generation unit 1104 generates transmission information (an audio signal and an image) desired to be transmitted by the user to other users with which the user is talking via a network, and transmits the generated transmission information from the transmission unit 114.

The display unit 111 is a liquid crystal image display device, an organic Electro Luminescence (EL) image display device, or the like. The display unit 111 displays an output image output by the image generation unit 1101 of the social ability generation device 100.

The speaker 112 outputs an output audio signal output by the audio generation unit 1102 of the social ability generation device 100.

The actuator 113 drives the operation unit according to a drive signal output by the drive unit 1103 of the social ability generation device 100.

The transmission unit 114 transmits transmission information output by the transmission information generation unit 1104 of the social ability generation device 100 to a transmission destination via a network.

<Example of an Appearance of Communication Robot 1>

Next, an example of an appearance of the communication robot 1 will be described.

Figure 3:
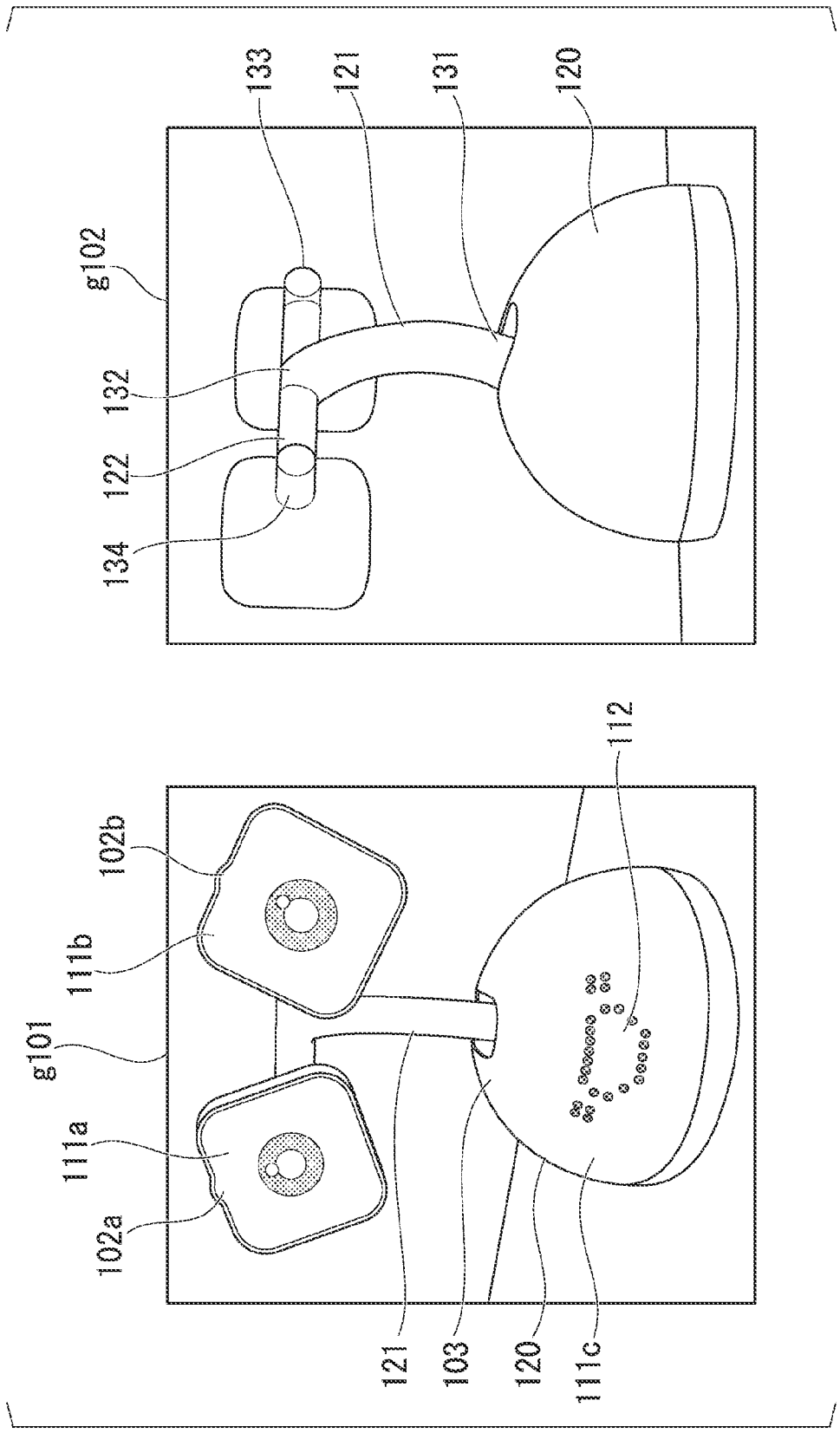
FIG. 3 is a diagram illustrating an example of an appearance of the communication robot according to the embodiment.

FIG. 3 is a diagram illustrating an example of the appearance of the communication robot 1 according to the present embodiment. In examples of a front view g101 and a side view g102 of FIG. 3, the communication robot 1 includes three display units 111 (111*a*, 111*b*, and 111*c*). Further, in the example of FIG. 3, the imaging unit 102*a* is attached to an upper portion of the display unit 111*a*, and the imaging unit 102*b* is attached to an upper portion of the display unit 111*b*. The display units 111*a* and 1/1*b* correspond to human eyes and present image information. The speaker 112 is attached to near the display unit 111*c* that displays an image corresponding to a human mouth in the housing 120. The sound pickup unit 103 is attached to the housing 120.

Further, the communication robot 1 also includes a boom 121. The boom 121 is movably attached to housing 120 via a movable portion 131. A horizontal bar 122 is rotatably attached to the boom 121 via a movable portion 132.

Further, the display unit 111*a* is rotatably attached to the horizontal bar 122 via a movable portion 133, and the display unit 111*b* is rotatably attached via a movable portion 134. The appearance of the communication robot 1 illustrated in FIG. 3 is an example and is not limited thereto.

<Data Stored in First Database>

Next, an example of data stored in the first database will be described. The language model database stores a language model. The language model is a probabilistic model that assigns a probability that an arbitrary character string is a Japanese sentence or the like. Further, the language model is, for example, any one of an N-gram model, a hidden Markov model, a maximum entropy model, or the like.

The acoustic model database stores a sound source model. The sound source model is a model that is used to identify a sound source of the picked up acoustic signal.

The acoustic feature quantity is a feature quantity calculated after Fast Fourier Transform is performed on the picked up acoustic signal and conversion into a signal in a frequency domain is performed. For the acoustic feature quantity, for example, static Mel-Scale Log Spectrum (MSLS), delta MSLS, and one delta power are calculated every predetermined time (for example, 10 ms). The MSLS is obtained by using a spectral feature quantity as a feature quantity for acoustic recognition and performing an inverse discrete cosine transform on a Mel Frequency Cepstrum Coefficient (MFCC).

The dialogue corpus database stores a dialogue corpus. The dialogue corpus is a corpus that is used when the communication robot 1 and the user perform a dialogue, and is, for example, a scenario according to content of the dialogue.

The comparison image database stores images that are used for pattern matching, for example. The images that are used for pattern matching include, for example, images of the user, images of a family of the user, images of pets of the user, and images of friends and acquaintances of the users.

The image feature quantity is, for example, a feature quantity extracted from an image of a person or object through well-known image processing. The above-described example is just an example, and the first database 107 may store other data.

<Flow of Perception, Learning, and Social Ability>

Figure 4:
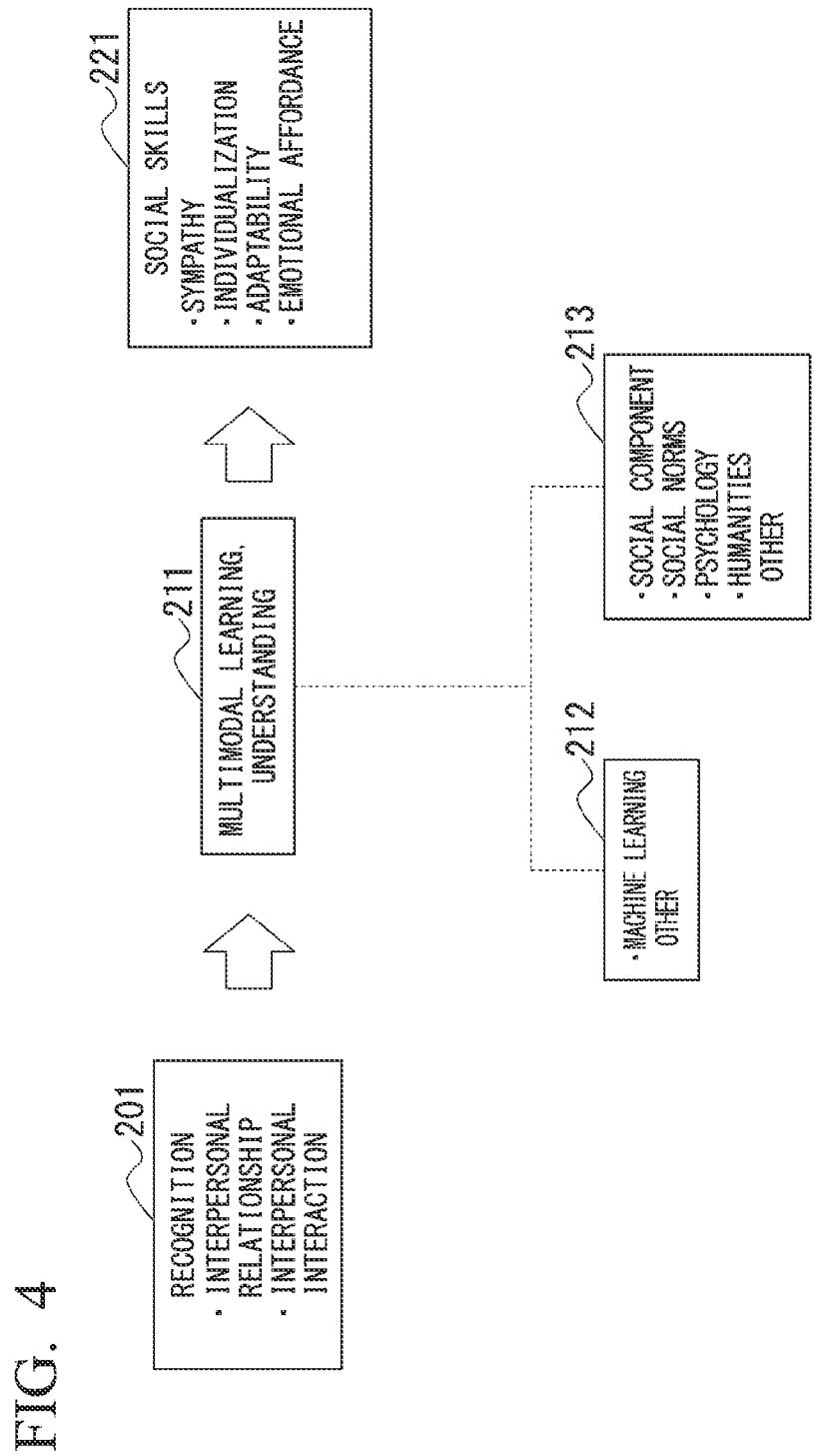
FIG. 4 is a diagram illustrating a flow of perception, learning, and social ability that are performed by a social ability generation device of the embodiment.

Next, a flow of perception and learning performed by the social ability generation device 100 of the present embodiment will be described. FIG. 4 is a diagram illustrating a flow of perception, learning, and social ability performed by the social ability generation device 100 of the present embodiment.

The recognition result 201 is an example of the result recognized by the perception unit 105. The recognition result 201 is, for example, an interpersonal relationship or an interpersonal mutual relationship.

Multimodal learning and understanding 211 is an example of content of learning performed by the learning unit 108. The learning method 212 is machine learning or the like. Further, a learning target 213 is a social component, a social model, psychology, humanities, and the like.

A social ability 221 are a social skill, such as empathy, individualization, adaptability, and emotional affordance.

<Data to be Recognized>

Next, an example of data recognized by the perception unit 105 will be described.

FIG. 5 is a diagram illustrating an example of data recognized by the perception unit 105 according to the present embodiment. In the present embodiment, personal data 301 and interpersonal relationship data 351 are recognized as illustrated in FIG. 5.

The personal data is a behavior that occurs in one person, and is data acquired by the imaging unit 102 and sound pickup unit 103, and data obtained by performing speech recognition processing, image recognition processing, and the like on the acquired data. The personal data includes, for example, voice data, semantic data resulting from audio processing, volume of sound, intonation of the sound, uttered words, facial expression data, gesture data, head posture data, face direction data, line-of-sight data, co-occurrence representation data, and physiological information (body temperature, heart rate, pulse rate, or the like). The data to be used may be selected by a designer of the communication robot 1, for example. In this case, for example, the designer of the communication robot 1 may set important features of the personal data in communication for actual communication or demonstration between two people. Further, the perception unit 105 perceives emotion of the user as the personal data on the basis of the information extracted from each of an acquired utterance and the image. In this case, the perception unit 105 performs perception on the basis of, for example, volume or intonation of the sound, an utterance duration, facial expression, and the like. The communication robot 1 of the present embodiment is controlled to take an action so that emotion of the user is maintained as good emotion and a relationship with the user is maintained as a good relationship.

Here, an example of a method of perceiving a social background of the user will be described. The perception unit 105 estimates a nationality, hometown, or the like of user on the basis of the acquired utterance and the image, and the data stored in the first database 107. The perception unit 105 extracts a life schedule of the user, such as a wake-up time, a going-out time, a returning home time, bedtime, or the like, on the basis of the acquired utterance, the image and the data stored in the first database 107. The perception unit 105 estimates a sex, age, occupation, hobbies, career, preferences, family structure, a religion, a degree of attachment to the communication robot 1, and the like of the user on the basis of the acquired utterance, the image, the life schedule, and the data stored in the first database 107. Because the social background may change, the communication robot 1 updates information on the social background of the user on the basis of conversation, an image, and the data stored in the first database 107. Further, in order to enable emotional sharing, a social background or a degree of attachment to the communication robot 1 is not limited to a level that can be input of an age, sex, or career, and is perceived on the basis of up and downness of emotion according to a time period, volume or intonation of sound for a topic, and the like. Thus, the perception unit 105 also learns things that the user is not aware of by his or herself on the basis of daily conversation and facial expression at the time of conversation.

Interpersonal relationship data is data regarding a relationship between the user and the other person. By using the interpersonal relationship data in this way, it is possible to use social data. The interpersonal relationship data includes, for example, a distance between people, whether or not lines of sight of people who perform dialogue intersect, intonation of sound, volume of sound. As will be described below, the distance between people varies depending on the interpersonal relationship. For example, the interpersonal relationship is L1 for couples or friends, and an interpersonal relationship between businessmen is L2, which is larger than L1.

For example, the designer of the communication robot 1 may set important features of interpersonal data in communication for actual communication or demonstration between two persons. Such personal data, interpersonal relationship data, and information on the social background of the user are stored in the first database 107 or the storage unit 106.

Further, when there are a plurality of users such as the user and his or her family, the perception unit 105 collects and learns the personal data for each user, and estimates a social background for each person. Further, such social background may be obtained, for example, via the network and the reception unit 101. In this case, the user inputs his or her social background or selects an item using, for example, a smartphone.

Here, an example of a method of perceiving the interpersonal relationship data will be described. The perception unit 105 estimates a distance (interval) between the people that perform communication on the basis of the acquired utterance, the image, and the data stored in the first database 107. The perception unit 105 detects whether or not lines of sight of the people who perform the communication intersect, on the basis of the acquired utterance, the image, and the data stored in the first database 107. The perception unit 105 estimates a relationship between friends, a relationship between co-workers, and a relationship between relatives and parents on the basis of content of the utterance, volume of the sound, intonation of the sound, a received e-mail, a transmitted e-mail, and a partner that is a transmission and reception destination of a transmitted and received e-mail on the basis of the acquired utterance and the data stored in the first database 107.

In an initial state of use, the perception unit 105 may select, for example, one combination at random from among several combinations of initial values of the social backgrounds and the personal data stored in the first database 107, and start the communication. When it is difficult to continue the communication with the user due to the behavior generated by the randomly selected combination, the perception unit 105 may reselect another combination.

<Learning Procedure>

In the present embodiment, the learning unit 108 performs learning using the personal data 301 and the interpersonal relationship data 351 recognized by the perception unit 105 and the data stored in the second database 109.

Here, a social structure or social norm will be described. In a space in which people participate in social interaction, interpersonal relationships differ, for example, depending on a person to person career. For example, a relationship with a distance of 0 to 50 cm from a person is an intimate relationship, and a relationship with a distance of 50 cm to 1 m from a person is a personal relationship. A relationship with a distance of 1 to 4 m from a person is a social relationship, and a relationship with a distance of 4 m or more from a person is a public relationship. In such a social norm, whether a gesture or utterance conforms to the social norm at the time of learning is used as reward (an implicit reward).

Further, the interpersonal relationship may be set to a relationship according to a use environment or the user according to a setting of a feature quantity of the reward at the time of learning. Specifically, a plurality of intimacy settings may be provided, for example, setting a rule to not talk to people who dislike robots, and a rule to actively talk to people who like the robots. In a real environment, the perception unit 105 may perceive a type of user on the basis of a result of processing the utterance of the user and the image, and the learning unit 108 may select a rule.

Further, a human trainer may evaluate the behavior of the communication robot 1 and provide a reward (an implicit reward) according to a social structure or norm that the human trainer knows.

<Data Stored in Second Database>

Next, an example of data stored in the second database will be described.

Social components are, for example, age, sex, occupation, a relationship between a plurality of people (parents and children, couples, lovers, friends, acquaintances, co-workers, neighbors, teachers and students, or the like).

The social norm is a rule or manner between individuals and a plurality of people, and are associated with utterance, gesture, or the like according to an age, sex, occupation, and a relationship between a plurality of people.

Data regarding psychology is, for example, data of findings obtained from previous experiments or verifications (for example, an attachment relationship between a mother and an infant, complexes such as an Oedipus complex, conditioned reflex, and fetishism).

Data regarding the humanities is, for example, data of a religious rule, custom, national characteristics, regional characteristics, and characteristic act, behavior, or utterance in a country or region. For example, the data is data such as data indicating, for example, consent by nodding without saying in words at the time of the consent in the case of Japanese people. The data regarding the humanities is, for example, data such as data indicating what is considered important and what is prioritized depending on the country or region.

Figure 6:
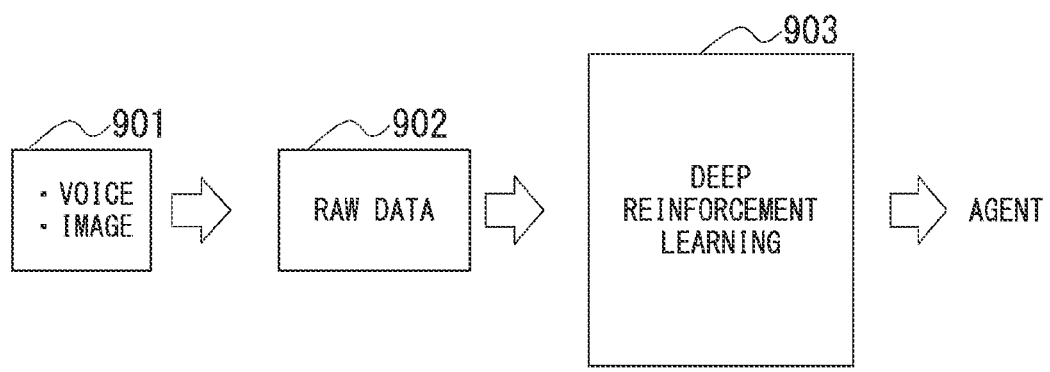
FIG. 6 is a diagram illustrating an example of a system that performs deep reinforcement learning using raw data in a comparative example.

FIG. 6 is a diagram illustrating an example of a system that performs deep reinforcement learning using raw data in a comparative example. In the comparative example, the deep reinforcement learning 903 needs to be performed when raw data 902 of each of a captured image 901 and a picked up acoustic signal 901 are used for learning. This system in the comparative example is difficult to implement. The reason is that it is necessary to collect enough teaching data for the deep reinforcement learning, but it is difficult to collect the teaching data. The reason for it being difficult to collect the teaching data is that the number of times necessary features appear in the raw data is limited.

For this reason, in the present embodiment, raw data (an audio signal and an image) is not directly used for learning, but a feature quantity is detected from the raw data and used for learning so that reinforcement learning can be performed instead of the deep reinforcement learning.

Figure 7:
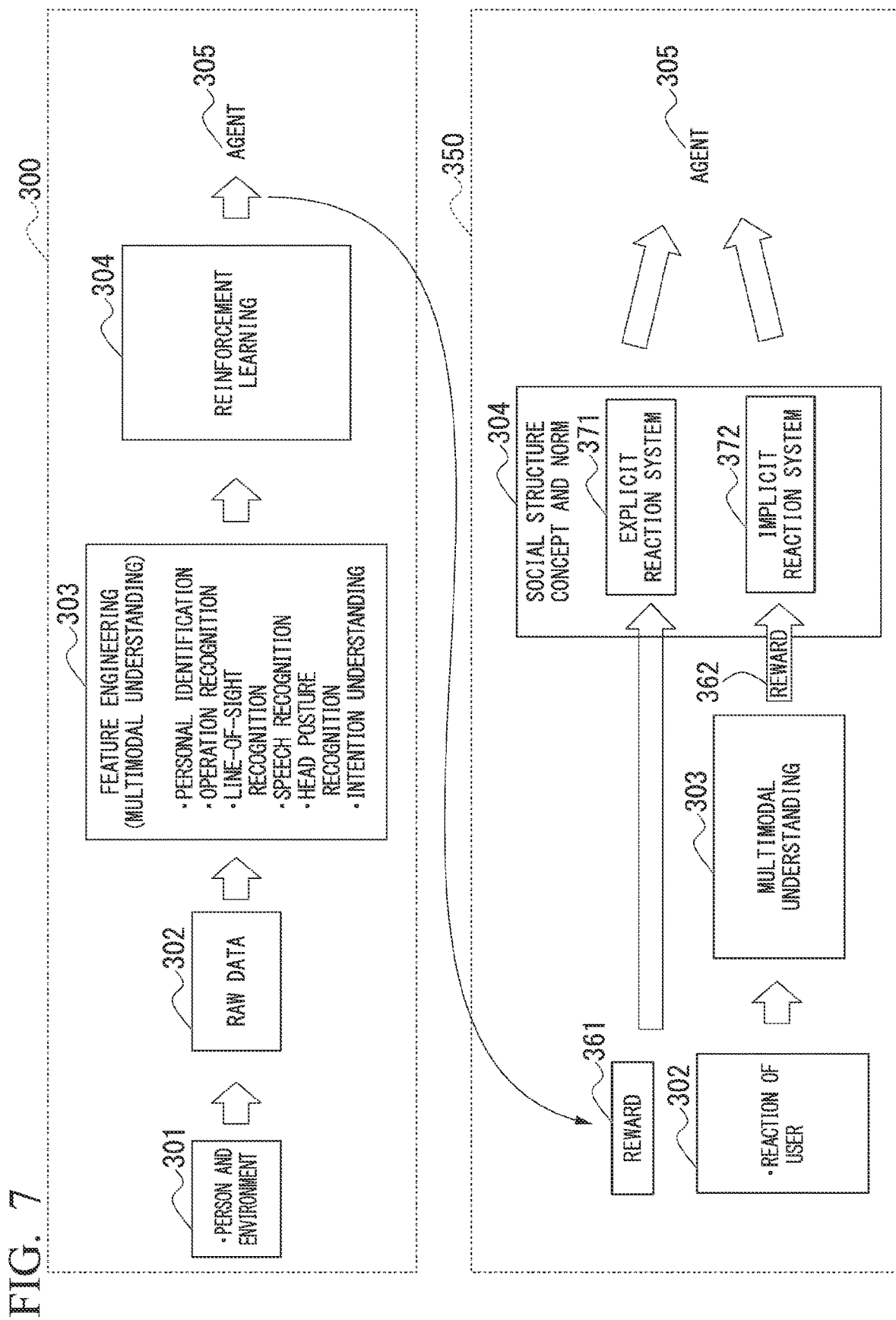
FIG. 7 is a diagram illustrating an example of an agent creation method that is used by an operation generation unit according to the embodiment.

FIG. 7 is a diagram illustrating an example of an agent creation method that is used by the operation generation unit 110 according to the present embodiment. An area indicated by reference sign 300 is a diagram illustrating a flow from an input to creation of an agent and an output (agent). The image captured by the imaging unit 102 and information 310 picked up by the sound pickup unit 103 are information on people (the user, related parties of the user, and others) and environmental information around people. Raw data 302 acquired by the imaging unit 102 and the sound pickup unit 103 is input to the perception unit 105.

The perception unit 105 extracts and recognizes a plurality of pieces of information (volume of the sound, intonation of the sound, utterance content, uttered words, a line of sight of the user, a head posture of the user, a direction of a face of the user, ecological information of the user, a distance between people, whether or not lines of sight of people intersect, or the like) from the input raw data 302. The perception unit 105 uses the plurality of pieces of extracted and recognized information to perform multimodal understanding using, for example, a neural network. The perception unit 105 identifies an individual on the basis of, for example, at least one of an audio signal and an image, and assigns identification information (ID) to the identified individual. The perception unit 105 perceives an action of each identified person on the basis of at least one of the audio signal and the image. The perception unit 105 recognizes a line of sight of the identified person by, for example, performing well-known image processing and tracking processing on the image. The perception unit 105 performs, for example, speech recognition processing (sound source identification, sound source localization, sound source separation, speech section detection, noise suppression, and the like) on the audio signal to recognize speech. The perception unit 105 performs, for example, well-known image processing on the image to recognize a head posture of the identified person. For example, when two persons are photographed in the captured image, the perception unit 105 perceives an interpersonal relationship on the basis of utterance content, a distance between the two persons in the captured image, and the like. The perception unit 105 perceives (estimates) a social distance between the communication robot 1 and the user, for example, according to a result of processing the captured image and the picked up audio signal.

The learning unit 108 performs reinforcement learning 304 instead of deep learning. In the reinforcement learning, learning is performed to select the most relevance (including a social structure or social norm). In this case, a plurality of pieces of information used in multimodal understanding are used for an input as features. An input to the learning unit 108 is, for example, raw data itself, name ID (identification information), an influence of a face, a recognized gesture, or a keyword from voice. An output of the learning unit 108 is a behavior of the communication robot. A behavior that is output may be anything desired to be defined according to a purpose, such as a voice response, a routine of the robot, or an angle of a direction in which the robot is to rotate. Further, in Marzmodal understanding, a neural network or the like may be used for detection. In this case, different modalities of the body may be used to detect activity of the human. Further, the feature to use may be selected in advance by the designer of the communication robot 1, for example. Further, in the present embodiment, it is possible to incorporate a social model or a social structure concept by using the implicit reward and the explicit reward at the time of learning. An output of the reinforcement learning result is an agent 305. Thus, in the present embodiment, the agent used by the operation generation unit 110 is created.

An area indicated by reference sign 350 is a diagram illustrating a reward use method. An implicit reward 362 is used to learn an implicit reaction. In this case, the raw data 302 includes a reaction of the user and is multimodal-understanded described above. The learning unit 108 generates an implicit reaction system 372 using the implicit reward 362 and the social model or the like stored in the second database 109. The implicit reward may be obtained by reinforcement learning or may be given by a person. Further, the implicit reaction system may also be a model that is acquired through learning.

For learning of an explicit reaction, for example, a human trainer evaluates the behavior of the communication robot 1 and gives a reward 361 according to a social structure or social norm that the human trainer knows. The agent adopts a behavior in which the reward is maximized, for an input. Accordingly, the agent adopts a behavior (an utterance and gesture) that maximizes positive emotion with respect to the user.

The learning unit 108 generates an explicit reaction system 371 using this explicit reward 361. The explicit reaction system may be a model that is acquired through learning. The explicit reward may be given by the user evaluating the behavior of the communication robot 1 or, on the basis of the utterance or behavior (a gesture, a facial expression, or the like) of the user, the communication robot 1 may estimate the reward, for example, on the basis of whether or not the behavior desired by the user has been taken. The learning unit 108 outputs the agent 305 using these learning models at the time of an operation.

In the present embodiment, the explicit reward, which is a reaction of the user, is prioritized over the implicit reward. This is because the reaction of the user is more reliable in communication.

<Example of Processing Procedure>

Figure 8:
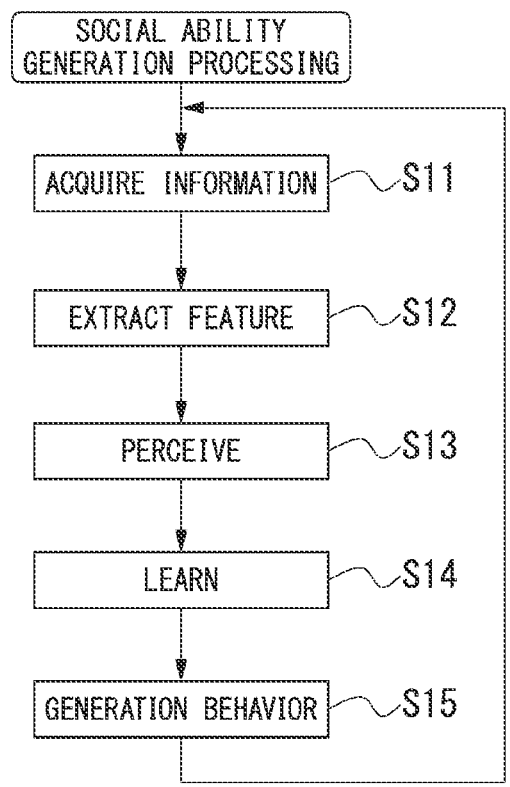
FIG. 8 is a flowchart illustrating an example of a procedure of social ability generation processing according to the embodiment.

Next, an example of a processing procedure will be described. FIG. 8 is a flowchart illustrating an example of a procedure of social ability generation processing according to the present embodiment.

(Step S11) The recognition unit 105 acquires the image captured by the imaging unit 102 and the acoustic signal picked up by the sound pickup unit 103.

(Step S12) The recognition unit 105 recognizes, detects, or extracts feature information on the voice from the acoustic signal, and recognizes, detects, or extracts feature information on the person from the image. The feature information on the voice is at least one of an audio signal, information on the volume of the sound, information on intonation of the sound, and a meaning of utterance. The feature information on the person is at least one of facial expression information of the person, information on gesture performed by the person, head direction information of the person, face direction information of the person, and line-of-sight information of the person.

(Step S13) On the basis of the acquired information and the data stored in the first database 107, the perception unit 105 perceives the action that occurs between the communication robot 1 and the person, or the action that occurs between the plurality of people.

(Step S14) The learning unit 108 uses the perception result output by the perception unit 105 and the data stored in the second database 109 to learn the emotional interaction of the human.

(Step S15) The operation generation unit 110 generates a behavior (an utterance, a gesture, or an image) for the user on the basis of the learning result and the acquired information.

<Communication Between Communication Robot 1 and Person>

Next, an example of communication between the communication robot 1 and the person will be described. An utterance timing of the communication robot 1 is set as an initial value, for example, at the time of return to home or at the time of waking up. By repeating communication, the communication robot 1 may learn a timing to start speaking. Alternatively, the communication robot 1 may start speaking according to the utterance or behavior of the user. In this case, the communication robot 1 does not start a conversation in response to a command used in a smart speaker or the like, perceives, for example, that the user is talking to the communication robot 1, the facial expression or face direction of the user (the face is looking at the communication robot 1, or the like), and a light in a room is turned on, and starts the conversation. Further, the communication robot 1 perceives, for example, content of the utterance of the user or the facial expression of the user, and ends the conversation. The communication robot 1 may switch between a start timing and an end timing of the utterance according to a social background of the user (including an age and a sex), attachment to the communication robot 1, and the like.

Figure 9:
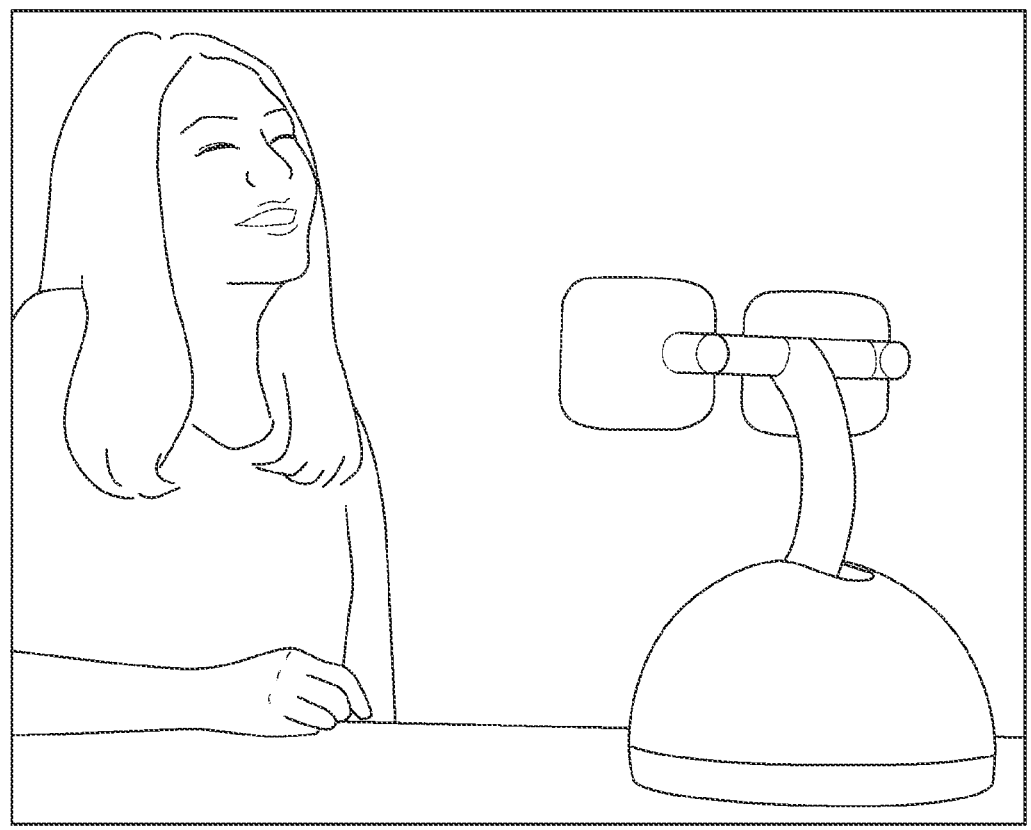
FIG. 9 is a diagram illustrating an example of communication between a communication robot and a user according to the embodiment.

An example of communication between the communication robot 1 and the user will be described using FIGS. 9 to 12. FIG. 9 is a diagram illustrating an example of the communication between the communication robot 1 and the user according to the present embodiment. The example of FIG. 9 shows a state in which the communication robot 1 talks to the user and a conversation with the user is being performed when the user comes home. At the time of communication, the communication robot 1 behaves (an utterance, gesture, and image presentation) to maintain a good relationship with people. The communication robot 1 drives a boom horizontal bar or the like using the drive unit 1103 and the actuator 113 to control the gesture.

Figure 10:
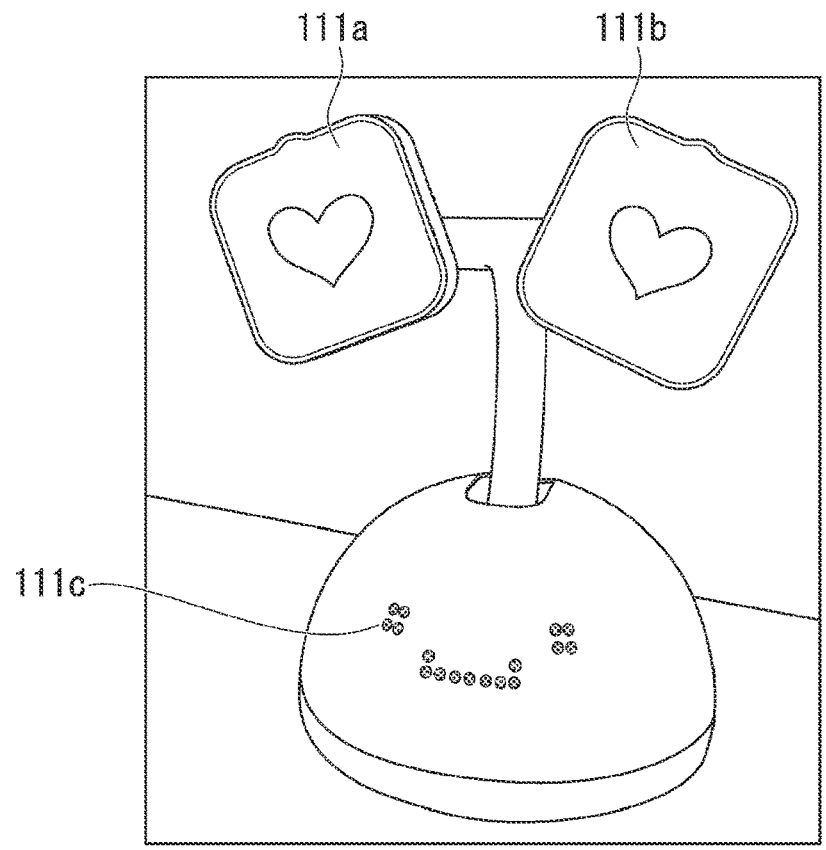
FIG. 10 is a diagram illustrating an example of an image that is displayed on a display unit at the time of communication between the communication robot and the user according to the embodiment.
Figure 11:
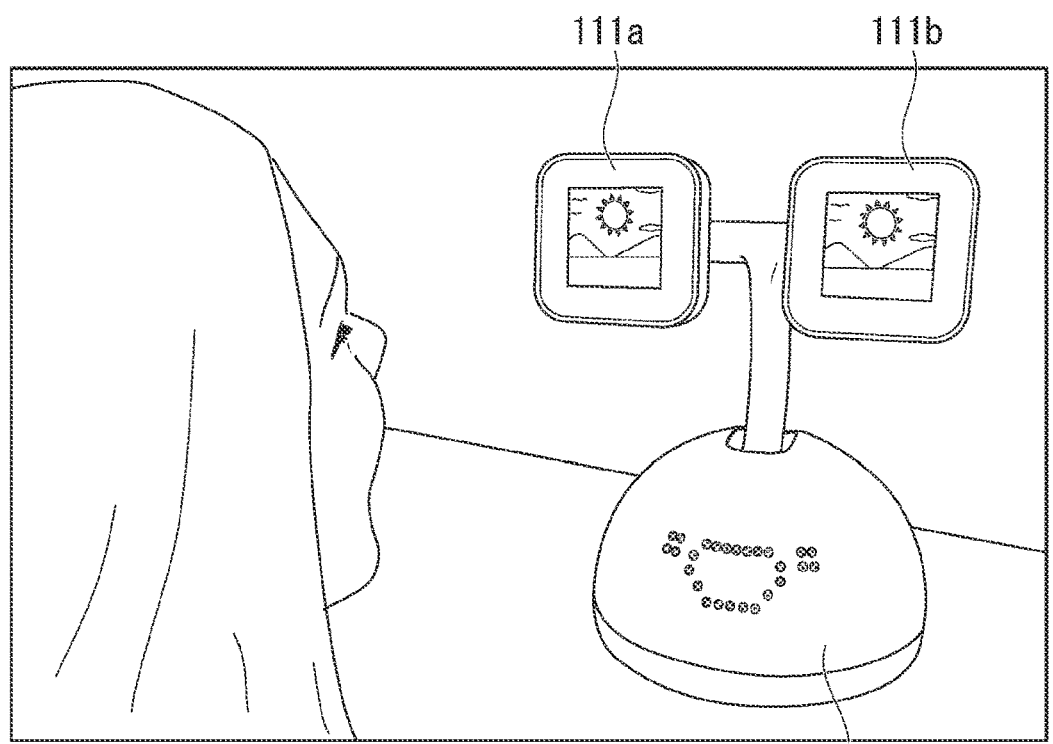
FIG. 11 is a diagram illustrating an example of an image that is displayed on the display unit at the time of communication between the communication robot and the user according to the embodiment.

FIGS. 10 and 11 are diagrams illustrating examples of an image that is displayed on the display unit at the time of the communication between the communication robot 1 and the user according to the present embodiment. The example of FIG. 10 is an example in which heart marks representing attachment are displayed in the display units 111a and 111b, and an image corresponding to an image of a smiling mouth is displayed in the display unit 111c. The example in FIG. 11 is an example in which an illustration depicting a place on a scheduled date and a weather forecast for that day are presented, and the weather forecast is spoken and read out by the speaker 112. Although the illustration depicting the place is presented in the example of FIG. 11, the communication robot 1 may acquire an image (a photograph or a moving image) of the scheduled place via the reception unit 101 and present the acquired image. Thus, the display unit 111 displays an image that maintains a relationship with the person as a good relationship by causing the person to perform a behavior for maximizing positive emotion. Thus, according to the present embodiment, it is possible to cause the person to perform a behavior for maximizing positive emotion, and maintain the relationship with the person in a good state.

Figure 12:
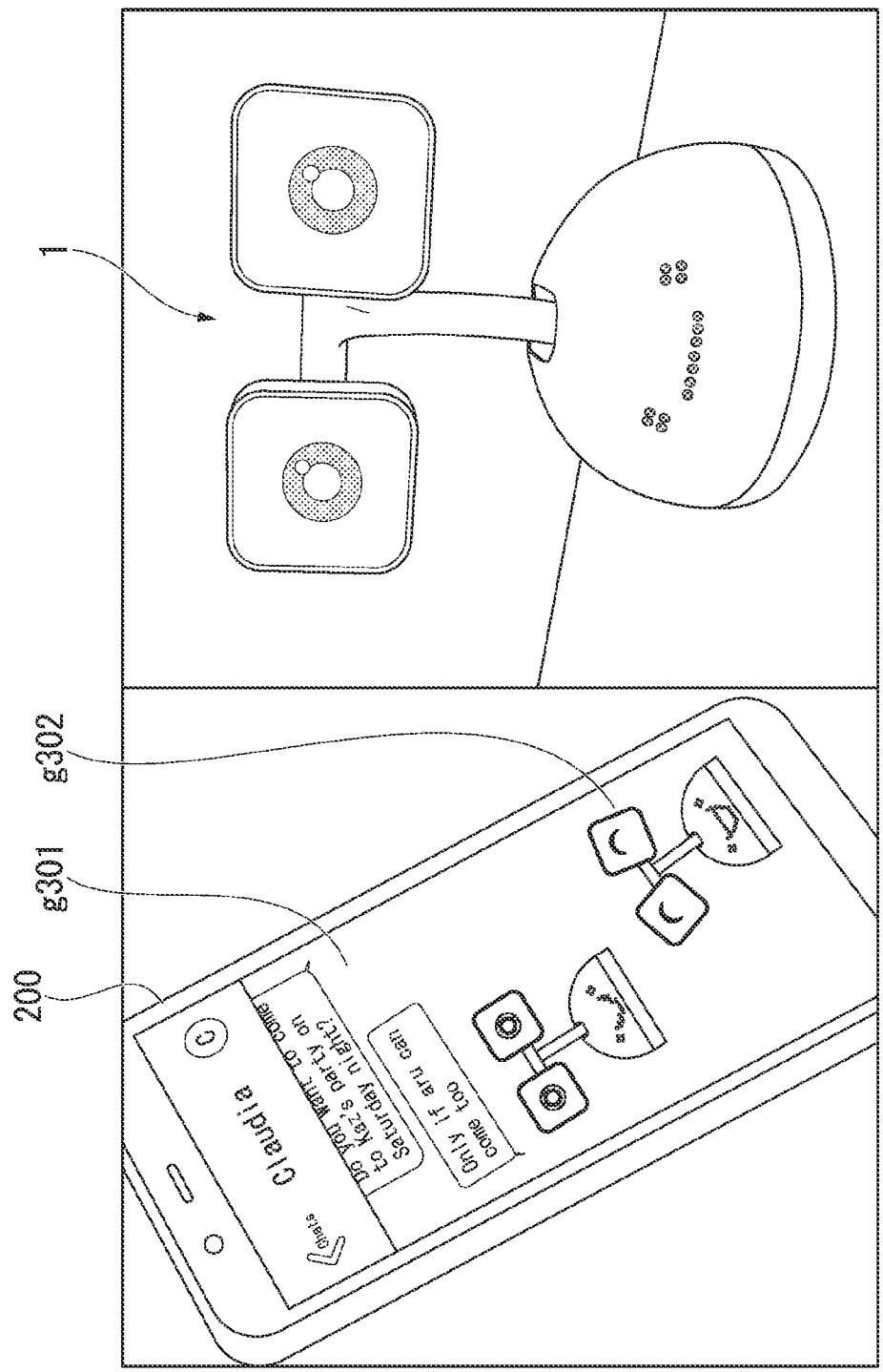
FIG. 12 is a diagram illustrating an example of communication of a communication robot at the time of communication with a friend of the user according to the embodiment.

FIG. 12 is a diagram illustrating an example of communication of the communication robot 1 at the time of communicating with the friend of the user according to the present embodiment. In the example of FIG. 12, the communication robot 1 transmits a message to the friend of the user through dialogue with the user. A terminal 200 owned by the friend of the user receives this message and displays the message on the display unit (g301). The terminal 200 transmits a reply g302 to the user to the communication robot 1 according to an operation result of the friend of the user. On the basis of the information received from the terminal 200, the communication robot 1 presents the reply from the friend of the user by an operation (an utterance, gesture, and image presentation).

In the above example, a case in which the communication robot 1 communicates with the user using a voice, operation (gesture), and image has been described, but the present invention is not limited thereto. In order to perform communication with the user, it is preferable for the communication robot 1 to use two or more output units, and two or more of a voice, an operation (gesture), and an image may be used. Alternatively, the output unit may be, for example, text and operation, text and voice, or the like. Further, it is preferable for the communication robot 1 to include a plurality of output unit not to bore the user.

Further, the input from the user to the communication robot 1 is not limited to the voice and the image described above. A behavior of the user can be acquired, and other information may also be acquired. The other information is, for example, contact information such as the user touching or hitting the communication robot 1.

As described above, in the present embodiment, the communication robot 1 perceives the action that occurs between the communication robot 1 and the person, or the action that occurs between the plurality of people. In the present embodiment, the emotional interaction of the human from the perceived content is learned from machine learning, psychology, social conventions, humanities, or the like, and the social ability of the robot is generated from the learned content. Further, in the present embodiment, in the learning, the explicit reward is used in addition to the implicit reward.

Accordingly, according to the present embodiment, it is possible to generate a social skill for the robot on the basis of an emotional interaction with the person. According to the present embodiment, it is possible to provide a social robot or agent in a home that nurtures a relationship with people. According to the present embodiment, it is possible to produce empathic communication and interaction between machine and a human. According to the present embodiment, it is possible to provide a concept of a "machine" friend, like a pet friend, or a robot friend. According to the present embodiment, it is possible to provide a machine that is socially intelligent and capable of navigating social scenarios. Thus, according to the present embodiment, it is possible to form an emotional connection between the robot and the person. Further, according to the present embodiment, because features are extracted from each of the picked up acoustic signal and the captured image, and the extracted features are used for reinforcement learning, it is possible to perform learning without using a lot of teaching data as in deep machine learning using raw data.

Modification Example

Although in the embodiment, the communication robot 1 has been described as an example of a device that performs communication, the present embodiment can also be applied to other devices such as an in-vehicle navigation device, a smartphone, or a tablet terminal. For example, when the present embodiment is applied to the smartphone, a still image of the communication robot 1 as illustrated in FIG. 3 may be displayed on a display unit of the smartphone so that voice communication is mainly performed. Alternatively, the gesture of the communication robot 1 may be displayed as an animation on the display unit of the smartphone.

Figure 13:
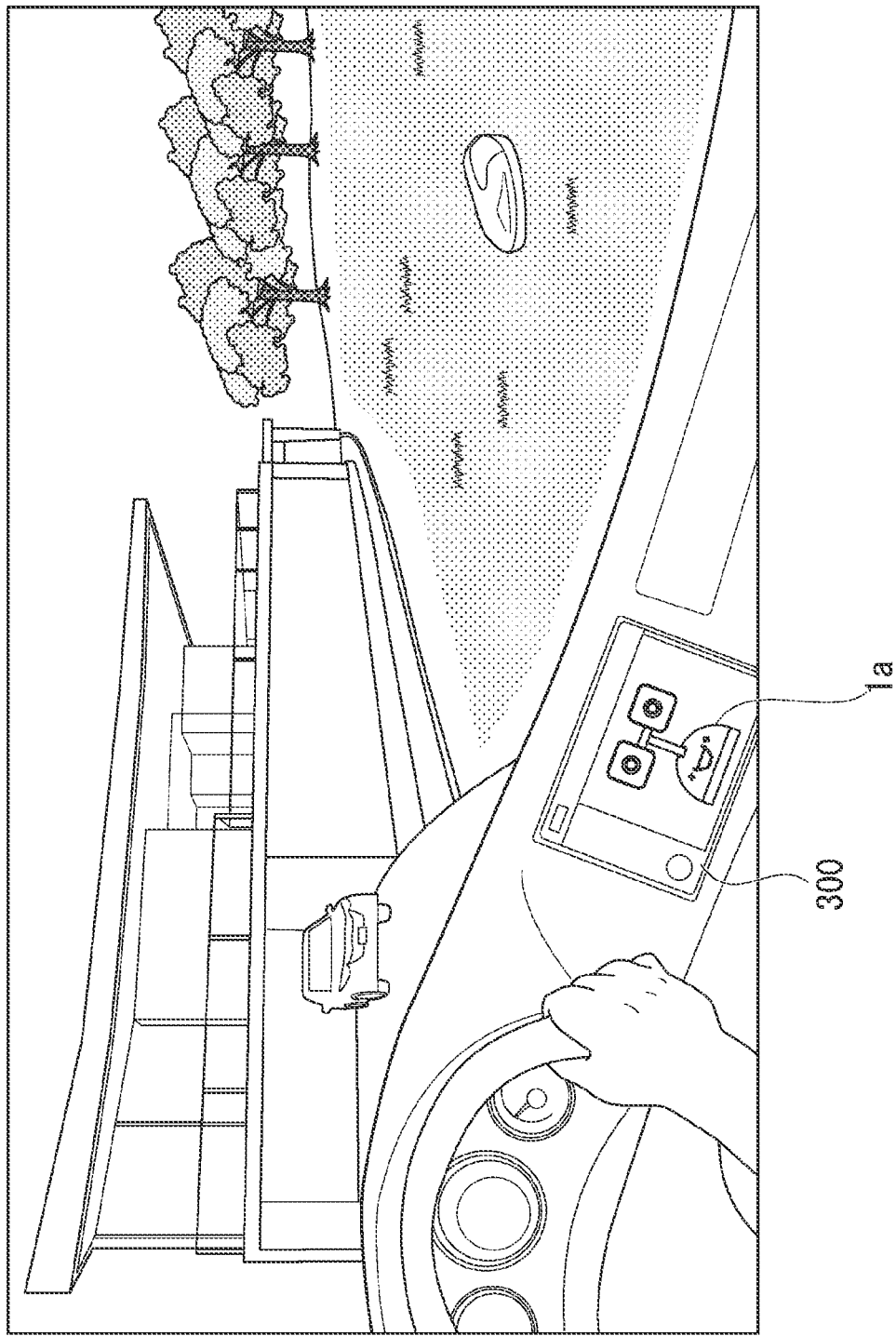
FIG. 13 is a diagram illustrating an example in which the communication robot of the embodiment is applied to an in-vehicle car navigation system.

FIG. 13 is a diagram illustrating an example in which the communication robot of the present embodiment is applied to a car navigation system 300 inside a vehicle. The car navigation system 300 may be a smartphone, a tablet terminal, or the like. The car navigation system 300 displays an image of the communication robot on the display unit. In this case, the communication robot operates as an agent. The agent realizes functions (excluding the drive unit, actuator, or the like) of the communication robot 1 by using the imaging unit, the sound pickup unit, the display unit, the speaker, or the like included in the car navigation system 300.

When the communication robot is applied to the car navigation system 300, the communication robot displayed on the display unit may be a still image or may be an animation. In this case, the agent performs at least voice dialogue as a response. In this case, at the time of communication, the agent acts (the utterance, gesture, and image presentation) to maintain a good relationship with the person.

Figure 14:
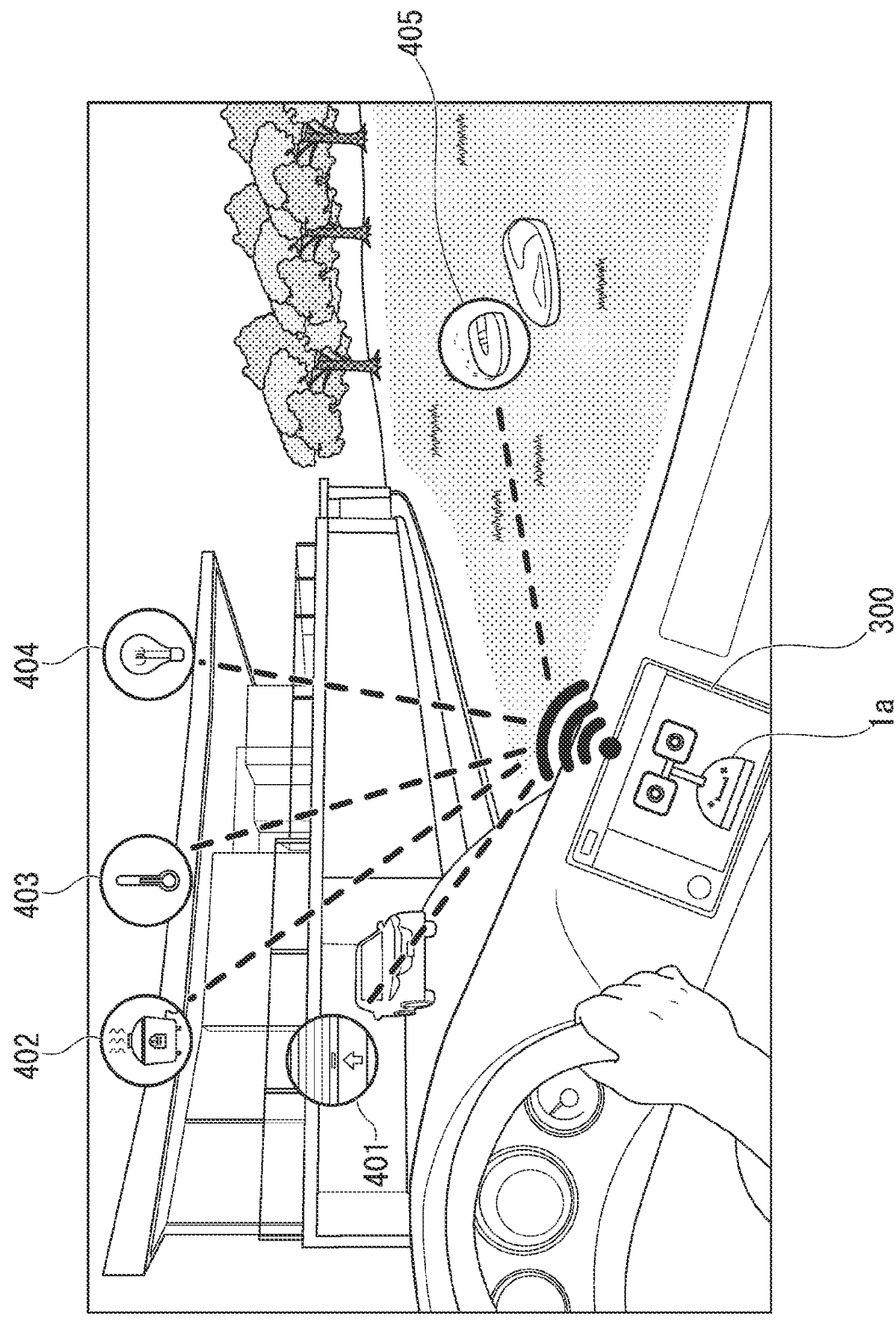
FIG. 14 is a diagram illustrating an example of connection to various devices in a home when the communication robot is applied to a car navigation according to the embodiment.

FIG. 14 is a diagram illustrating an example of connection to various devices in a home when the communication robot is applied to the car navigation according to the present embodiment. In FIG. 14, the car navigation system 300 may be a smartphone, a tablet terminal, or the like. It is assumed that the car navigation system 300 includes a communication unit (a reception unit and a transmission unit), and respective devices at home are connected via a network. The agent applied to the car navigation system 300 performs, for example, opening and closing a shutter of a parking lot 401, instructing to start an operation of a rice cooker 402, instructing an air conditioner to start operating or instructing to set a temperature or the like 403, an instruction to start turning on lights in a room or the like 404, or an instructing to start an operation of an automatic lawn mower 405 in response to communication with the user. The agent may not simply give an operation instruction, but may learn, by a communication, a time on which the user plans to return home, a preferred temperature setting of the user and a preferred brightness setting of a room of the user in response to an utterance of the user, and perform an optimal timing or setting instruction so that these tasks end when the user returns home, on the basis of a result of the learning.

Overview of Second Embodiment

Figure 15:
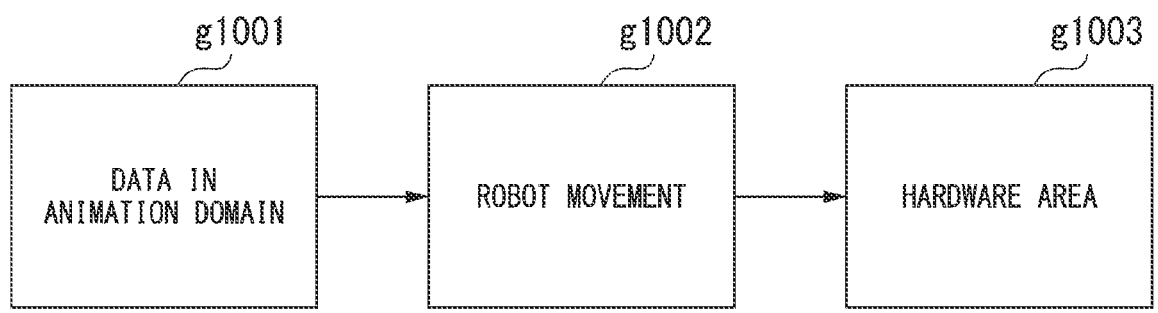
FIG. 15 is a diagram illustrating an overview of the embodiment.

First, an overview of the present embodiment will be described. FIG. 15 is a diagram illustrating an overview of the present embodiment. In the present embodiment, the data in the animation domain g1001 is converted into an operation of the robot (g1002), and the robot executes converted hardware area (robot domain) data g1003, thereby causing the robot to perform an animation-like operation. In the operation conversion, a trajectory of a movement of a joint (hereinafter referred to as a joint trajectory) is converted while a shape of the joint is being maintained.

<Example of Configuration of Robot 1001>

Figure 16:
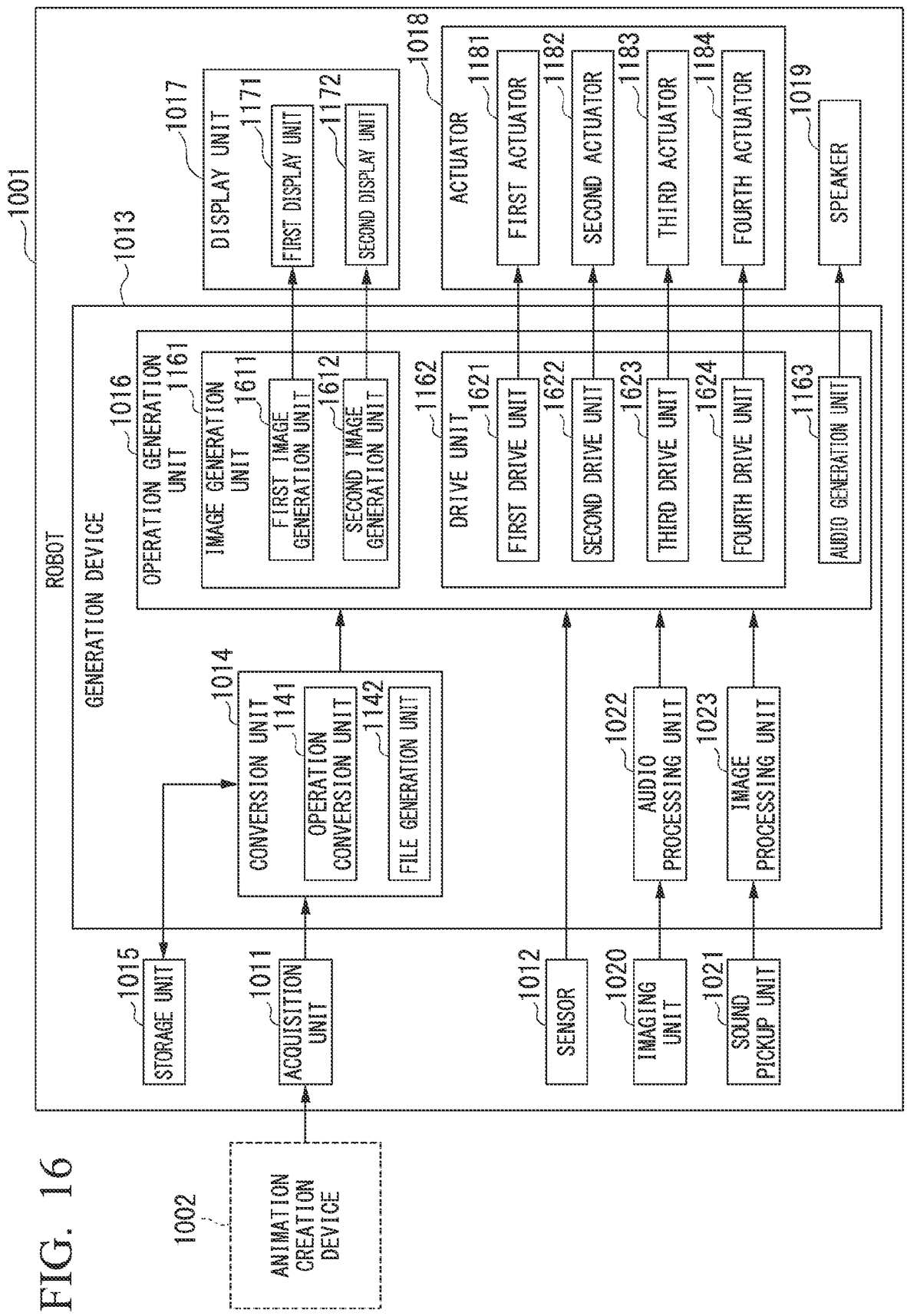
FIG. 16 is a block diagram illustrating an example of a configuration of a robot according to the embodiment.

Next, an example of a configuration of the robot 1001 will be described. FIG. 16 is a block diagram illustrating an example of a configuration of the robot 1001 according to the present embodiment. As illustrated in FIG. 16, the robot 1001 includes an acquisition unit 1011, a sensor 1012, a generation device 1013 (robot operation generation device), a storage unit 1015, a display unit 1017, an actuator 1018, a speaker 1019, an imaging unit 1020, a sound pickup unit 1021, an audio processing unit 1022, and an image processing unit 1023.

The generation device 1013 includes a conversion unit 1014 and an operation generation unit 1016. The conversion unit 1014 includes an operation conversion unit 1141 and a file generation unit 1142. The operation generation unit 1016 includes an image generation unit 1161, a drive unit 1162, and an audio generation unit 1163. The image generation unit 1161 includes a first image generation unit 1611 and a second image generation unit 1612. The drive unit 1162 includes a first drive unit 1621, a second drive unit 1622, a third drive unit 1623, and a fourth drive unit 1624.

The display unit 1017 includes a first display unit 1171 and a second display unit 1172. The actuator 1018 includes a first actuator 1181, a second actuator 1182, a third actuator 1183, and a fourth actuator 1184.

<Functions and Operations of the Robot 1001>

Next, functions and operations of each functional unit of the robot 1001 will be described with reference to FIG. 16. The animation creation device 1002 creates animation data on the basis of an operation of a worker. The animation creation device 1002 is, for example, a personal computer.

The acquisition unit 1011 acquires animation data which is an operation instruction with respect to the robot 1001 from the animation creation device 1002. The animation data includes operation data, data of a movement of an eye, data of a movement of a mouth, and an audio signal, as will be described below. The acquisition unit 1011 outputs the animation data to conversion unit 1014.

The sensor 1012 is a gyro sensor that detects an inclination of the housing of the robot 1001, an acceleration sensor that detects a movement of the housing of the robot 1001, or the like. The sensor 1012 outputs the detected detection value to the operation generation unit 1016.

The imaging unit 1020 includes, for example, a Complementary Metal Oxide Semiconductor (CMOS) imaging device or a Charge Coupled Device (CCD) imaging device. The imaging unit 1020 corresponds to the eyes and includes two left and right imaging units 1020a and 1020b (FIG. 17). The imaging unit 1020 outputs a captured image (a still images, continuous still images, or a moving image) to the image processing unit 1023.

The sound pickup unit 1021 is, for example, a microphone array configured of a plurality of microphones. The sound pickup unit 1021 outputs acoustic signals picked up by the plurality of microphones to the audio processing unit 1022. The sound pickup unit 1021 corresponds to an ear. The sound pickup unit 1021 may sample each acoustic signal picked up by the microphone with the same sampling signal, convert an analog signal into a digital signal, and then output the digital signal to the audio processing unit 1022.

The audio processing unit 1022 performs audio processing (for example, audio section detection processing, noise suppression processing, sound source identification processing, speech recognition processing, feature quantity extraction, or the like) on the acoustic signal picked up by the sound pickup unit 1021. When the acoustic signal includes a plurality of sound sources, the audio processing unit 1022 performs audio processing on each sound source. The audio processing unit 1022 outputs (an extracted acoustic signal for each sound source including) a result of the audio processing to the operation generation unit 1016.

The image processing unit 1023 performs image processing (for example, binarization processing, edge detection processing, feature quantity extraction processing, or clustering processing) on the image captured by the imaging unit 1020. The image processing unit 1023 outputs a result of image processing to the operation generation unit 1016.

The generation device 1013 converts the acquired animation data into the behavior of the robot 1001 and generates the operation of the robot 1001.

The conversion unit 1014 converts the acquired animation data into the operation of the robot 1001 and generates data (file) in a robot domain.

The operation conversion unit 1141 converts operation data included in the animation data into data of the operation of the robot 1001. The animation data, a conversion method, output data, and the like will be described below.

The file generation unit 1142 integrates the data of a movement of an eye, the data of a movement of a mouth, and the audio signal included in the animation data, and data of the operation of the robot 1001 converted by the operation conversion unit 1141 to generate a phenotypic routine file. The file generation unit 1142 stores the data of a movement of an eye, the data of a movement of a mouth, the audio signal, and the generated phenotypic routine file in the storage unit 1015.

The first image generation unit 1611 generates first image information corresponding to an operation of the eyes on the basis of first image data output by the conversion unit 1014.

The second image generation unit 1612 generates second image information corresponding to an operation of a mouth on the basis of the second image data output by the conversion unit 1014.

The first drive unit 1621 generates a first drive signal corresponding to a rotational operation of a part equivalent to the body, on the basis of the first drive data output by the conversion unit 1014.

The second drive unit 1622 generates a second drive signal corresponding to a tilting operation of a part equivalent to a neck on the basis of second drive data output by the conversion unit 1014.

The third drive unit 1623 generates a third drive signal corresponding to a tilting operation of a part equivalent to an eye on the basis of third drive data output by the conversion unit 1014.

The fourth drive unit 1624 generates a fourth drive signal corresponding to a rotational operation of a part equivalent to the eye on the basis of fourth driving data output by the conversion unit 1014.

The audio generation unit 1163 generates an output audio signal on the basis of audio data output by the conversion unit 1014.

The storage unit 1015 stores a conversion equation used for conversion, a threshold value, a constant, programs necessary for control of the robot 1001, and the like.

The first display unit 1171 is a display unit corresponding to the eyes, and is a liquid crystal image display device, an organic Electro Luminescence (EL) image display device, or the like. The first display unit 1171 displays an image corresponding to an operation of the eyes on the basis of the first image information output by the first image generation unit 1611. The first display unit 1171 has two first display units 1171a and 1171b (FIG. 17) on the left and right sides.

The second display unit 1172 is a display unit corresponding to the mouth, and is, for example, a light emitting diode (LED) or a surface emitting diode. The second display unit 1172 turns on and off the LEDs to correspond to the operation of the mouth on the basis of second image information output by the second image generation unit 1612.

The first actuator 1181 rotates, for example, a part (boom; see FIG. 17) equivalent to the body around the base portion in response to the first drive signal output by the first drive unit 1621.

The second actuator 1182 tilts a part equivalent to the neck, for example, forward and backward according to a second drive signal output by the second drive unit 1622.

The third actuator 1183 tilts a part equivalent to the eye, for example, up and down according to a third drive signal output by the third drive unit 1623.

The fourth actuator 1184, for example, rotates the part equivalent to the eye according to a fourth drive signal output by the fourth drive unit 1624.

The speaker 1019 outputs an output audio signal output by the audio generation unit 1163.

<Example of Appearance of Robot 1001>

Next, an example of an appearance of the robot 1001 will be described.

FIG. 17 is a diagram illustrating an example of the appearance of the robot 1001 according to the present embodiment. In an example of a front view g1005 and a side view g1007 of FIG. 17, the robot 1001 includes three display units 1017 (a first display unit 1171a, a first display unit 1171b, and a second display unit 1172).

Further, in the example of FIG. 17, the imaging unit 1020a is attached to an upper portion of the first display unit 1171*a*, and the imaging unit 1020*b* is attached to an upper portion of the first display unit 1171*b*. The speaker 1019 is attached near the second display unit 1172 that displays an image corresponding to a human mouth in the housing 1121. The sound pickup unit 1021 is attached to the housing 1121.

Further, the robot 1001 also includes a base portion 1120, a boom 1122, and a horizontal bar 1123. The housing 1121 is rotatably attached to the base portion 1120 via (the first actuator 1181 including) a movable portion 1191. The boom 1122 is movably attached to the housing 1121 via (the second actuator 1182 including) a movable portion 1192. The horizontal bar 1123 is rotatably attached to the boom 1122 via (the third actuator 1183 including) a movable portion 1193. The first display unit 1171*a* is rotatably attached to the horizontal bar 1123 via (the fourth actuator 1184 including) a movable portion 1194*a*. The first display unit 1171*b* is rotatably attached to the horizontal bar 1123 via (the fourth actuator 1184 including) a movable portion 1194*b*.

An appearance of the robot 1001 illustrated in FIG. 17 is an example, and is not limited thereto. The robot 1001 may be, for example, a bipedal robot having two operatable legs.

Figure 18:
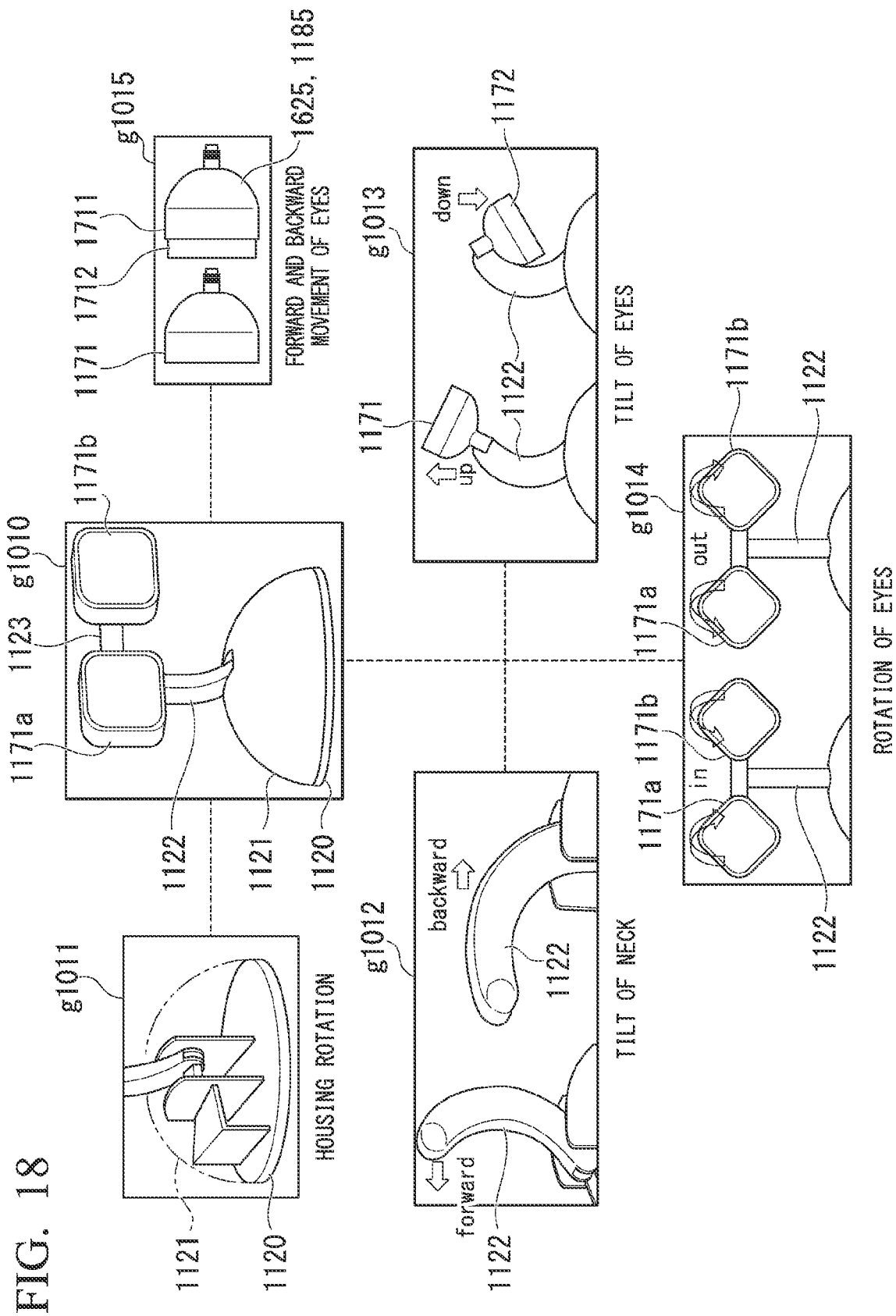
FIG. 18 is a diagram illustrating an operation example of each movable portion of the robot according to the embodiment.

Next, an operation example of each movable portion of the robot 1001 will be described. FIG. 18 is a diagram illustrating an operation example of each movable portion of the robot 1001 according to the present embodiment. A diagram of an area indicated by reference sign g1010 represents an initial state of the robot 1001, for example. A movable range of the housing 1121 with respect to the base portion 1120 is, for example, 320 degrees (g1011). A movable range of the boom 1122 with respect to the housing 1121 is, for example, 57 degrees (g1012). The boom 1122 can be tilted forward and backward. A movable range of inclination of the horizontal bar 1123 with respect to the boom 1122 is, for example, 57 degrees (g1013). The horizontal bar 1123 can be tilted so that the first display unit 1171 equivalent to the eyes is directed upward or is directed downward. The first display unit 1171 is rotatable with respect to the horizontal bar 1123 (g1014). The first display unit 1171 (the first display unit 1171*a* and the first display unit 1171*b*) can be rotated inward or can be rotated outward.

Further, the first display unit 1171 may include a first portion 1711 and a second portion 1712 (g1015). In this case, in the robot 1001, the drive unit 1162 may further include a fifth drive unit 1625, and the actuator 1018 may include a fifth actuator 1185 (g1015). Accordingly, an eye popping operation, which is one of operations peculiar to the animation, may be realized by controlling the second part 1712 so that the second part 1712 is extended. Alternatively, an eye pulling operation may be realized by controlling the second part 1712 so that the second part 1712 is pulled.

<Data in Animation Domain, Conversion, Data in Robot Domain>

Next, the data in the animation domain, the conversion, and the data in the robot domain will be described. In the present embodiment, a principle of animation is used to define expressive power of the robot 1001. Each representation is a combination of a movement and a moving image for eyes of the robot 1001, audio for the mouth, and a sequence of LEDs for a movement of a mouth. Because a domain of the animation and a domain of the robot are different, conversion between both is necessary around the movement of the robot. A principle and results of the animation need to be applied to different robot operations with different dynamic and kinematic properties. It is necessary to maintain synchronization of visual elements and movements.

Figure 19:
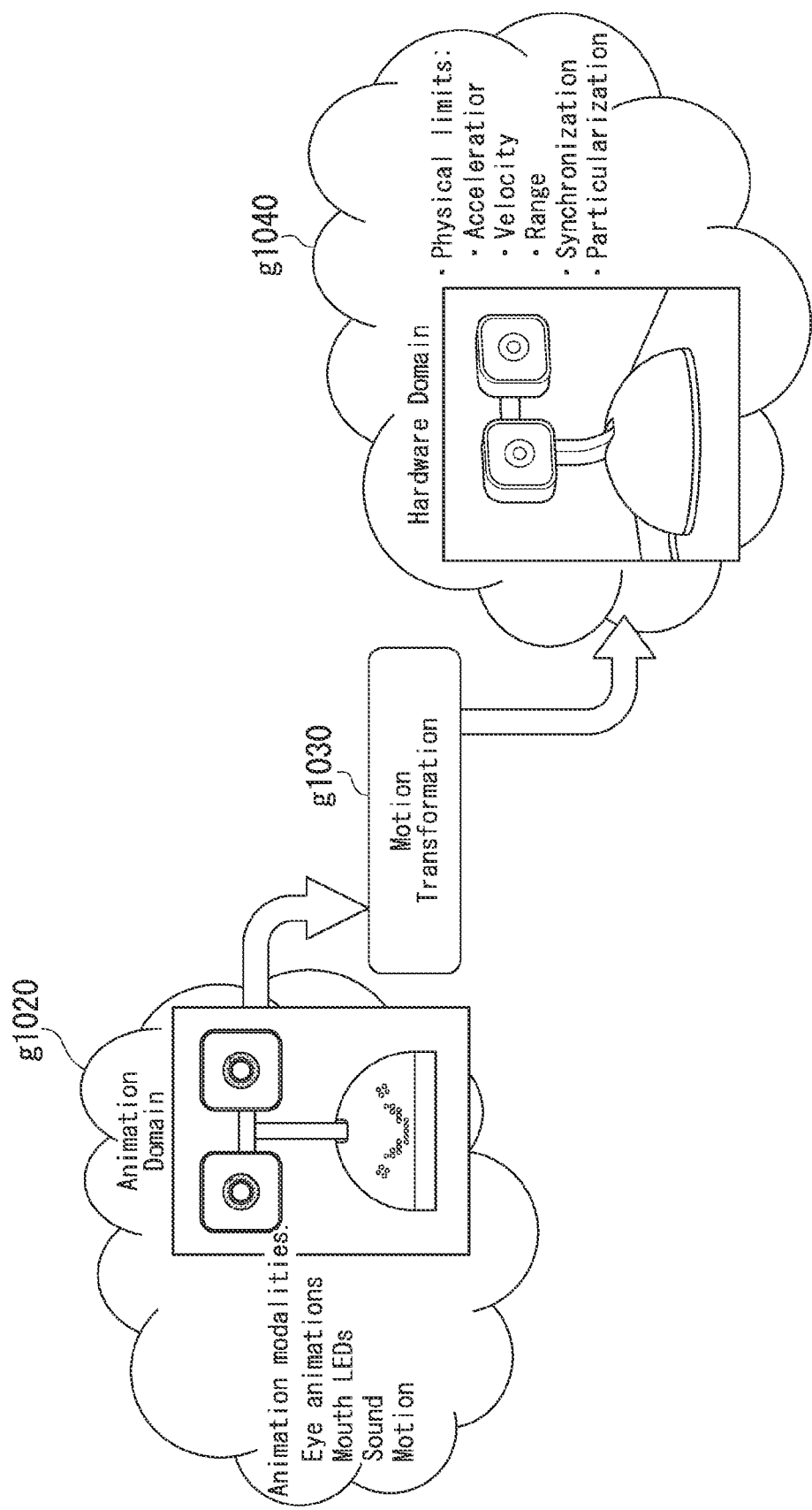
FIG. 19 is a diagram illustrating a condition of data in an animation domain and a condition of data in a robot domain according to the embodiment.

FIG. 19 is a diagram illustrating a condition g1020 of the data in the animation domain and a condition g1030 of the data in the robot domain according to the present embodiment.

First, the condition g1020 of the data in the animation domain will be described.

The worker creates the operation of the robot 1001 in the animation domain using, for example, a personal computer. The created animation data consists of operations and audiovisual elements. Further, the animation data includes information indicating operating parts and trajectories of the operations.

Although it is preferable for the worker to design the operation after understanding the kinematics of the robot to some extent, there is no need to worry about a physical operation of the robot when creating animations.

Further, audiovisual modalities are irrelevant to a robot operation. However, in the present embodiment, a constraint that "audiovisual elements are kept uniform between changes in a direction of a movement" is set so that a relevance is established between both.

The operation conversion unit 1141 converts the animation data into final operation data of the robot while satisfying all limitations in an operation of the robot and maintaining synchronization with the audiovisual elements.

A condition g1040 of the data in the robot domain is characterized by dynamic and kinematic limitations and specific characteristics of each robot.

Figure 20:
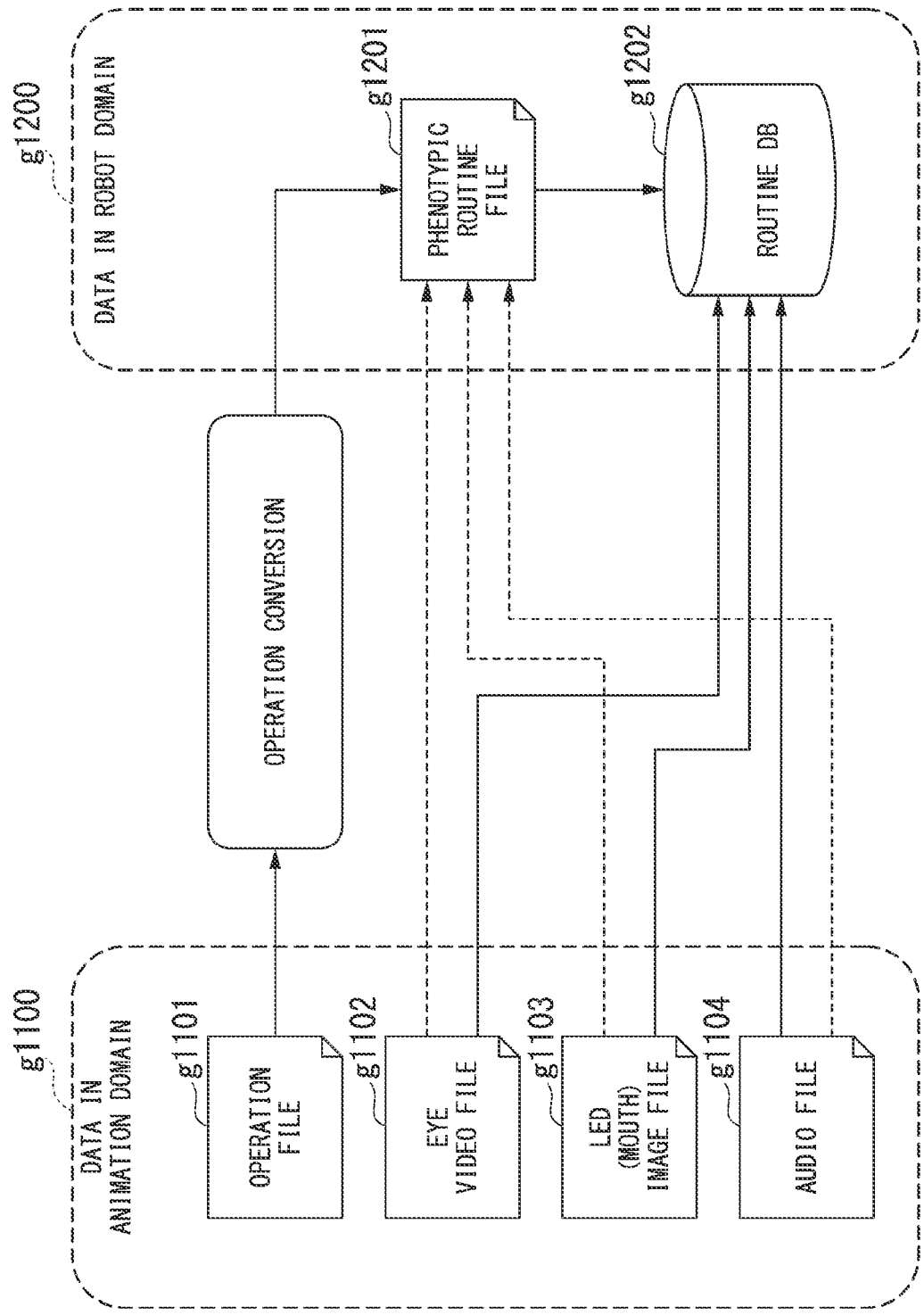
FIG. 20 is a diagram illustrating the data in the animation domain and the data in the robot domain according to the embodiment.

FIG. 20 is a diagram illustrating the data in the animation domain and the data in the robot domain according to the present embodiment.

Data in the animation domain (animation data) g1100 includes an operation file g1101 for each joint, an eye video file g1102, an LED (mouth) image file g1103, and an audio file g1104. The operation file g1101 for each joint includes operation data of each portion based on a specification of the robot 1001. The operation data of each portion includes, for example, rotation of a body, tilt of a neck, motion of an eyeball, tilt of a part of the eye, and a forward and backward movement of the part of the eye.

The data in the robot domain g1200 includes a phenotypic routine file g1201 (for example, a JSON format file), and a routine database (DB) g1202. The phenotypic routine file g1201 and the routine database (DB) g1202 are stored in the storage unit 1015 (FIG. 16). Further, the phenotypic routine file g1201 includes the data of a movement of an eye, the data of a movement of a mouth, and the audio signal included in the animation data, and data of the operation of the robot subjected to operation conversion. Further, the routine DB g1202 stores the data of a movement of an eye, the data of a movement of a mouth, and the audio signal included in the animation data, and phenotypic routine file g1201.

The data of a movement of an eye, the data of a movement of a mouth, and the audio signal included in the animation data, and the data of the operation of the robot subjected to operation conversion are synchronized at the timing of the zero crossing point. Thus, according to the present embodiment, synchronization of operations with multimedia elements is not lost.

<Conversion Method>

Next, an example of a conversion method that is performed by the operation conversion unit 1141 will be described.

The conversion unit 1014 confirms whether an animated trajectory conforms to actual dynamics of the robot 1001 (obtained by calibration).

The operation conversion unit 1141 converts the operation so that dynamic constraints of the robot 1001 are satisfied, and at the same time, synchronization of an operation with multimedia elements (image information for LEDs of eyes and mouth and audio signals to be output from a speaker) is not lost. In the conversion, the operation conversion unit 1141 deforms the joint trajectory while maintaining the shape of the joint, and maintains the temporal moment of change in the direction of the joint. Accordingly, synchronization of the operation with a multimedia element is not lost. The change in direction is a portion of the trajectory that corresponds to potential change in an audiovisual portion for representation.

Figure 21:
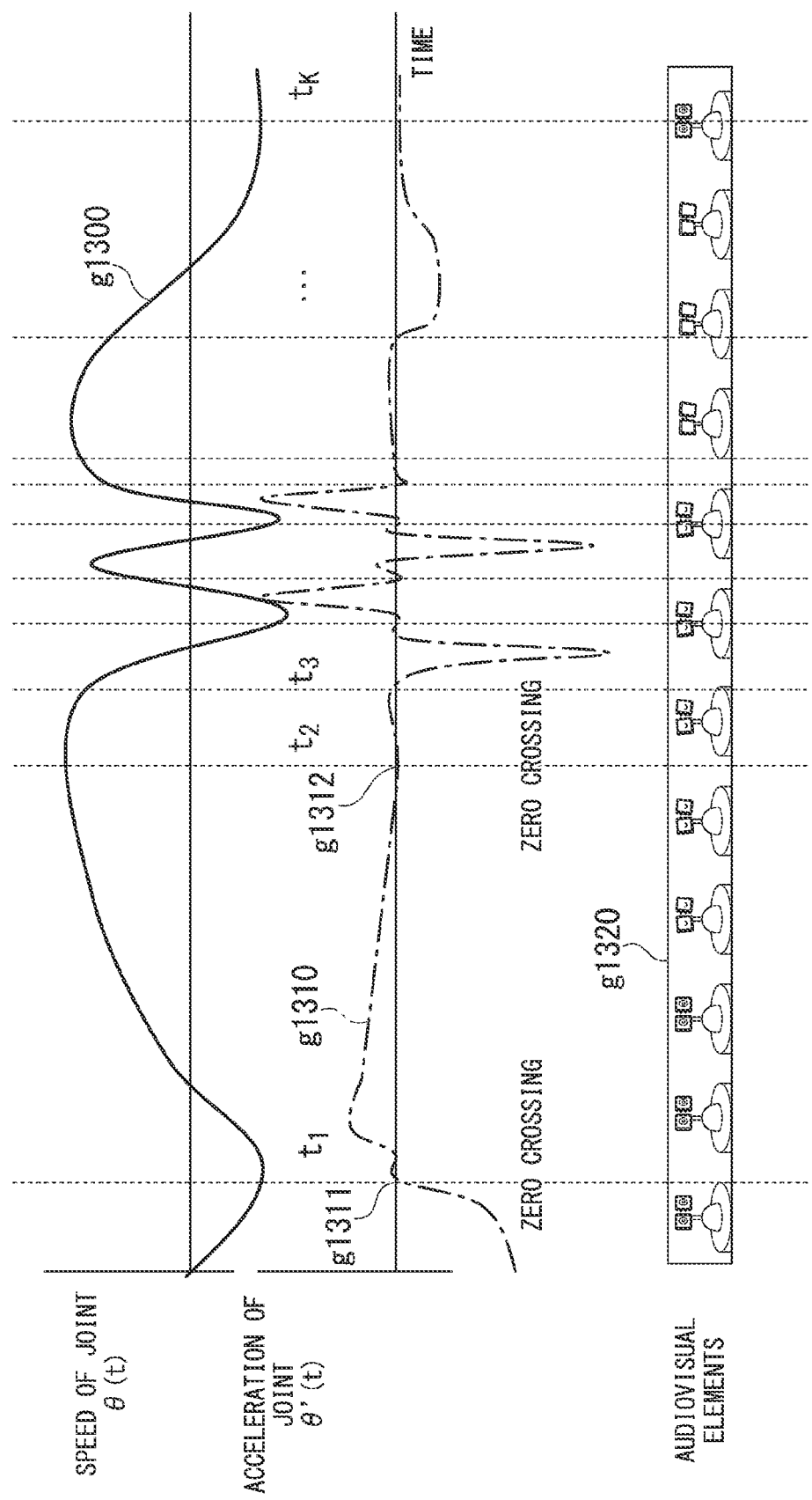
FIG. 21 is a diagram illustrating an example of change in joint trajectory, velocity profile, and audiovisual elements for each time according to the embodiment.

FIG. 21 is a diagram illustrating an example of temporal change in joint trajectory, velocity profile, and audiovisual element for each time according to the present embodiment.

In FIG. 21, a horizontal axis indicates time. A curve g1300 is a joint trajectory θ(t) in the animation. A curve g1310 is a velocity θ'(t) profile of the joint trajectory. Zero crossing points (for example, a point g1311 at time $t_1$ and a point g1312 at time $t_2$) of the velocity in the velocity profile are important in the conversion. An image g1320 is an audiovisual element for each time in the animation data. Although FIG. 21 illustrates one joint trajectory and velocity profile, the operation conversion unit 1141 performs processing for each joint.

The operation conversion unit 1141 differentiates a trajectory of acquired animation data to generate a velocity profile. The operation conversion unit 1141 uses the generated velocity profile to detect a zero crossing point of the velocity of the joint. This method preserves these temporal moments. The operation conversion unit 1141 maintains the zero crossing point and performs scaling using Equation (9) below such that a limits of a velocity $v_{i,max}$ and an acceleration $a_{i,max}$ in the robot domain of a known profile of the robot 1001 is respected, to correct the joint trajectory $θ_i(t)$ and convert a new trajectory $η_i(t)$.

$$η_i(t) = T[θ_i(t)]$$

$$|η_i'(t)| < v_i,\text{max}$$

$$|η_i''(t)| < α_i,\text{max}$$

$$∀t_k | θ_i'(t_k) = 0 ⇒ η_i'(t_k) = 0 \quad \text{[Math. 4]}$$

In Equation (9), T is a conversion function, $η'_i(t)$ is a velocity in the robot domain, and $η''_i(t)$ is an acceleration in the robot domain. Further, an expression $∀t_k|θ'_i(t)$ on the fourth line in Equation (9) represents scaling. Further, the subscript $_i$ represents each joint.

In creating animation, workers have a basic idea of kinematics, but the workers don't have to follow this completely and are free to be more creative. It is not necessary to change the animation by using scaling. The operation conversion unit 1141 reflects a scaling result on the hardware through conversion.

An initial joint trajectory $θ_i(t)$ is temporally discretized. A portion satisfying constraints means that a physical limit of hardware of the robot 1001 is not exceeded. For this reason, the conversion unit 1014 causes the portion satisfying the constraint to operate as instructed by the animation data. The conversion unit 1014 applies the conversion to a portion not satisfying the constraints. Thus, a change in direction of motion and a duration of an overall motion are kept in sync with the rest of the operation of the robot 1001. A different conversion function T is obtained for each joint i.

Thus, in the present embodiment, data of a zero crossing point for each joint is converted from data in the animation domain to data in the robot domain. Further, in the present embodiment, the scaling is performed at the time of the conversion. Accordingly, according to the present embodiment, because operations are synchronized at the zero crossing point, it is possible to guarantee that a shape is maintained. As a result, according to the present embodiment, it is possible to maintain a temporal moment of change in the direction of the joint by deforming the joint trajectory while maintaining the shape of the joint.

<Example of Processing Procedure>

Next, an example of a processing procedure that is performed by the generation device 1013 will be described.

Figure 22:
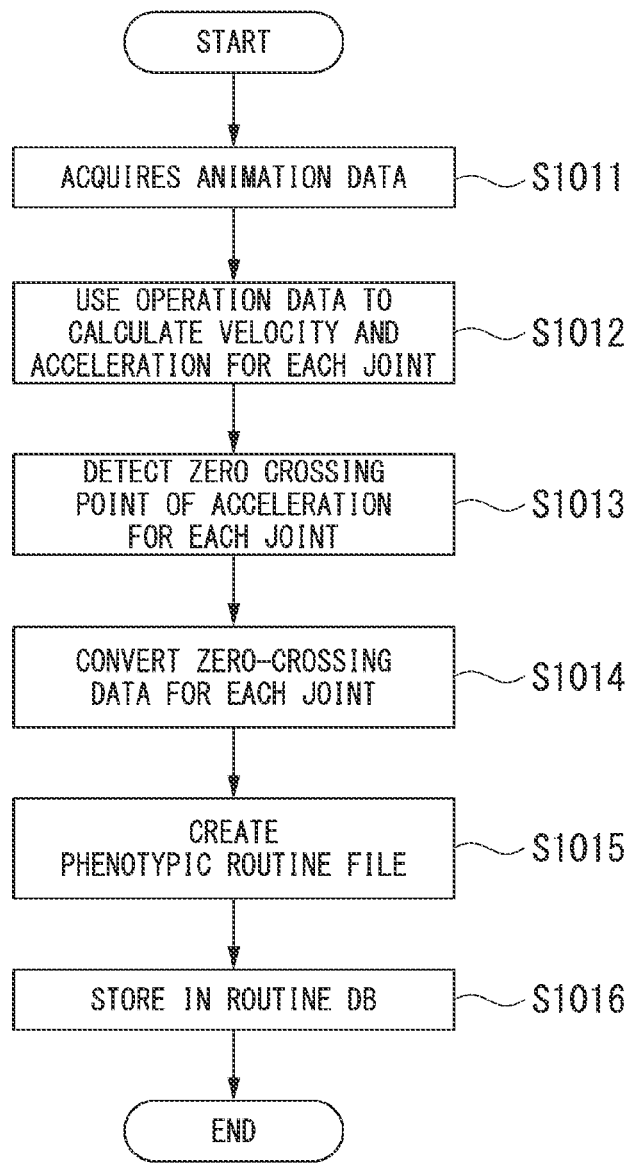
FIG. 22 is a flowchart of processing that is performed by a generation device according to the embodiment.

FIG. 22 is a flowchart of processing that is performed by the generation device 1013 according to the present embodiment.

(Step S1011) The conversion unit 1014 acquires animation data from the animation creation device 1002 via the acquisition unit 1011.

(Step S1012) The operation conversion unit 1141 uses the operation data included in the animation data to calculate a velocity and acceleration for each joint.

(Step S1013) The operation conversion unit 1141 detects a zero crossing point of the acceleration for each joint.

(Step S1014) The operation conversion unit 1141 converts the data of the zero crossing joint using Equation (1).

(Step S1015) The file generation unit 1142 synchronizes the data of a movement of an eye, the data of a movement of a mouth and the audio signal included in the animation data with the data of the operation of the robot subjected to operation conversion (the data in the robot domain) at the timing of the zero crossing point, and associates these with each other to create a phenotypic routine file.

(Step S1016) The file generation unit 1142 associates the data of a movement of an eye, the data of a movement of a mouth and the audio signal included in the animation data with the phenotypic routine file and store a result thereof in the routine DB.

<Animation Creation Device>

Next, an example of a screen for animation creation by the animation creation device 1002 (FIG. 16) will be described.

Figure 23:
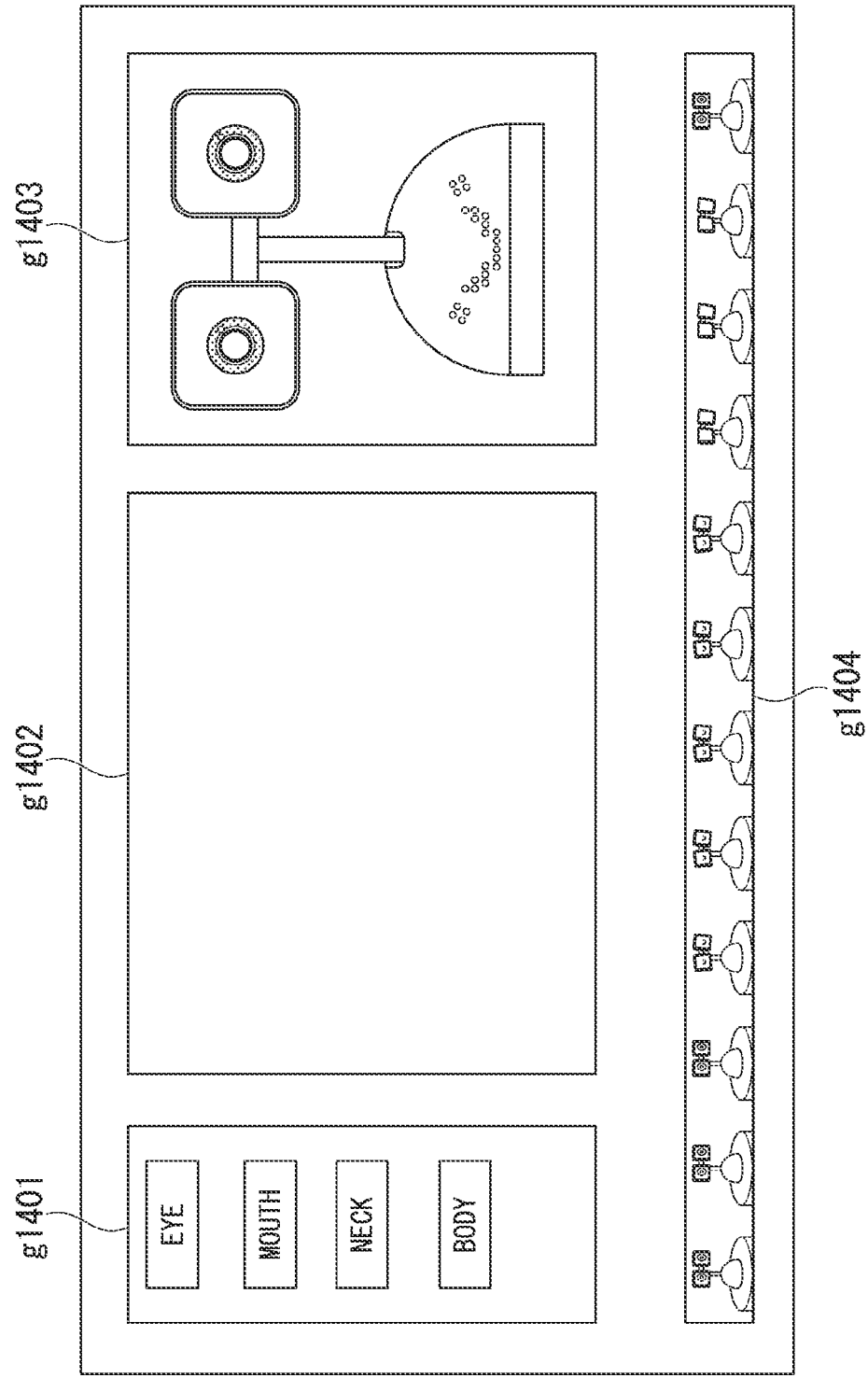
FIG. 23 is a diagram illustrating an example of a screen for animation creation in an animation creation device.

FIG. 23 is a diagram illustrating an example of a screen for animation creation by the animation creation device 1002. In the example of FIG. 23, an area g1401 for performing operation selection, an area g1402 for creating a behavior, an area g1403 for displaying a current state, and an area g1404 for displaying the created animation in a still state are included. An worker (or an animator) operates such a screen to create an animation as which the robot 1001 is desired to operate. An example of an operation screen illustrated in FIG. 22 is only an example, and is not limited thereto. Other selection screens or display areas may be included.

As described above, in the present embodiment, a movement of the animation is converted into an actual movement of the robot. Further, in the present embodiment, the joint trajectory is converted while the shape of the joint is being maintained. That is, a moment of change in the direction of the joint is held.

Thus, according to the present embodiment, realization can be made by searching for the zero crossing points of the velocity of the joint and keeping times thereof unchanged.

Further, according to the present embodiment, an animation motion is converted to satisfy the dynamic constraints of the robot, and at the same time, the animation motion and multimedia elements (that is, movement of eyes, movement of a mouth (LED), and voice) are not lost.

Further, according to the present embodiment, a moment of change in the direction of the joint is preserved by converting the joint trajectory while maintaining the shape of the joint.

Further, according to the present embodiment, it is possible to convert the movement of the animation into the movement of the robot that respects kinematic and dynamic constraints, and at the same time, to maintain matching of a unique principle of the animation applied to an expressive movement with a scheme.

Overview of Third Embodiment

Figure 24:
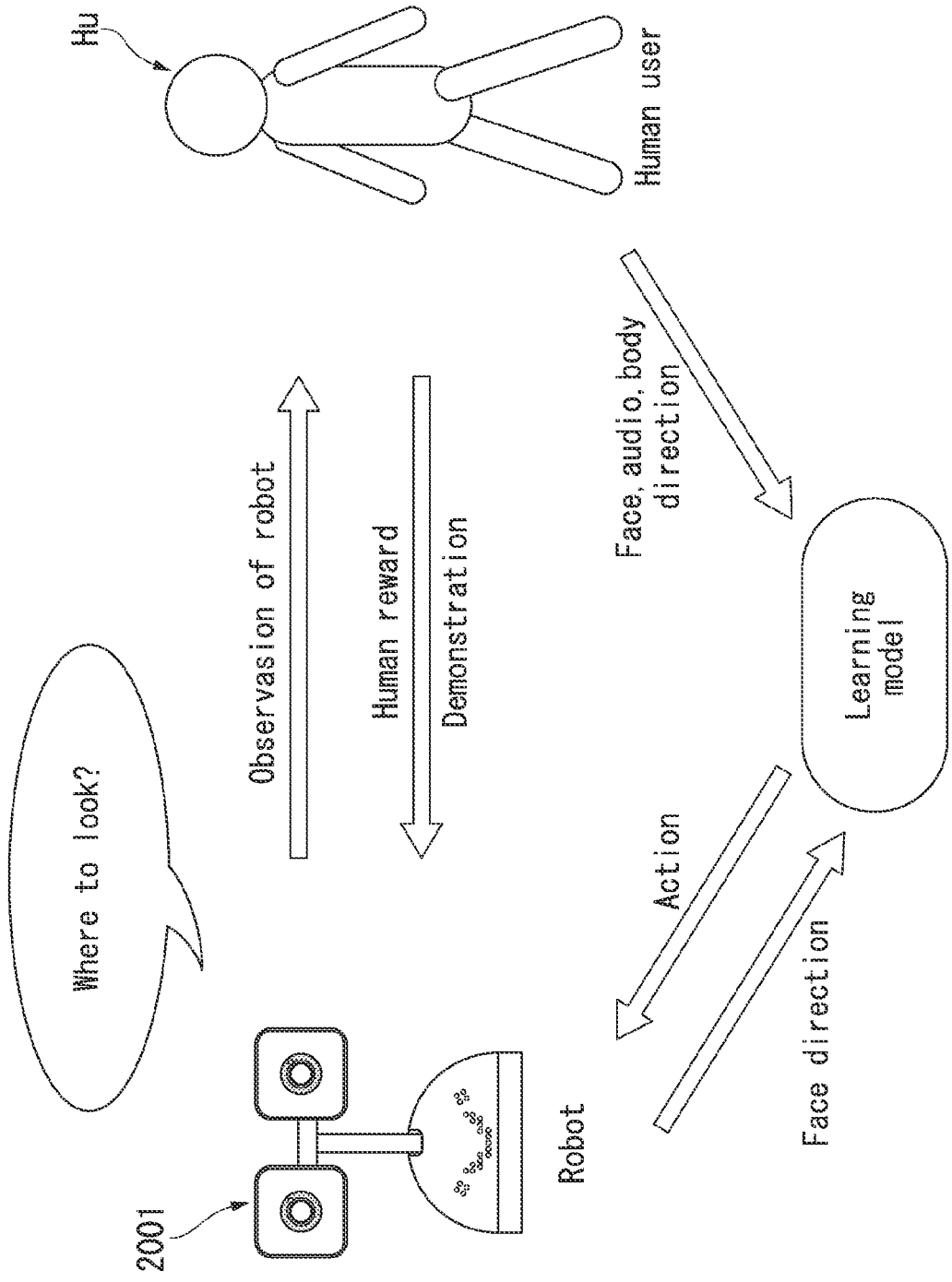
FIG. 24 is a diagram illustrating an overview of an autonomous learning method in the robot according to the embodiment.

FIG. 24 is a diagram illustrating an overview of an autonomous learning method in a robot 2001 according to the present embodiment. In the following embodiments, an example in which the robot 2001 autonomously learns a face direction of a human and behaves on the basis of a learning result will be described. As will be described below, the robot 2001 includes, for example, an imaging unit and a sound pickup unit, which is a microphone array, on a front surface. The robot 2001 detects a face, voice, and direction of a body of the human on the basis of information obtained by the imaging unit and the sound pickup unit. The robot 2001 behaves using a learning model on the basis of this state. The user observes the direction of the face of the robot 2001 and provides a reward (evaluation feedback) and a demonstration (face direction, utterance, facial expression, or the like) to teach desired behavior.

In the example of FIG. 24, the robot 2001 speaks to the user, "Where should I look?" In response to the utterance of the robot 2001, a human Hu performs a demonstration such as turning his or her face to a viewing direction. The robot 2001 observes the behavior of the human Hu. The learning model detects the face, voice, and direction of a body of the human Hu, and learns detection results as a behavior of the robot 2001 in response to the utterance. Further, the learning model receives the detected behavior as an input and outputs an operation. The robot 2001 changes, for example, the direction of the face of the robot 2001 according to an operation instruction output by the learning model. The learning model further learns this operation. In the following example, an example in which the behavior control device is applied to the robot 2001 will be described, but an application target is not limited to the robot 2001.

<Example of Configuration of Robot 2001>

Next, an example of a configuration of the robot 2001 will be described.

Figure 25:
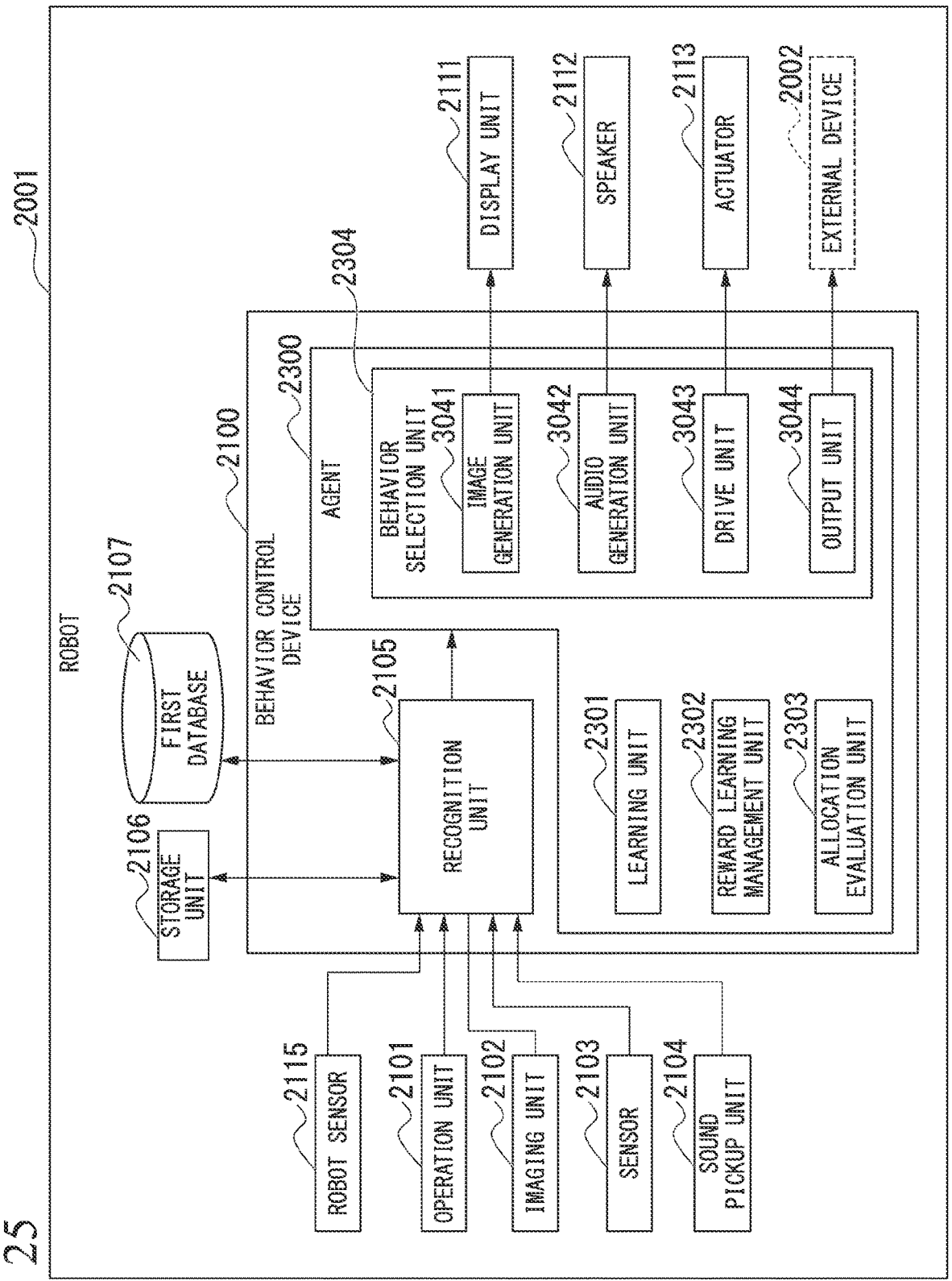
FIG. 25 is a block diagram illustrating an example of a configuration of the robot according to the embodiment.

FIG. 25 is a block diagram illustrating an example of a configuration of the robot 2001 according to the present embodiment. As illustrated in FIG. 25, the robot 2001 includes an operation unit 2101, an imaging unit 2102, a sensor 2103, a sound pickup unit 2104, a behavior control device 2100, a storage unit 2106, a database 2107, a display unit 2111, a speaker 2112, an actuator 2113, and a robot sensor 2115.

The behavior control device 2100 includes a perception unit 2105 (perception means) and an agent 2300. The agent 2300 includes a learning unit 2301 (inverse reinforcement learning unit), a reward learning management unit 2302, an allocation evaluation unit 2303, and a behavior selection unit 2304. The behavior selection unit 2304 includes an image generation unit 3041, an audio generation unit 3042, a drive unit 3043, and an output unit 3044.

<Functions and Operations of Robot 2001>

Next, functions and operations of each functional unit of the robot 2001 will be described with reference to FIG. 25.

The operation unit 2101 is, for example, a keyboard. The operation unit 2101 detects an operation result of an operation of the user, and outputs the detected operation result to the perception unit 2105.

The imaging unit 2102 is, for example, a Complementary Metal Oxide Semiconductor (CMOS) imaging device or a Charge Coupled Device (CCD) imaging device. The imaging unit 2102 outputs a captured image (a still images, continuous still images, or a moving image) to the perception unit 2105. The robot 2001 may include a plurality of imaging units 2102. In this case, the imaging unit 2102 may be attached to the front and rear sides of the housing of the robot 2001, for example.

The sensor 2103 is, for example, a motion sensor that detects a movement such as gesture of the user as will be described below. The sensor 2103 outputs a detected detection value to the perception unit 2105.

The sound pickup unit 2104 is, for example, a microphone array configured of a plurality of microphones. The sound pickup unit 2104 outputs acoustic signals picked up by the plurality of microphones to the perception unit 2105. The sound pickup unit 2104 may sample each acoustic signal picked up by the microphone with the same sampling signal, convert an analog signal into a digital signal, and then output the digital signal to the perception unit 2105.

The robot sensor 2115 is a gyro sensor that detects a tilt of the head or housing of the robot 2001, an acceleration sensor that detects the movement of the head or housing of the robot 2001, and the like. The robot sensor 2115 outputs the detected detection value to perception unit 2105.

The storage unit 2106 stores, for example, items to be recognized by the perception unit 2105, various values (a threshold value and a constant) to be used for recognition, and an algorithm for recognition.

The database 2107 stores, for example, a language model database, an acoustic model database, a dialogue corpus database, an acoustic feature quantity that are used for speech recognition, and a comparison image database and an image feature quantity that are used for image recognition. Each piece of data and feature quantity will be described below. The database 2107 may be placed on the cloud or may be connected via a network.

The perception unit 2105 perceives the emotion of the user by extracting the image of the face of the user from the captured image and recognizing the facial expression of the user using a well-known scheme. The perception unit 2105 recognizes the gesture of the user by tracking the movement of the user using a well-known scheme on the basis of the detection value acquired by the sensor 2103. The perception unit 2105 recognizes content of the operation on the basis of the operation result. The perception unit 2105 performs speech recognition processing on the audio signal of the user from the picked up acoustic signal to perform recognition of a voice direction of the user. The perception unit 2105 detects the direction, state, or the like of each unit of the robot 2001 on the basis of the detection value detected by the robot sensor 2115. The perception unit 2105 detects the direction of the voice of the user, the direction of the face of the user, the direction of the body of the user, and the direction of the face of the robot 2001, as will be described below, on the basis of the acquired information. The perception unit 2105 outputs information on the detection, the perception, and the recognition results to the agent 2300.

The agent 2300 acquires the information on the detection, the perception, and the recognition results from the perception unit 2105. The agent 2300 generates an agent using the generated reward function and the acquired information (information fed back from the person and the environment), and generates a behavior (an utterance, gesture, image output, and output) using the generated agent. Further, the agent 2300 performs correction of the behavior using the reward function learned by the learning unit 2301, and learns a prediction reward model on the basis of information fed back from the person and the environment. The agent 2300 estimates a state of the environment represented by a voice direction of the person, a direction of the face of the person, a direction of a body of the person, and a direction of an own device in a current direction of the own device, and selects a behavior with a reward function having a greatest reward prediction value to select a behavior of turning the face (head) to a person that the own device pays attention to. In the following description, the behavior selected by the agent is a behavior of turning the face of the robot in a direction expected by the user, but a behavior to be selected is not limited thereto.

The learning unit 2301 performs learning using information on the detection, perception, and recognition results output by the perception unit 2105 and generates an agent. Further, the learning unit 2301 generates a reward function through inverse reinforcement learning on the basis of the demonstration result. The learning method will be described below.

The reward learning management unit 2302 acquires the reward function generated by the learning unit 2301, acquires the supervised learning sample output by the allocation evaluation unit 2303, learns the prediction reward model, and uses the learned prediction reward model to update the reward function.

The allocation evaluation unit 2303 calculates a probability of a previously selected behavior on the basis of the feedback from the person and the feedback from the environment, and sets the state, the behavior, the probability of the previously selected behavior, and the supervised learning sample.

The behavior selection unit 2304 selects a behavior on the basis of the information fed back from the person and the environment and the reward learning management unit 2302. The behavior to be selected is at least one behavior among an image output, an audio output, driving of the head or housing, and the like. In the embodiment, a behavior of changing an direction of the face (head) of the robot 2001 will be described as an example.

The image generation unit 3041 generates an output image (a still image, continuous still images, or a moving image) to be displayed on the display unit 2111 on the basis of the learning result and the acquired information, and displays the generated output image on the display unit 2111.

The audio generation unit 3042 generates an output audio signal to be output to the speaker 2112 on the basis of the learning result and the acquired information, and outputs the generated output audio signal to the speaker 2112.

The drive unit 3043 generates a drive signal for driving the actuator 2113 on the basis of the learning result and the acquired information, and drives the actuator 2113 using the generated drive signal.

The output unit 3044 generates, for example, an instruction on the basis of the learning result and the acquired information, and outputs the generated instructions to an external device 2002. The external device 2002 is, for example, a personal computer, a game device, or a tablet terminal.

The display unit 2111 is a liquid crystal image display device, an organic Electro Luminescence (EL) image display device, or the like. The display unit 2111 displays the output image output by the image generation unit 3041.

The speaker 2112 outputs the output audio signal output by the audio generation unit 3042.

The actuator 2113 drives an operation unit according to the drive signal output by the drive unit 3043.

<Example of Appearance of Robot 2001>

Figure 26:
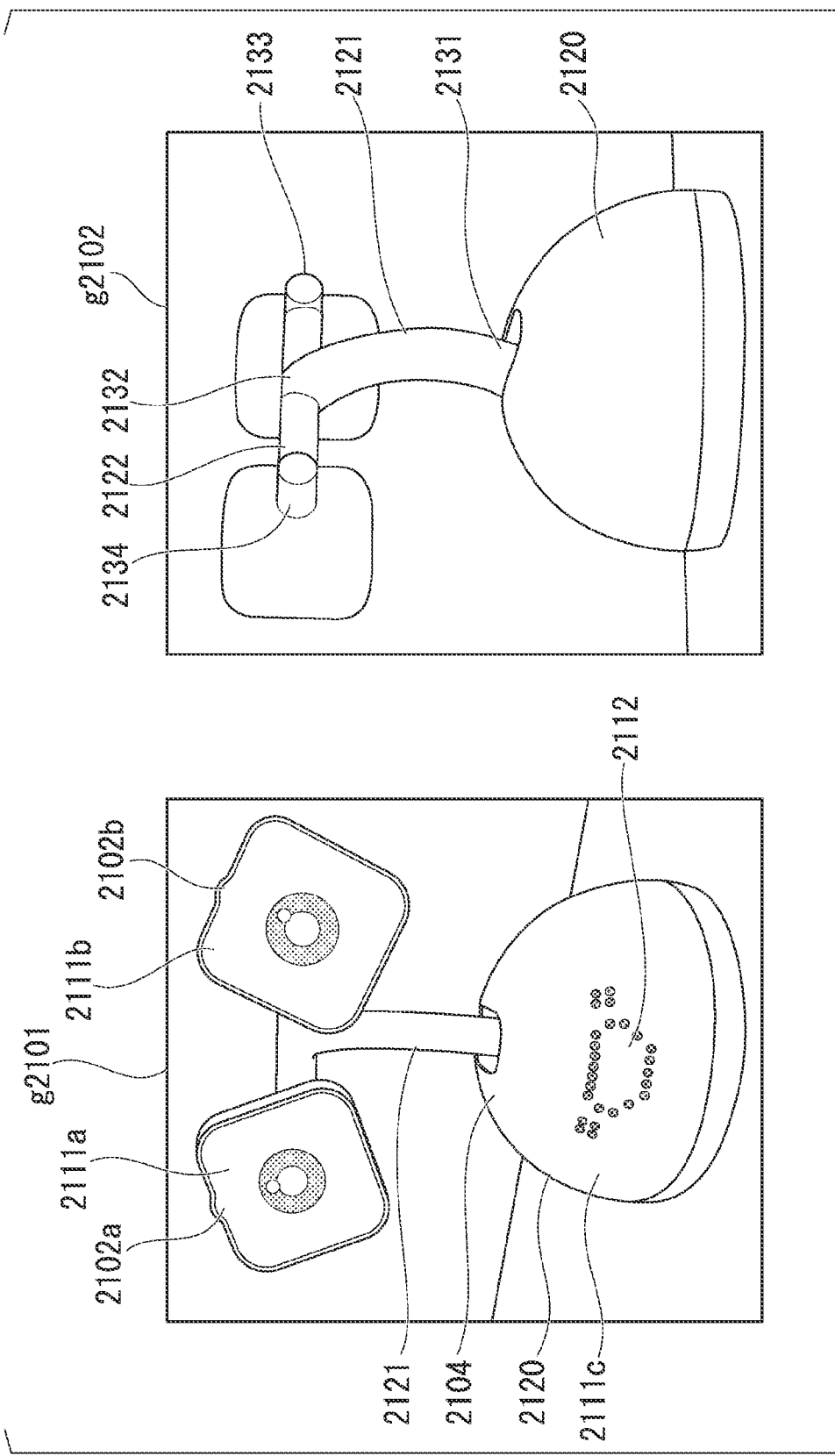
FIG. 26 is a diagram illustrating an example of an appearance of the robot according to the embodiment.

Next, an example of an appearance of the robot 2001 will be described. FIG. 26 is a diagram illustrating an example of the appearance of the robot 2001 according to the present embodiment. In an example of a front view g2101 and a side view g2102 of FIG. 26, the robot 2001 includes three display units 2111 (2111a, 2111b, and 2111c). Further, in the example of FIG. 26, the imaging unit 2102a is attached to an upper portion of the display unit 2111a, and the imaging unit 2102b is attached to an upper portion of the display unit 2111b. The display units 2111a and 2111b correspond to eyes of the human and present image information. The speaker 2112 is attached near the display unit 2111c that displays an image corresponding to the mouth of the human in the housing 2120. The sound pickup unit 2104 is attached to the housing 2120.

Further, the robot 2001 includes a boom 2121. The boom 2121 is movably attached to the housing 2120 via a movable portion 2131. A horizontal bar 2122 is rotatably attached to the boom 2121 via a movable portion 2132. Further, a display unit 2111a is rotatably attached to the horizontal bar 2122 via a movable portion 2133, and a display unit 2111b is rotatably attached via a movable portion 2134. The appearance of the robot 2001 illustrated in FIG. 26 is an example, and is not limited thereto. For example, the robot 2001 may be a bipedal robot.

<Face Angle Between Robot and Human>

Figure 27:
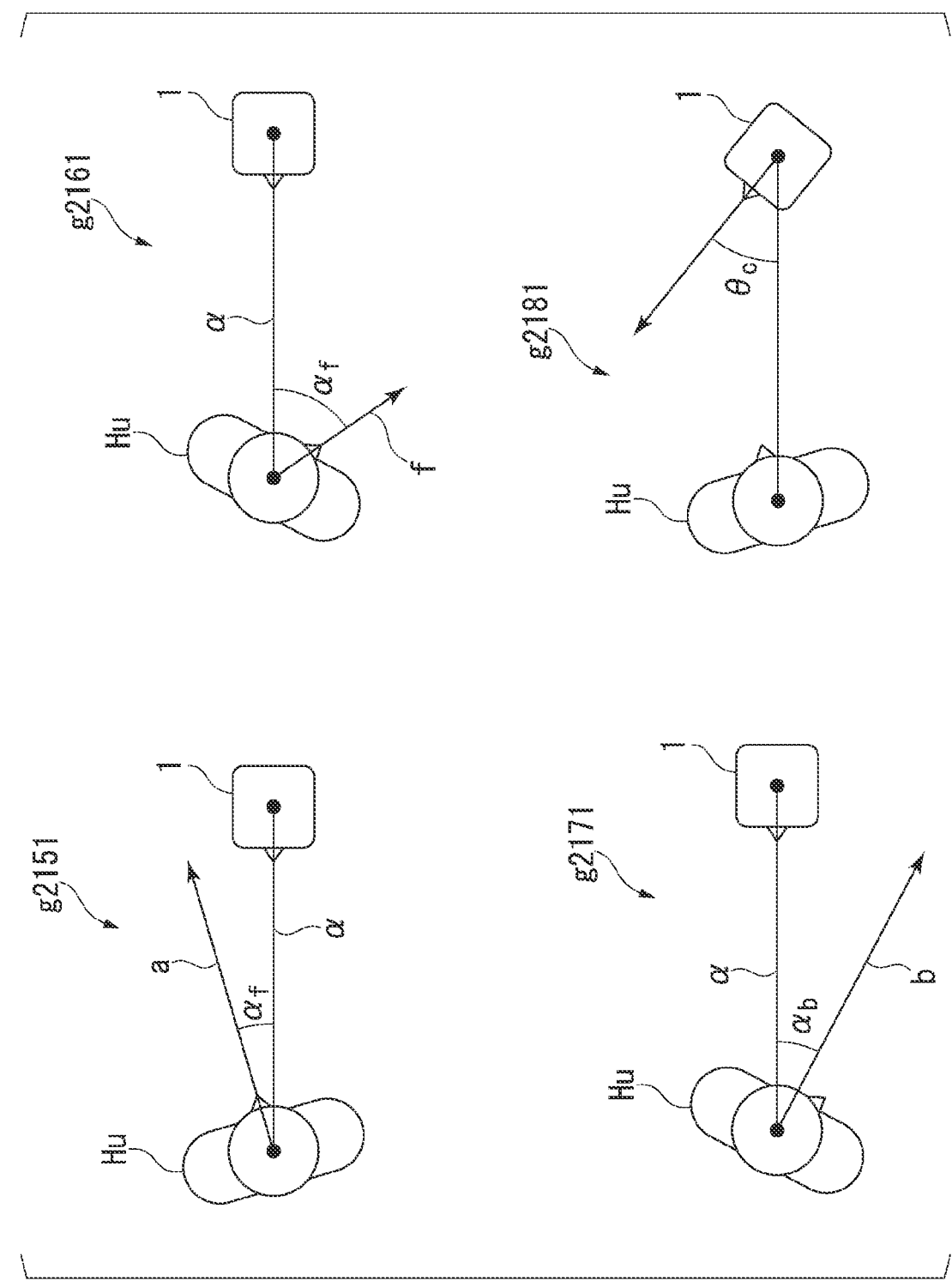
FIG. 27 is a diagram illustrating a definition of a face angle between the robot and the user.

Here, a face angle between the robot and the user will be described. FIG. 27 is a diagram illustrating a definition of a face angle between the robot 2001 and the user. A state representation used in the embodiment consists of four feature quantities. The four feature quantities are a voice direction of the user Hu, a direction of the face of the user Hu, a direction of a body of the user Hu, and a direction of a face of the robot 2001.

A diagram of an area indicated by reference sign g2151 is a diagram for describing the voice direction of user Hu. A first feature quantity is a voice direction $\alpha_a$ of (an angle range is $[-\pi, \pi]$) of the user Hu. The voice direction $\alpha_a$ of the user Hu is an angle of a voice direction a of the user Hu with respect to a front direction $\alpha$ of the robot 2001. The voice direction is detected by, for example, speech recognition processing.

A diagram of an area indicated by reference sign g2161 is a diagram for describing the direction of the face of the user Hu. A second feature quantity is a direction $\alpha_f$ of the face (an angle range is $[-\pi, \pi]$) of the user Hu. The direction $\alpha_f$ of the face of the user Hu is an angle of the direction f of the face of the user Hu with respect to a frontal direction $\alpha$ of the robot 2001. The direction of the face of the user Hu is detected by image processing, for example. This feature quantity is used to reinforce a feature in a voice direction of the user Hu.

A diagram of an area indicated by a reference sign g2171 is for describing a direction of the body of the user Hu. A third feature quantity is a direction $\alpha_b$ of the body (an angle range is [−π, π]) of the user Hu. The direction $α_b$ of the body of the user Hu is an angle of a direction b of the body of the user Hu with respect to a frontal direction α of the robot 2001. The direction of the face of the user Hu is detected by image processing, for example. This feature quantity is used to supplement a feature quantity of the voice direction of the user Hu and the direction of the face.

A diagram of an area indicated by reference sign g2181 is a diagram illustrating the direction of the face of the robot 2001. A fourth feature quantity is a direction $θ_c$ of the face of the robot 2001 (an angle range is [−π, π]). The direction $θ_c$ of the face of the robot 2001 is an angle from the direction of the face of the robot 2001 to a position direction of the person.

The direction $θ_c$ of the face of the robot 2001 is acquired by the behavior control device 2100 on the basis of an operation instruction.

Figure 28:
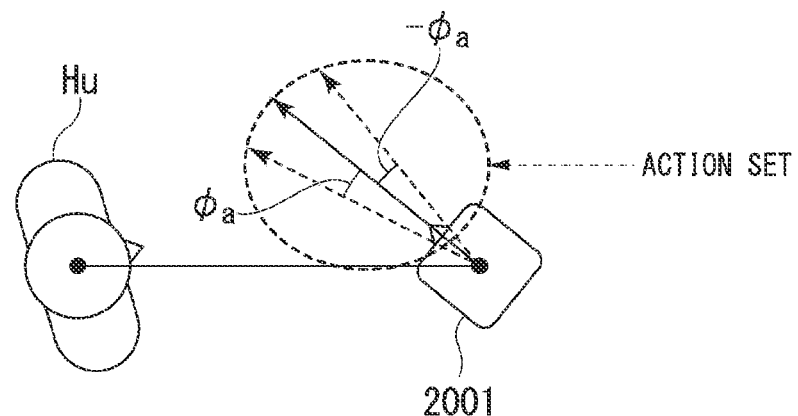
FIG. 28 is a diagram illustrating an action set of the robot according to the embodiment.

The behavior of the robot 2001 can be a list of angular commands that the robot 2001 can execute. In the embodiment, as illustrated in FIG. 28, an action set $[−φ_a, 0, φ_a]$ for tilting the behavior in the direction of the face of the robot 2001 is used. $φ_a$ is a positive angle with a small order. FIG. 28 is a diagram illustrating an action set of the robot 2001 according to the present embodiment.

When the robot 2001 selects a $φ_a$ command, this means that the robot 2001 moves to the left by an angle $φ_a$ in a current face direction. When the robot 2001 selects a $−φ_a$ command, this means that the robot 2001 moves to the right by an angle Ta in the current face direction. When the robot 2001 selects a 0 command, this means that the robot 2001 stays in the current face direction.

The evaluation feedback of the user for the movement of the face of this robot 2001 will be described. In the present embodiment, while the robot 2001 is learning from the evaluation feedback of the user Hu, the user Hu returns an evaluation of a behavior of the robot 2001 by voice and maps the evaluation to a numerical reward value.

Here, a set of feedbacks to be used in the embodiment is defined. In the embodiment, feedbacks such as "pretty good", "good", "bad", and "pretty bad" are defined and mapped to +2, +1, −1, and −2, respectively. For example, when the user Hu thinks the behavior selected by the robot 2001 is correct, the user Hu answers "good", which is mapped to +1. Further, when the user Hu thinks that the behavior selected by the robot 2001 is of higher quality, the user Hu answers "pretty good", which is mapped to +2.

<Interactive Reinforcement Learning>

First, an overview of dialogue type reinforcement learning will be described.

In standard reinforcement learning, the agent interacts with the environment to learn a method of executing a sequential decision making task. This sequential decision making task is modeled as a Markov decision process and called {S, A, T, R, γ}. S and A are sets of possible state and behavior, respectively. T is a transition function T: S×A× S→R (a set of all real numbers), which gives a probability of transitioning to a state $s_{t+1}$ under a state $s_t$ and a behavior. γ determines a current value of a future reward and is called a discount rate. R is a reward function, T:S×A×S→R (the set of all real numbers). The reward is a function of $s_t$, $a_t$, and $s_{t+1}$ or a function of $s_t$ and $a_t$ only. In learning of the agent, there are usually two associated value functions.

A first value function is a state value function V(s), which is related only to an initial state of the agent under a policy π as in Equation (1) below.

[Math. 5]

$$V^π(s) = E_π\left[\sum_{k=0}^{∞} γ^k r_{t+k+1} | s_t = s\right] \quad (1)$$

A second value function is a behavior and value function called a value $Q^x(s, a)$ of a state and behavior pair, and is an expected return after a behavior a is taken in a state s in Equation (2) below.

[Math. 6]

$$Q^π(s, a) = E_π\left[\sum_{k=0}^{∞} γ^k r_{t+k+1} | s_t = s, a_t = a\right] \quad (2)$$

Figure 29:
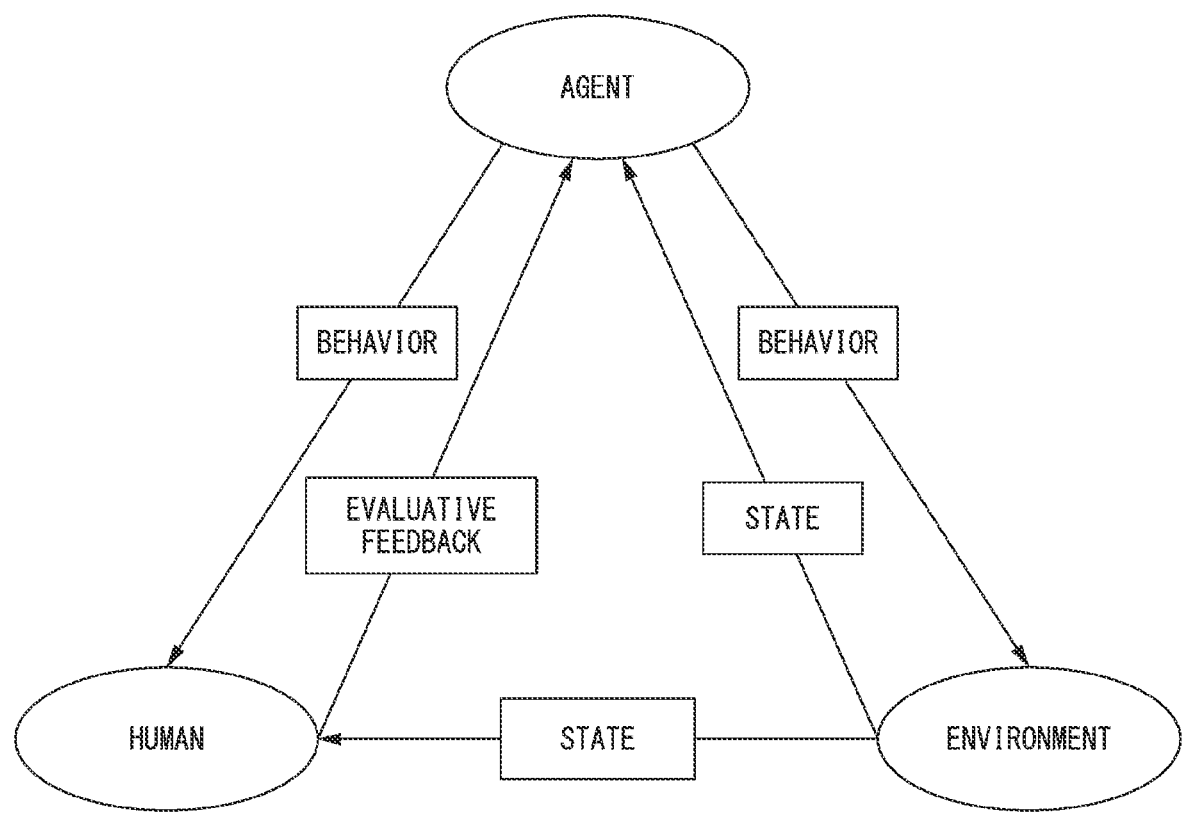
FIG. 29 is a diagram illustrating a framework of dialogue type reinforcement learning.

The dialogue type reinforcement learning is a modification of standard reinforcement learning. In the dialogue type reinforcement learning, a reward signal is not only based on a world state and a behavior of an agent, but also depends on a real-time interaction with a human trainer (hereafter simply referred to as a trainer). In this case, the trainer can change a value of the reward signal by providing a clear goal state or continuously interact in a continuous process. In dialogue type reinforcement learning, as illustrated in FIG. 29, each time the agent performs a behavior in a certain state, the trainer provides evaluative feedback for informing the agent of quality of the selected behavior on the basis of experience of the trainer. FIG. 29 is a diagram illustrating a framework of the dialogue type reinforcement learning.

<Learning Framework>

On the other hand, in the present embodiment, an agent is used on the basis of a Training an Agent Manually via Evaluative Reinforcement (TAMER) framework. The TAMER framework is an approach to myopically learn by directly modeling a reward of the human. Here, "myopic" means that the agent considers only immediate reward, that is, sets a discount factor γ to zero.

As illustrated in FIG. 30, a learning mechanism is an interaction of the human, the environment, and the TAMER agent. In a TAMER framework, a human teacher observes the behavior of the agent and gives a reward on the basis of evaluation of quality thereof.

First, an overview of the learning framework will be described using FIG. 30. FIG. 30 is a diagram illustrating an overview of an IRL-TAMER framework according to the present embodiment. IRL-TAMER used in the present embodiment performs learning from the demonstration of the human through inverse reinforcement learning (IRL) and performs learning from human reward through TAMER. IRL-TAMER is configured of two algorithms as illustrated in FIG. 30 and is executed in the following order.

Procedure 1: IRL learns a reward function from the demonstration provided by a trainee (left block 2201). In procedure 1, inverse reinforcement learning is performed from a demonstration station. Processing of this block is performed by the learning unit 2301.

Procedure 2: TAMER learns a prediction reward model from evaluation feedback of the human (right block 2311). In procedure 2, the TAMER agent performs learning from evaluation feedback. The agent 2300 performs processing of this block 2311.

<Procedure 1; IRL Algorithm>

Next, an algorithm of procedure 1 will be described.

A human teacher performs demonstration of a sequence of pairs of state and behavior. The pairs of state and behavior include $\{(s_0, a_0), \ldots, (s_n, a_n)\}$. Here, $(s_0, a_0)$ indicates a state and a behavior at the time of starting. $(s_n, a_n)$ indicates a state and a behavior at the time of ending. A person different from the trainer performs an operation with respect to the robot 2001. The robot 2001 records the demonstration. Here, the state s represents the four feature quantities (a voice direction $\alpha_a$ of the human, a direction $\alpha_f$ of the face, a direction $\alpha_b$ of the body, and a direction $\theta_c$ of the face of the robot) as feature variables. Further, the action is one in an action set $[-\varphi_a, 0, \varphi_a]$.

A recorded demonstration is given to the inverse reinforcement learning module as a reward function $R=\omega \cdot \varphi(s)$ (2212) by an IRL algorithm 2211. Here, $\omega$ is a parameter weight vector and $\varphi(s)$ is a vector of a basis feature on a state of IRL.

The reward function R learned from the demonstration via the IRL algorithm 2211 is used to initialize the weight vector w of a TAMER reward function $R_H$. This makes it possible for the trainee to finely tune the operation of the robot 2001 using evaluation feedback of the human h.

<Procedure 2; Learning Algorithm of TAMER Agent>

Next, a learning algorithm of the TAMER agent in procedure 2 will be described. As illustrated in FIG. 30, the agent 2300 includes a reward learning management unit 2302, an allocation evaluation unit 2303, and a behavior selection unit 2304.

First, an overview of processing of the agent 2300 using TAMER (hereinafter also referred to as a TAMER agent 2300) will be described.

The TAMER agent 2300 estimate a state s of an environment that is represented by the voice direction $\alpha_a$ of the human (human Hu), the direction $\alpha_f$ of the face of the human, the direction $\alpha_b$ of the body of the person, and the direction $\theta_c$ of the face of the robot in a current direction $\theta_c$ of the face of the robot 2001. The TAMER agent 2300 uses the behavior selection unit 2304 to select a behavior a (angle command) having a reward function $R_H(s, a)$. The behavior selection unit 2304 selects an action with the largest human reward prediction value, to maximize the reward of the human Hu according to an immediate behavior of the robot 2001.

The trainer (human Hu) observes the state s of the robot 2001 and the selected operation $\varphi_a$ (environment 2312), evaluates quality thereof, and performs feedback. The allocation evaluation unit 2303 acquires an evaluation h fed back in this way.

The allocation evaluation unit 2303 receives an evaluation feedback h given by the trainer and calculates a probability (credit) h of the previously selected behavior. The allocation evaluation unit 2303 is used to deal with a temporal delay in the reward of the human due to evaluating and rewarding the behavior of the robot 2001. The allocation evaluation unit 2303 learns a prediction model $\hat{R}_H$ of the reward of the person and provides a reward to the agent within a Markov Decision Process (MDP) designated as $\{S, A, T, \hat{R}_H, \gamma\}$.

Specifically, the allocation evaluation unit 2303 learns a function $\hat{R}_H(s, a)$ obtained by approximating an expected value of the reward of the person received in an interaction experience using Equation (3) below. S is a set of states in the environment, and A is a set of behaviors that the agent 2300 can execute.

[Math. 7]

$$\hat{R}_H(s,a) = \vec{\omega}^T \Phi(s,a) \tag{3}$$

In Equation (3), here, $\vec{\omega} = (\omega_0, \ldots, (\omega_{m-1})^T$ is a column parameter vector, $\varphi(\vec{x}) = (\varphi_0(\vec{x}), \ldots, (\varphi_{m-1}(\vec{x}))^T$ with $\varphi_i(\vec{x})$ as a basis function, and m is $i=0, \ldots, m-1$ and is a total number of parameters.

The TAMER agent 2300 learns a reward function of the human user and tries to maximize the reward of the human using argmax $a\hat{R}_H(s, a)$. In the TAMER agent, an optimal policy is defined by the human user.

TAMER has the following three ideas, as compared to other schemes in which learning is performed from the reward of the human.

I. TAMER assigns units to cope with a delay of evaluation of the human.

II. A TAMER agent learns a reward model ($\hat{R}H$) of the human.

III. In each time step, the TAMER agent selects a behavior predicted to directly elicit a maximum reward (argmax $a\hat{R}_H(s, a)$) without considering an influence on a future state.

Specifically, when a human observes a behavior of the agent, a brain of the human requires a certain reaction time to output a corresponding feedback signal. During this time, however, the agent is likely to have already started a new search, causing some delay in the feedback of the human. To solve this problem, the agent needs to distribute each reward signal of the human to a plurality of recent state-behavior pairs that contribute to a label of the state-behavior pair for each sample. In TAMER, a virtual reward function of the human is simulated using an established regression algorithm $R_H: S \times A \rightarrow R$. The TAMER framework does not include a specific model or supervised learning algorithm for approximating the reward function of the human, all decisions are made by the designer, for example. Further, in the AMER framework, labels of the state-behavior samples are all configured of the reward of human. Further, when behavior selection is performed under the state s, the TAMER agent directly adopts strategy a=argmax $a\hat{R}_H(s, a)$. Such myopic learning corresponds to performing reinforcement learning with the discount factor $\gamma=0$.

In the TAMER framework, a role of the agent is inherently somewhat unspecified. This is because learning must be performed from the reward of the human to maximize performance of tasks that cannot be measured.

For this reason, the embodiment hypothesizes that the agent best performs a role thereof by learning a model of a reward of the trainer and selecting a behavior predicted by the model being directly linked to the most reward.

The reward learning management unit 2302 acquires the calculated probability $\hat{h}$, a state representation s, and the selected behavior a as one supervised learning sample (s, a, $\hat{h}$), and learns the reward function $R_H(s, a)$ using the supervised learning algorithm. The reward learning management unit 2302 updates $R_H(s, a)$ with (s, a, $\hat{h}$).

The reward learning management unit 2302 is a credit assigner for dealing with a temporal delay in the reward of the human due to evaluating the behavior of the agent 2300 and providing this. In TAMER, a probability density function f(t) is defined to estimate a probability of feedback delay of a teacher. The probability density function f(t) is used to provide a probability of the feedback occurring within any specific time interval and to calculate a probability (credit) of a single reward signal covering a single time step. In a current time step t, a probability for each previous time step t-k is calculated as illustrated in Equation (4):

[Math. 8]

$$c_{i-k} = \int_{t-k-1}^{t-k} f(x)dx \qquad (4)$$

When a human gives a plurality of rewards, a label h^ of each previous time step (state-behavior pair) is a sum of all probabilities calculated for a reward of each person using Equation (4).

The reward learning management unit 2302 uses h ^ and the state-behavior pair as supervised learning samples, and updates parameters as in Equations (5) and (6) on the basis of a least-squares gradient to learn R^$_H$(s, a). In equations (5) and (6), here, a is a learning rate and $\delta_t$ is a time difference error.

[Math. 9]

$$\delta_t = h - \hat{R}_H(s,a) = h - \vec{\omega}^T \phi(s_t, a_t) \qquad (5)$$

[Math. 10]

$$\begin{aligned}
\vec{\omega}_{t+1} &= \vec{\omega}_t - \alpha \nabla_{\vec{\omega}} \frac{1}{2}\{h - \hat{R}_H(s, a)\}^2 \\
&= \vec{\omega}_t - \alpha \nabla_{\vec{\omega}} \frac{1}{2}\{h - \vec{\omega}^T \phi(s, a)\}^2 \\
&= \vec{\omega}_t + \alpha\{h - \vec{\omega}^T \phi(s, a)\}\phi(s, a) \\
&= \vec{\omega}_t + \alpha \delta_t \Phi(s_t, a_t)
\end{aligned} \qquad (6)$$

In Equations (5) and (6), h is a reward label of the human received by the agent at an arbitrary time step t.

The behavior selection unit 2304 selects another behavior (suggested angle command) $\varphi_a$ using the updated reward function $R_H$(s, a). A trajectory generated through the demonstration of the human and planning consist of a sequence of pairs of state and operation {($s_0$, $a_0$), . . . , ($s_n$, $a_n$)}, which are supplied into an inverse RL algorithm. The agent 2300 learns the reward function of the human and selects a behavior of the robot 2001 that maximizes the reward of the human using argmax aR^$_H$(s, a), for example, using Equation (7) or (8) below.

[Math. 11]

$$a \leftarrow \underset{a}{\mathrm{argmax}} Q(s, a) \qquad (7)$$

[Math. 12]

$$a \leftarrow \underset{a}{\mathrm{argmax}} \left[ \hat{R}_H(s, a) + \sum_{s' \in S} T(s, a, s') V(s') \right] \qquad (8)$$

The agent 2300 takes a behavior, detects a reward, updates a predictive reward function model, and starts a new cycle until the robot 2001 learns an optimal behavior. The selected behavior is, for example, an expected direction of the face of the robot 2001. This makes it possible for the robot 2001 to turn the face to the human Hu who is paying attention.

<Processing Algorithm>

Next, an example of a processing algorithm that is performed by the agent will be described. FIG. 31 is a diagram illustrating an example of a processing algorithm that is performed by an agent according to the present embodiment.

Procedure 1: The agent 2300 initializes a reward function R, a reward function R^$_H$ of the human, a behavior value function Q(s, a), or a state value function V(s).

Procedure 2: The human performs a demonstration. The agent 2300 captures and records the performed demonstration.

Procedure 4 and procedure 5: The agent 2300 records a demo, generates a trajectory through planning, and optimizes the reward function R through inverse RL. A trajectory generated through the demonstration of the human and planning consist of a sequence of pairs of state and operation {($s_0$, $a_0$), . . . , ($s_n$, $a_n$)}, which are supplied into an inverse RL algorithm.

Procedure 6: The agent 2300 uses the reward function R learned from the demonstration through inverse reinforcement learning (RL) to seed the reward function R^$_H$ of the human in TAMER.

Procedure 8: The trainee can correct a policy of the agent 2300 by providing evaluation feedback of the human. The agent 2300 determines whether or not a reward h of the person has been received.

Procedure 9 and procedure 10: For example, when the agent 2300 receives the reward of the human, the agent 2300 uses the received reward to update the reward function R^$_H$ of the human.

Procedure 11, procedure 12, and procedure 13: The agent 2300 selects one operation with the reward function R and executes the operation.

Procedure 14: The agent 2300 repeats until the trainee is satisfied with a behavior of the agent 2300.

<Framework for Dialogue Type RL from Social Feedback of Human>

In the following example, a social signal of the human such as facial expression or gesture is applied to a process of the interaction between the agent and the human user, rather than the user operates an operation unit to train the agent using an explicit feedback signal.

Accordingly, according to the present embodiment, users who have no experience in agent training can train the agent on the basis of a preference of the behavior of the agent without learning complicated training rules. Further, according to the present embodiment, it is possible to provide an approach allowing feedback according to an expectation of the user to be performed.

FIG. 32 is a diagram illustrating a framework for dialogue type RL from social feedback of the human according to the present embodiment. As in FIG. 32, social feedback of the human trains in two methods. The first method is a method of training the agent using feedback of a face. The second method is a method of directly introducing gesture feedback instead of feedback using keyboard.

The agent 2300 learns the reward of the human Hu from a face or gesture signal and obtains an optimal policy. In the present embodiment, a module 2401 that realizes real-time face recognition in the imaging unit 2102, a module 2403 that realizes online gesture recognition with a motion sensor, and a module (2401 to 2403, and the agent 2300) that maps the feedback of the human to the reward signal through socket communication between different processes are included, and a plurality of modules with different functions are included. In the present embodiment, real-time face recognition is introduced into the TAMER agent that constitutes an emotional agent. Furthermore, in the present embodiment, a gesture agent is realized by combining the online gesture recognition module with the TAMER Agent. The motion sensor is, for example, a sensor that tracks hands and fingers.

First, real-time emotion recognition will be described.

Figure 33:
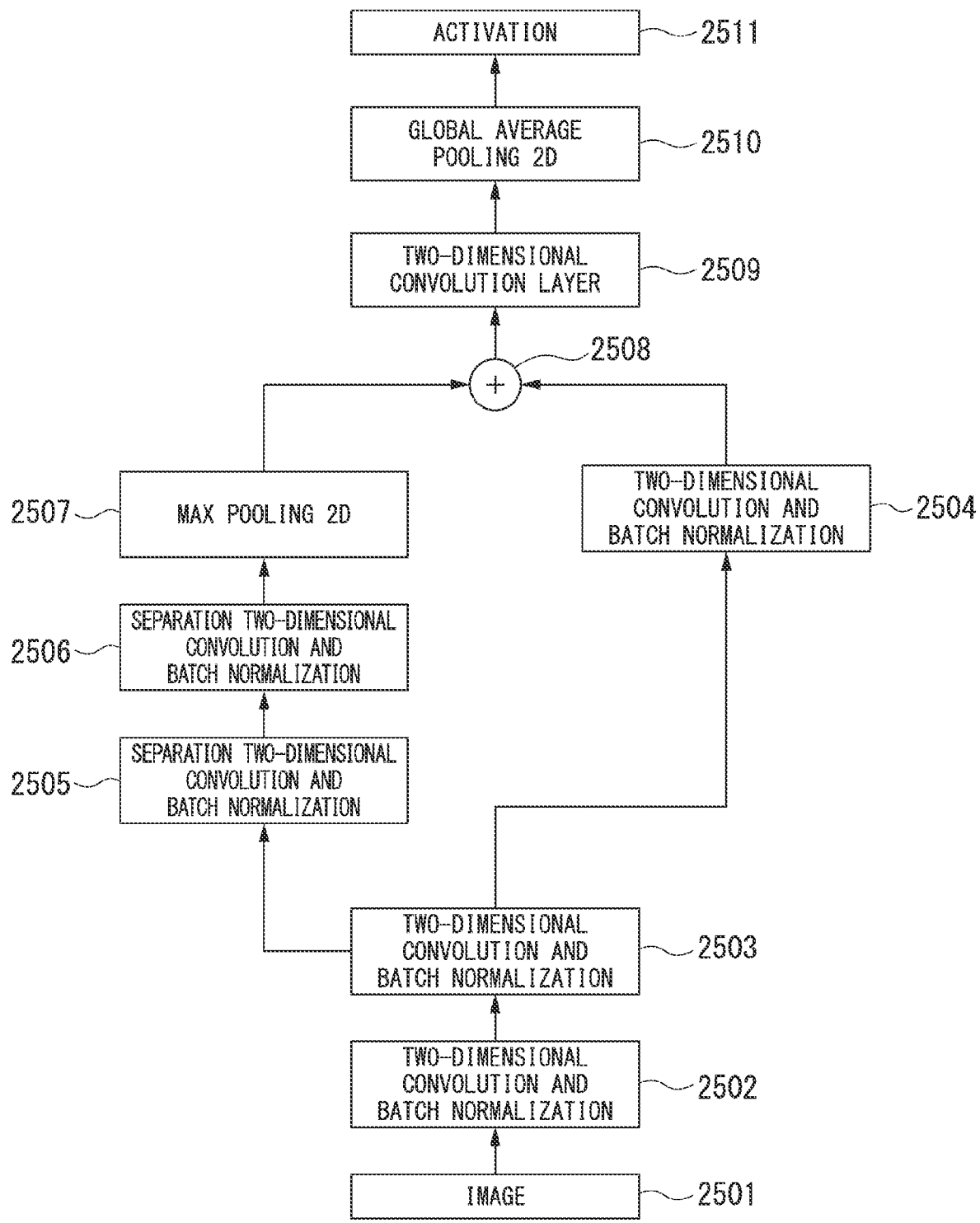
FIG. 33 is a diagram illustrating a CNN model for real-time emotion classification.

A facial expression is a result of one or more movements or states of facial muscles. These movements express individual emotions of an observer. The facial expression is a form of non-verbal communication. The facial expression is a primary means for expressing social information between people and are usually used to deliver emotions. In the present embodiment, a convolutional neural network (CNN) framework as illustrated in FIG. 33, for example, is used to design the real-time emotion recognition. FIG. 33 is a diagram illustrating a CNN model for real-time emotion classification. The framework of FIG. 33 is a fully convolutional neural network with four residual depth separable convolutions with respect to the acquired image 2501. A batch normalization calculation (2502, 2503, 2504, 2505, 2506, and 2509) and a ReLU activation function are connected to each convolution. In the final layers (2507, 2510, and 2511), global average pooling and softmax activation functions are applied to generate a prediction value.

A face recognition module of the present embodiment can recognize, for example, seven emotions including "happy", "sad", "angry", "scary", "surprised", "neutral" and "disgust". In the experiment, the emotions were classified into a "happy (positive)" emotion and an "unhappy (negative)" emotion. In the embodiment, "anger", "sadness", and "fear" were labeled as an "unhappy" emotion.

In the experiment, the user directly observed the behavior of the agent 2300 and delivered his or her preferences by expressing "happiness" and "unhappiness". A "happy (positive)" facial expression is, for example, a smiling facial expression, and an "unhappy (negative)" facial expression is, for example, an angry facial expression.

Further, in the present embodiment, the trainer can give feedback through a determination of the trainer when the trainer feels necessary instead of continuously giving reward signals for each state or behavior of the agent.

In the experiment, because facial expression recognition is continuous, a facial expression capture interval was set to two seconds and feedback of a face was extracted so that the module easily operated at the same speed as the agent. Further, in the experiment, when the user did not desire to provide feedback, the user is in "neutral" or at a place where the imaging unit 2102 cannot image, and the agent does not receive the feedback.

Next, online gesture recognition will be described.

Gestures are a natural method of communication in everyday life, and are often used, for example, among deaf and the speech impaired people. From the perspective of interaction between a human and a computer, gestures as a communication language have a very wide range of applications, such as users with speech disabilities using service robots, underwater work in which it is inconvenient to use dedicated input devices, and a noisy environment that greatly interferes with verbal communication.

In the embodiment, motion sensors are used to recognize three types of gesture.

A first model is "Easy Gesture Play Input", detects one neutral state and five basic gestures, and performs labeling them through simple signal processing. A neutral state is "Yes" and is represented by, for example, static thumb up. Basic gestures in the embodiment include "No" (for example, put thumb down), "Great" (for example, flip thumb up), "Stop" (wave hand), "Left swipe" (for example, greatly swipe left), and "Right swipe" (for example, greatly swipe to right).

A second model recognizes and classifies a gesture activity using a machine learning algorithm to trigger a reaction on the robot 2001 (for example, a telepresence or social robot).

A third model is a Kinematic Feature Mapping Control Input that maps a gesture operation to the robot on the basis of a principle of ultrasound.

Figure 34:
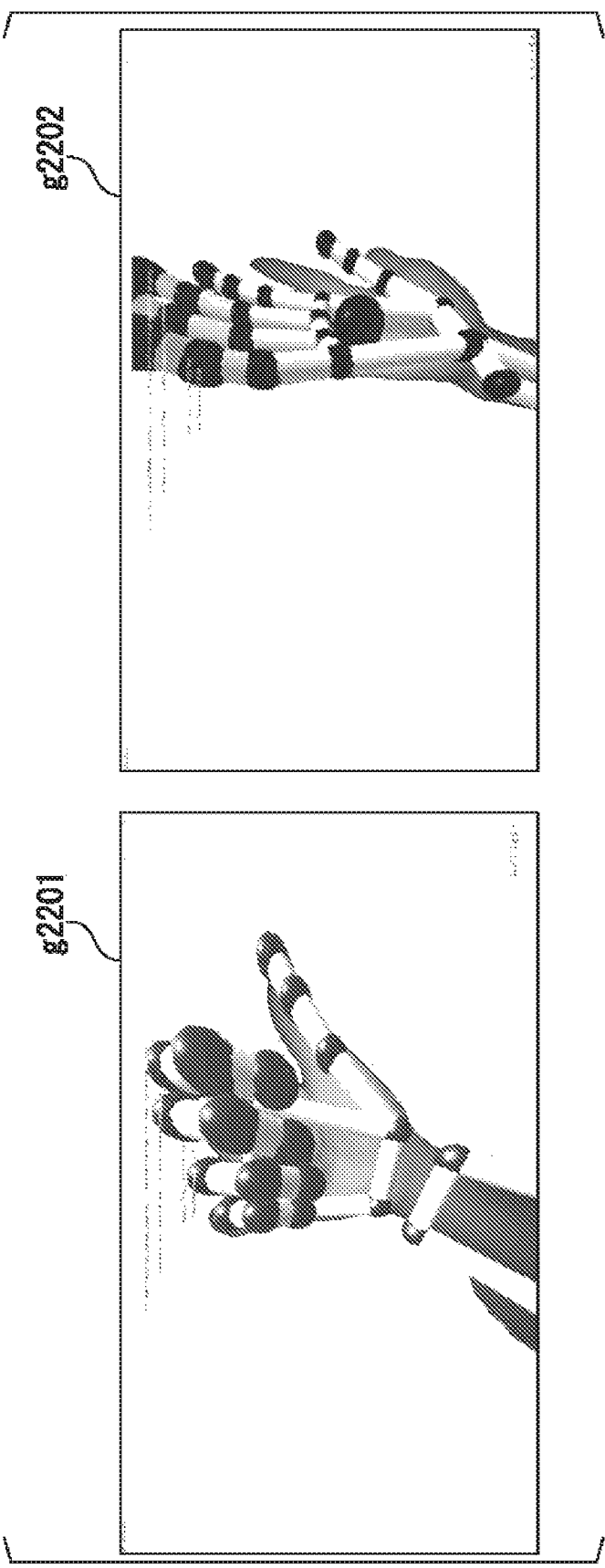
FIG. 34 is a diagram illustrating a visual display example of real-time gesture recognition.

In the experiment, "Great" is selected to provide positive feedback and "Stop" is selected to express negative feedback to the agent on the basis of a gesture recognition experiment performed in advance using the first model. FIG. 34 is a diagram illustrating a visual display example of real-time gesture recognition. Reference sign g2201 in FIG. 34 indicates an example of a "Great" gesture, and Reference sign g2202 in FIG. 34 indicates an example of a "Stop" gesture.

Next, the socket communication used in the embodiment will be described.

In the experiment, the TAMER agent was operated with a Java (registered trademark) script, and a real-time facial expression recognition module and an online gesture recognition module were implemented with Python (registered trademark). For the implementations, other programming languages or scripts may be used.

Figure 35:
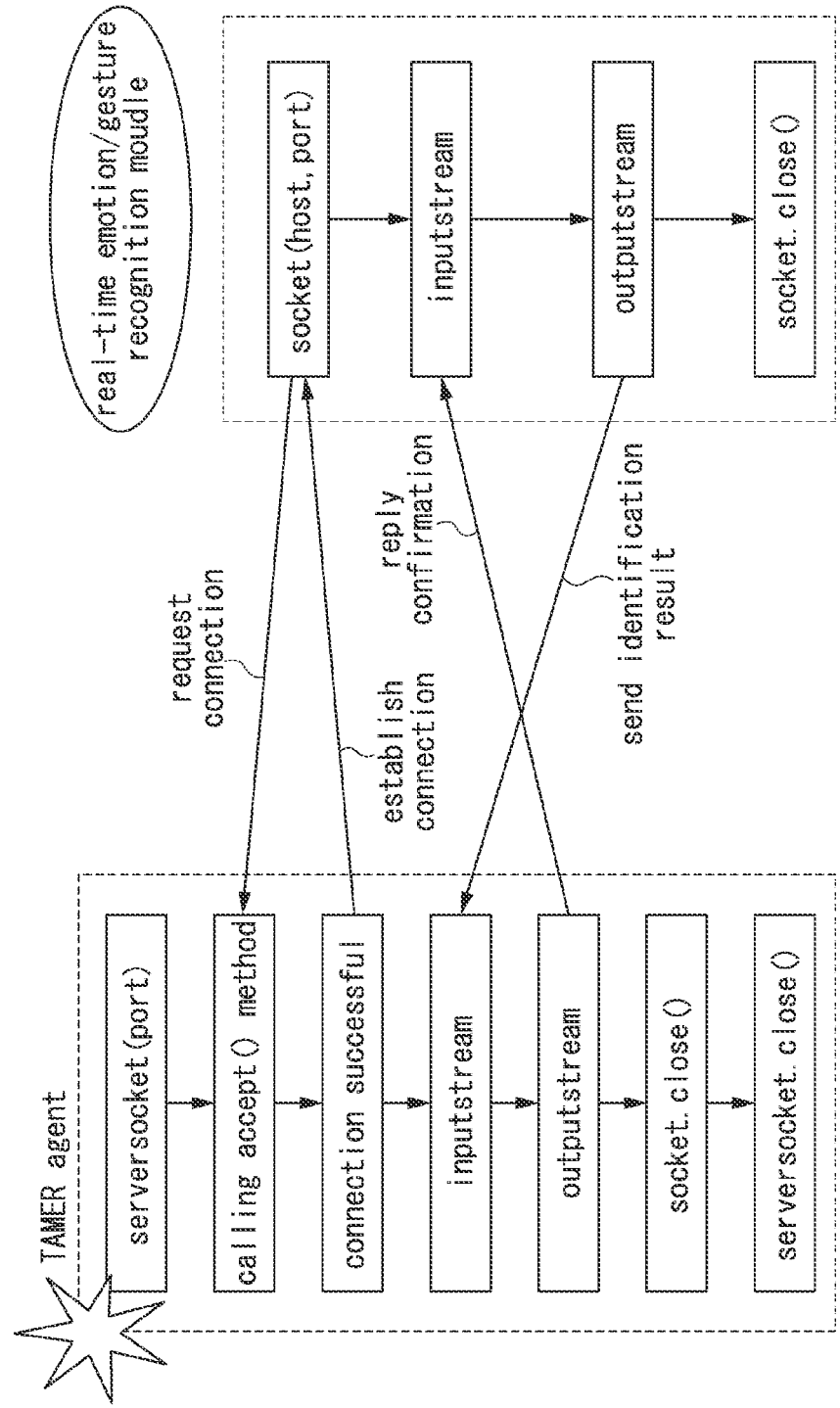
FIG. 35 is a schematic diagram of feedback signal received by a TAMER agent from a real-time emotion recognition module and real-time gesture recognition.

In the experiment, a socket method for a TCP communication mechanism illustrated in FIG. 35 was adopted in order to realize safe and highly reliable data transfer between two processes. FIG. 35 is a schematic diagram of feedback signals received by the TAMER agent from a real-time emotion recognition module and the real-time gesture recognition. An overview of the socket communication used in the experiment will be described with reference to FIG. 35.

In a process of data transmission, the agent is the server side, and a real-time recognition module is a client in communication. The client passes all recognition results to the server without delay, but the server selectively receives data. In the experiment, the server was set to receive and read data from an output stream of the client every two seconds.

Experiment

Next, an example of a result of performing an experiment using the agent of the present embodiment will be described.

In the experiment, a human (for example, a user) observes the behavior of the robot 2001 in a current environment. The user gives positive feedback when the user agrees with an operation selected by the agent of the robot 2001, and gives negative feedback when the user thinks the selected behavior does not meet an expectation. The user trained the agent by providing different facial expressions or gestures as compared to predefined keypad feedback as a reward signal.

In the experiment, the TAMER agent learned three feedbacks.

The first is a comparative example, and is a keyboard agent that performs learning using explicit feedback from the keyboard. The second is an emotional agent that performs learning using facial expression. The third is a gesture agent that uses gesture to provide feedback.

In the experiment, three agents were tested using two reinforcement learning benchmark tasks (Loop Maze and Tetris (registered trademark)). Further, in the experiment, each agent was trained 10 times for each task. Experimental result is an average value of data collected in 10 trials.

For the keyboard agent, the human observed the operation of the agent and performed feedback by pressing a designated keyboard key. In the experiment, when a v key was pressed, the reward was +1, and when an n key was pressed, the reward was −1 so that a value of the reward can be superimposed by clicking the key multiple times.

For the emotional agent, the human observed performance of the agent in first two episodes and trained to learn a first policy with feedback from the keyboard. In the experiment, feedback of facial expression is introduced into the learning model from a third episode. When the behavior selected by the agent is as expected, the human shows a smiling expression and outputs a positive feedback signal to the agent. When the behavior selected by the agent is unsatisfactory, the human output a negative feedback signal to the agent by expressing emotions such as anger, fear, and sadness. The emotional agent performs learning from the representation to further adjust an initial policy.

The gesture agent allows the human to observe a behavior of the agent and perform feedback with two types of gesture ("Great" and "Stop"). When the behavior selected by the agent is as expected, the human raised and bounced a thumb to represent "Great". When the agent thinks that the selected action is inappropriate, the human waved his or her hand, and expresses "Stop" as a negative feedback signal to the agent.

[Loop Maze]

Figure 36:
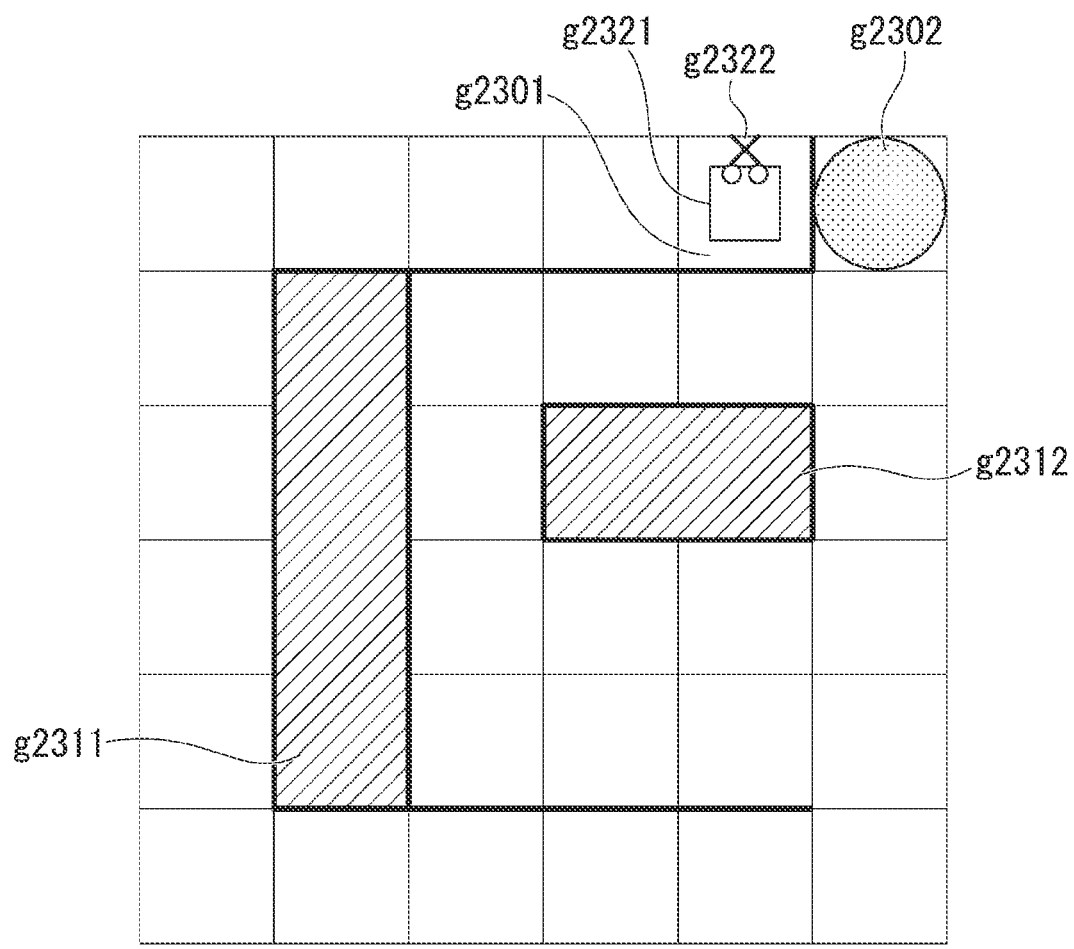
FIG. 36 is a diagram illustrating a screenshot of a Loop Maze task.

In an experiment using Loop Maze that is a maze game, a training session was stopped when the agent reached the goal 25 times (that is, 25 episodes), and a maximum training time step for each episode was set to 2000. FIG. 36 is a diagram illustrating a screenshot of a Loop Maze task. In FIG. 36, reference signs g2311 and g2312 represent walls, reference sign g2321 represents an agent, and reference sign g2322 represents a moving direction of the agent.

A Loop Maze task includes 30 states. In the task, the agent in each state can move up, down, left, and right, and when an action selected in a certain state hits the agent against a wall, no movement occurs. A goal of the agent is to learn the optimal policy leading from a starting state g2301 to a goal state g2302 as quickly as possible. The shortest path from the starting state to the goal state requires 19 actions. The behavior available to the agent in Loop Maze depends on a relative position from the goal state and the last selected action.

[Tetris]

In Tetris that is a falling object puzzle, there are $2^{200}$ states, and four adjacent blocks are selected at once to form a Tetris piece. The action set has four options: Down, Left, Right, and Rotate. When the Tetris pieces line up, blocks filling the line are automatically eliminated. In Tetris tasks, the best strategy is to line up falling blocks, constantly erases the number of lines, and finally run the game indefinitely. Therefore, when the number of lines that the agent can clear in one episode is larger within a limit, performance of a policy thereof is enhanced.

Figure 37:
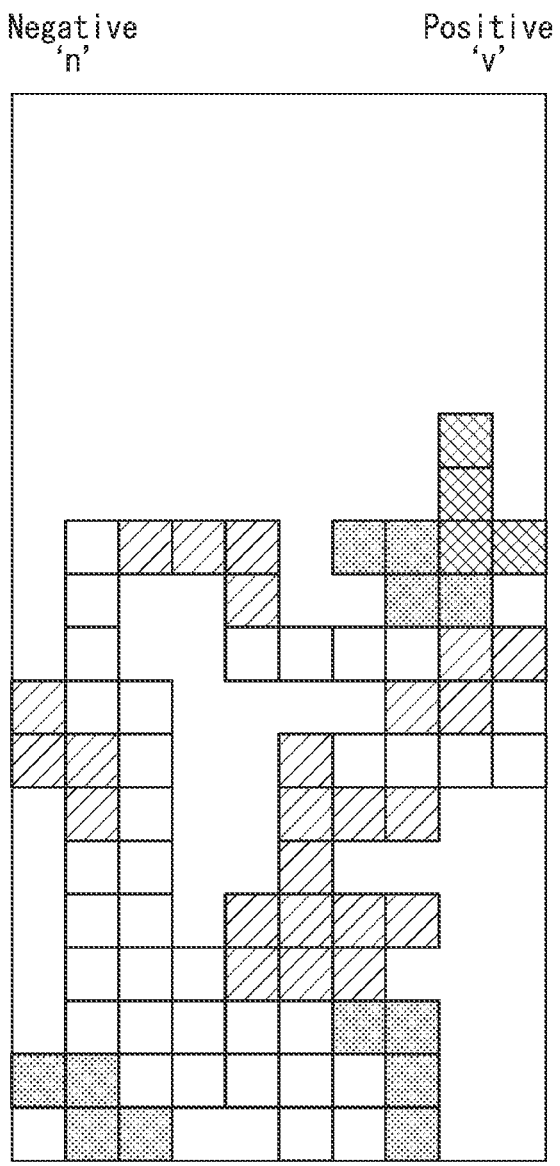
FIG. 37 is a diagram illustrating a screenshot of a Tetris task.

In an experiment using Tetris, training of 20 episodes was performed. For one episode, the upper limit number of time steps was set to 10000, and a new episode was started until one training ended. In the experiment, an average and a variance of the number of execution time steps and the total number of feedbacks in each episode were analyzed in order to compare the performance of the keyboard agent with the performance of the emotional agent. FIG. 37 is a diagram illustrating a screenshot of the Tetris task.

In the Tetris task, the human gave feedback (positive or negative) with respect to placement of Tetris pieces in a previous step while any Tetris piece was falling. Further, when the falling block completely falls, a square part becomes black, but feedback given at this time works the most effectively.

Experimental Results

First, experimental results of learning from feedback of the face and gesture feedback in both the Loop Maze task and the Tetris task will be described.

In an agent without emotional feedback, preference of the user can only be realized through a process of the reward such as pressing keyboard keys. On the other hand, according to the present embodiment, the user can express his or her emotion by simply showing a happy expression when selecting a correct behavior and a sad or angry expression when selecting an unexpected action. A satisfactory agent can be obtained just by expressing a preference with facial expressions, and cognitive burden (for example, utterance) of the user can be greatly reduced. In the experiment, an initial policy was acquired with keyboard feedback, and then expression feedback was introduced to train the agent so that the formed policy is improved and ultimately an optimal policy is acquired. The reason for this experiment was that an agent's recognition rate of facial expressions used in the experiment was 66%, and stable policies could not be learned.

In Loop Maze, learning performance of two agents (the keyboard agent and the emotional agent) is evaluated with two indexes including the number of time steps executed by the agent and the total number of feedbacks provided by the human trainer.

Figure 38:
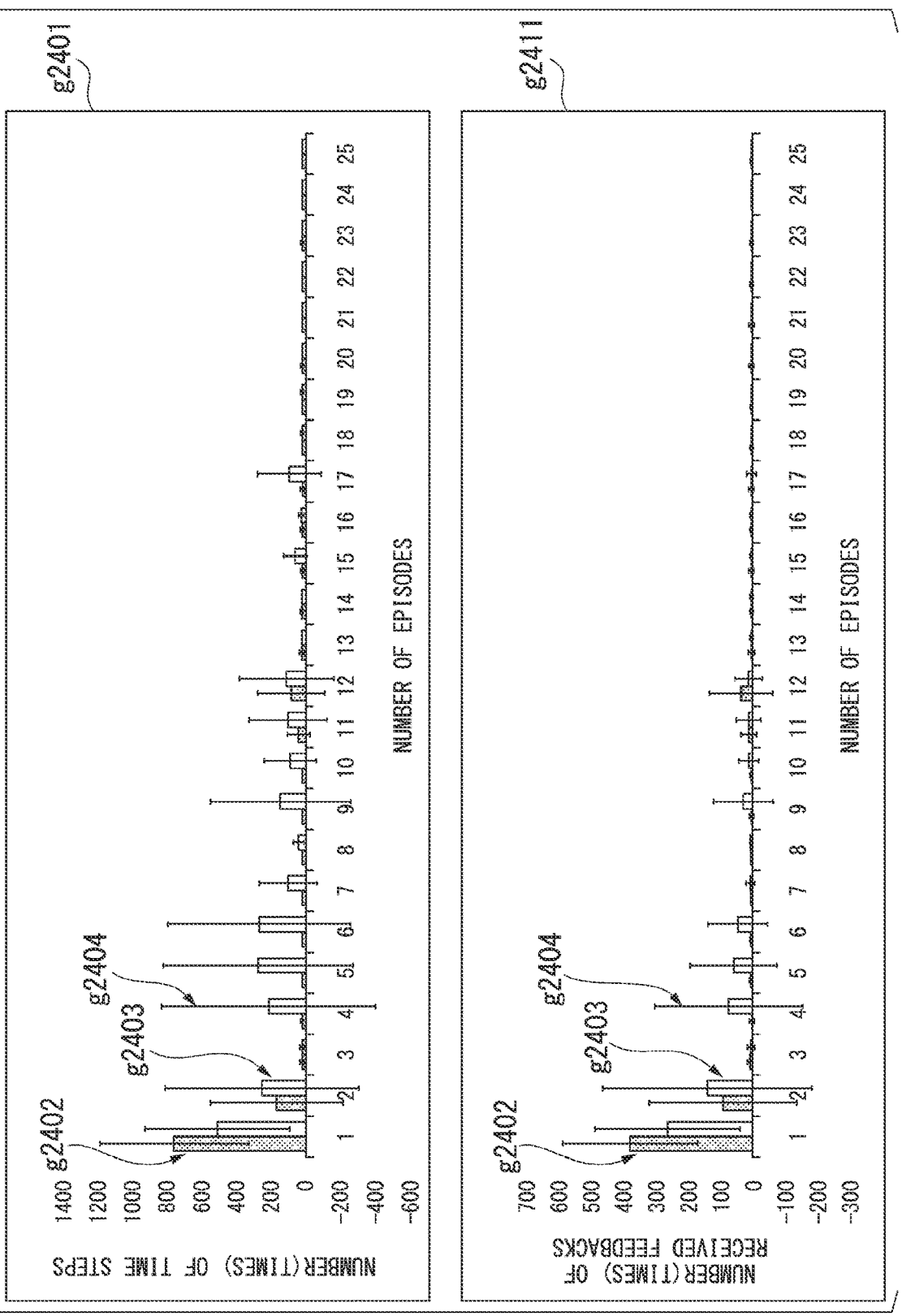
FIG. 38 is a diagram illustrating experimental results for a Loop Maze task and illustrating a total number of time steps and the number of received feedbacks in each episode by a keyboard agent and an emotional agent.

FIG. 38 is a diagram illustrating experimental results for a Loop Maze task and illustrating a total number of time steps and the number of received feedbacks in each episode by a keyboard agent and an emotional agent.

Each plot is created by averaging data obtained from ten independent executions, and each execution is configured of 25 episodes. In this experiment, the learning performance of the two agents was evaluated with two indexes including the number of time steps executed by the agent and the total number of feedbacks provided by the human trainer. For obtained results, it is desirable to gradually reduce the number of time steps from the initial state to the goal state as learning progresses, and to reduce the number of received feedbacks. When the agent is perfect, the goal state is reached in 20 time steps per episode without giving a reward generated by the human.

A graph g2401 is a diagram illustrating the total number of time steps in each episode according to the keyboard agent and the emotional agent to complete one episode of the Loop Maze task. A graph g2411 is a diagram illustrating the number of received feedbacks in each episode according to the keyboard agent and the emotional agent when navigating from the starting state to the goal state is successful. A horizontal axis of the graph g2401 and the graph g2411 indicates the number of episodes, a vertical axis in the graph of reference sign g2401 indicates the total number (times) of time steps, and a vertical axis in the graph g2411 indicates the number (times) of received feedbacks. Further, reference sign g2402 indicates the experimental result of the keyboard agent, reference sign g2403 indicates the experimental result of the emotional agent, and reference sign g2404 indicates a standard error of the average value.

As in FIG. 38, in an initial stage in which the facial expression feedback has been introduced, the number of time steps and the number of feedbacks to reach the goal state increased slightly. However, after three or four times of learning, the number of time steps and the number of feedbacks of the emotional agent basically match those of the keyboard agent, and both agents learn substantially optimal policies. As in FIG. 38, after a learning period, the emotional agent was able to learn similar or better policies to or than those for the keyboard agent.

Figure 39:
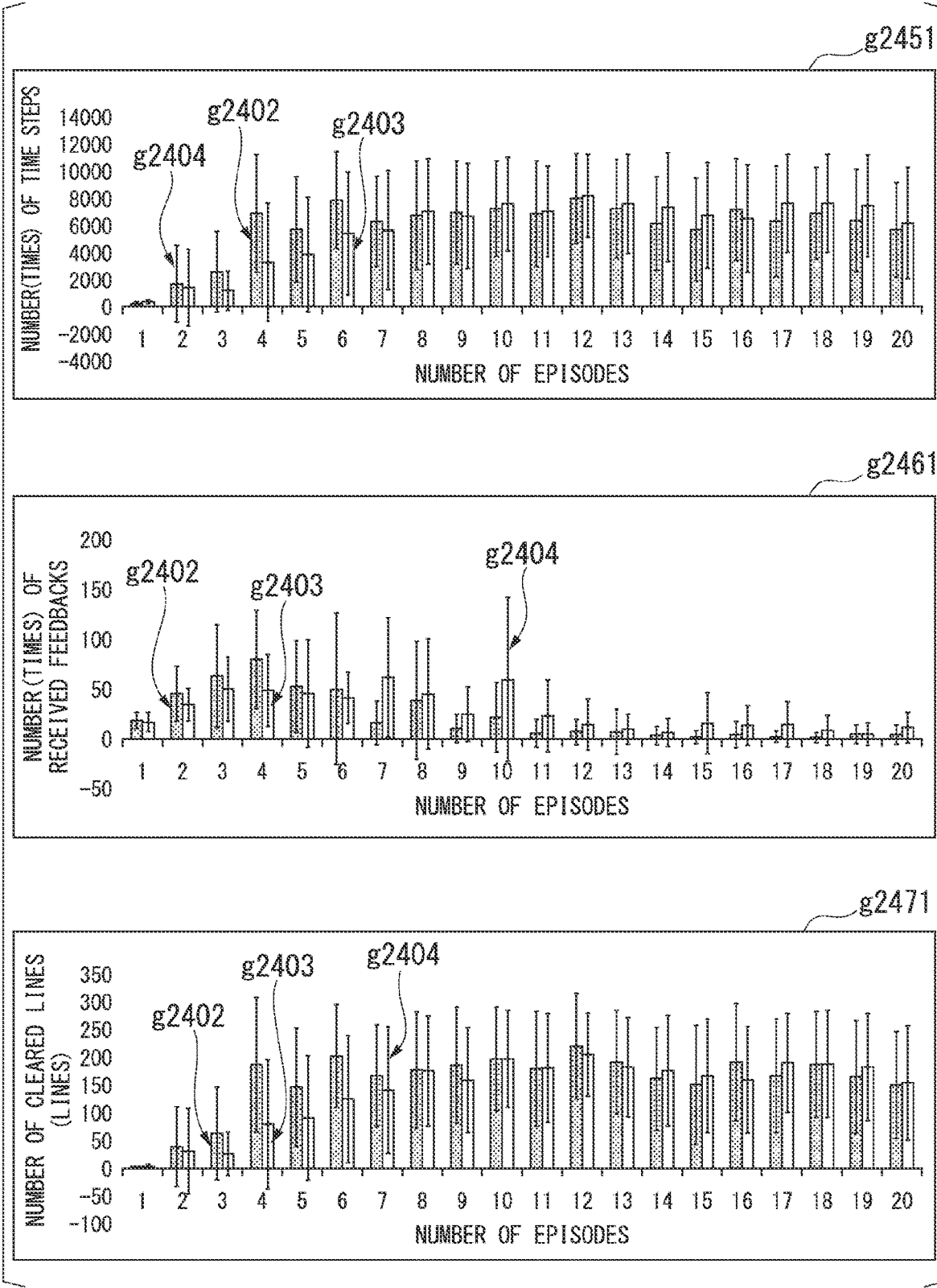
FIG. 39 is a diagram illustrating experimental results for a Tetris task and illustrating a total number of time steps, the number of received feedbacks, and the number of cleared lines according to the keyboard agent and the emotional agent.

FIG. 39 is a diagram illustrating experimental results for a Tetris task and illustrating a total number of time steps, the number of received feedbacks, and the number of cleared lines according to the keyboard agent and the emotional agent.

In the Tetris task, an agent is generated by random combinations of four small squares, and a time and probability of each combination are also uncertain. In this task, when the agent is more excellent, an execution time becomes longer and more states or action can be experienced. Under human training, the agent eventually can learn eliminating an entire line of Tetris pieces and continue playing the game. Therefore, a gradual increase in the number of time steps and the number of Tetris eliminated lines with a required decrease in human feedback is expected for this task. Further, in the experiment, training of the agent was performed with keyboard feedback according to the first two episodes, and feedback of a face was introduced in the third episode, and training of a total of 20 episodes was performed. In the experiment, the learning performance of the two agents (the keyboard agent and the emotional agent) is evaluated using three indexes. The three evaluations are the number of steps in an execution time of the agent, the number of received feedbacks, and the number of lines of Tetris eliminated in the episode.

A graph g2451 is a diagram illustrating the number of time steps in each episode according to the keyboard agent and the emotional agent in each episode of the experiment. A graph g2461 is a diagram illustrating the number of received feedbacks in each episode according to the keyboard agent and the emotional agent in each episode of the experiment. A graph g2471 is a diagram illustrating the number of cleared lines in each episode according to the keyboard agent and the emotional agent in each episode of the experiment.

A horizontal axis in the graphs of reference signs g2451, g2461, and g2471 indicates the number of episodes, a vertical axis of the graph of reference sign g2451 indicates the number (times) of time steps, a vertical axis of the graph of reference sign g2461 indicates the number (times) of received feedbacks, and a vertical axis in the graph of reference sign g2471 is the number of cleared lines (lines).

As illustrated in FIG. 39, in the first two episodes, the number of time steps, the number of received feedbacks, and the number of cleared lines were substantially the same between the emotional agent and the keyboard agent, and a reasonable policy in which tens of lines can be cleared in the game was acquired. After seven episodes after four episodes of training, the number of time steps and the number of cleared lines according to the emotional agent were equal to those of the keyboard agent, although the number of feedbacks was slightly increased.

Next, learning performance of the keyboard agent and learning performance of the gesture agent were compared with each other in a Loop Maze task and a Tetris task.

Figure 40:
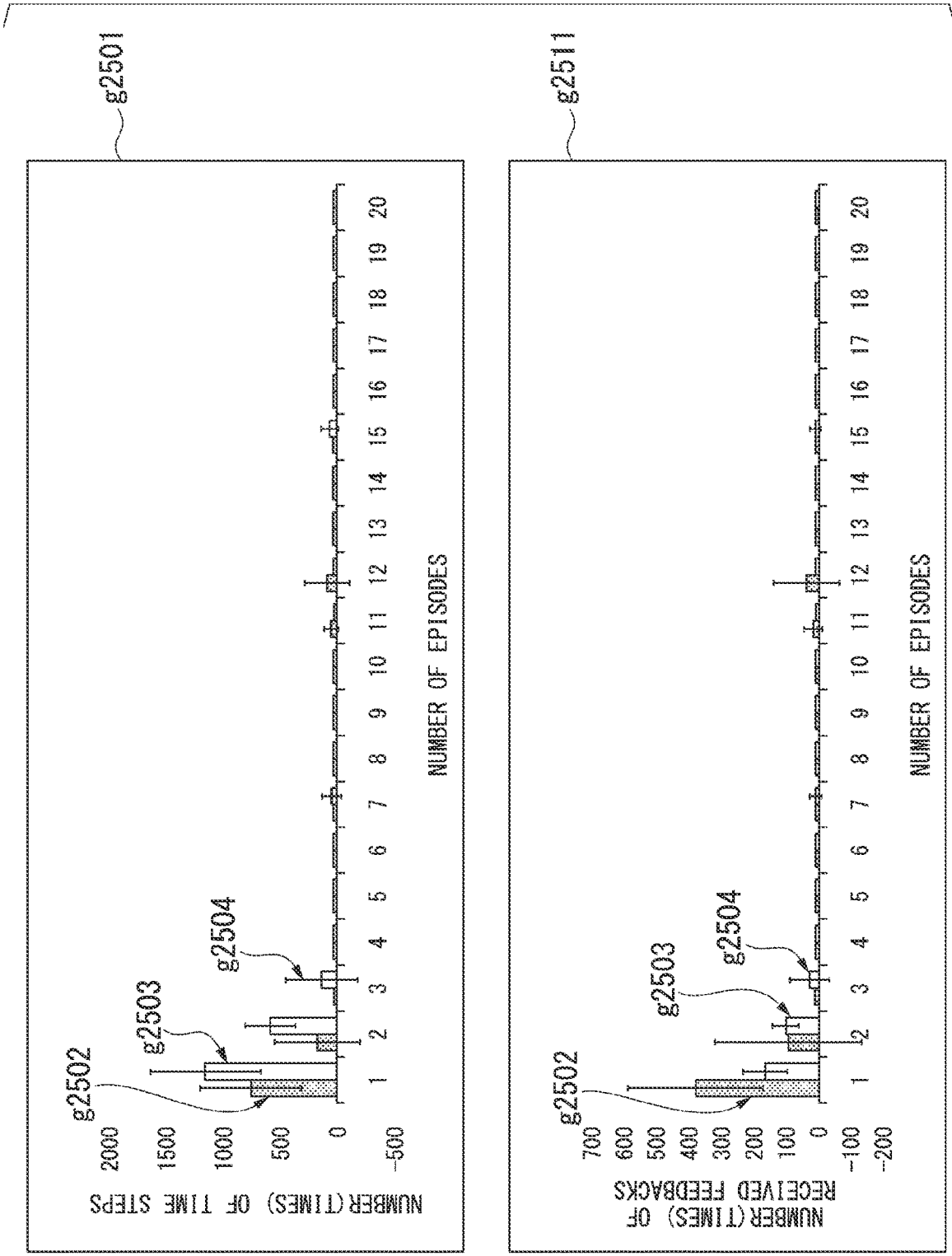
FIG. 40 is a diagram illustrating experimental results for a Loop Maze task and illustrating the number of time steps and the number of received feedbacks in each episode according to the keyboard agent and the gesture agent.

FIG. 40 is a diagram illustrating experimental results for a Loop Maze task and illustrating the number of time steps and the number of received feedbacks in each episode according to the keyboard agent and the gesture agent.

A graph g2501 is a diagram illustrating the number of time steps in each episode according to the keyboard agent and the gesture agent to end one episode of the Loop Maze task. A graph g2511 is a diagram illustrating the number of received feedbacks in each episode according to the keyboard agent and the gesture agent in each episode. In the graphs g2501 and g2511, a horizontal axis indicates the number (times) of episodes, a vertical axis in the graph g2501 indicates the number (times) of time steps, and a vertical axis in the graph g2511 indicates the number (times) of received feedbacks. Further, a reference sign g2502 indicates the experimental result of the keyboard agent, reference sign g2503 indicates the experimental result of the gesture agent, and reference sign g2504 indicates a standard error of the average value.

In this experiment, 10 rounds of independent experiments were performed, and 20 episodes were executed in each round. In the Loop Maze task, the number of time steps and the total number of feedbacks provided by human user are indexes of performance of the agent, similar to the learning from the feedback of the face. Due to gesture feedback, the number of feedbacks received by the agent at the time of training is expected to be reduced.

As illustrated in FIG. 40, in first three episodes, gesture agent needs to experience more time steps than the keyboard agent. However, the gesture agent receives a much smaller number of feedbacks than the keyboard agent. After three times of episodes training, both agents acquired the best policy.

Next, in the Tetris task, the learning performance of the gesture agent and the learning performance of the keyboard agent in the Tetris task were compared with each other. Here, learning performance of two agents was evaluated with the same three indexes as the learning from feedback of the face, that is, the number of steps in an execution time of the agent, the number of received feedbacks, and the number of lines of Tetris eliminated in the episode.

Figure 41:
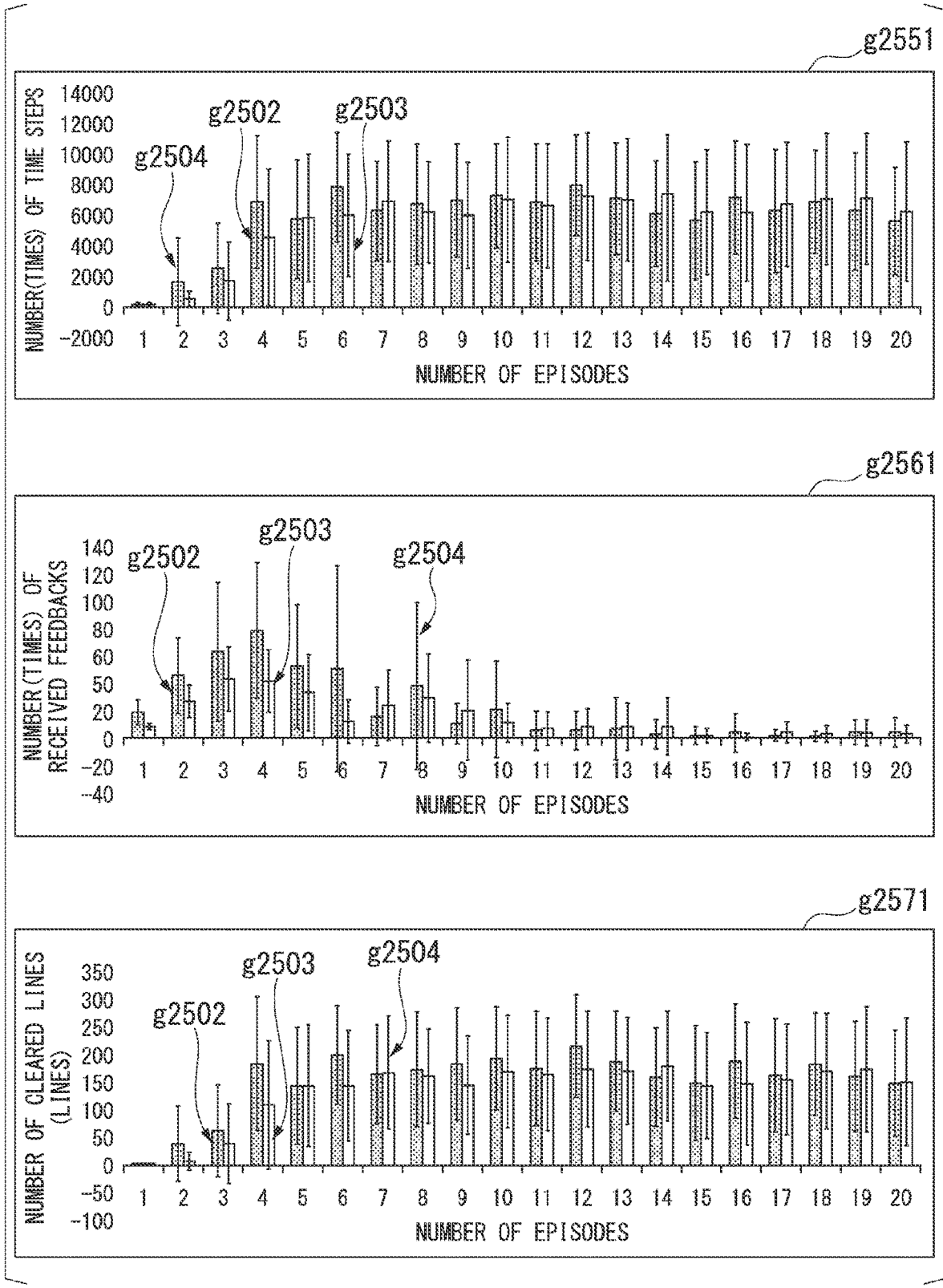
FIG. 41 is a diagram illustrating experimental results for the Tetris task and illustrating the number of time steps, the number of received feedbacks, and the number of cleared lines according to the keyboard agent and the gesture agent.

FIG. 41 is a diagram illustrating experimental results for the Tetris task and illustrating the number of time steps, the number of received feedbacks, and the number of cleared lines according to the keyboard agent and the gesture agent. In the experiment, ten independent rounds were repeated, 20 episodes were executed in each round, and performance of each episode measured with the number of time steps, the number of total received feedbacks, and the number of eliminated lines of Tetris was averaged.

A graph g2551 is a diagram illustrating the number of time steps according to the keyboard agent and the gesture agent in each episode of the Tetris task. A graph g2561 is a diagram illustrating the number of received feedbacks in each episode according to the keyboard agent and the gesture agent in each episode. A graph g2571 is a diagram illustrating the number of cleared lines in each episode according to the keyboard agent and the gesture agent in each episode.

A horizontal axis in the graphs of reference signs g2551, g2561 and g2571 indicates the number of episodes, a vertical axis in the graph of reference sign g2551 is the number (times) of time steps, a vertical axis in the graph of reference sign g2561 is the number (times) of received feedbacks, and a vertical axis in the graph of reference sign g2571 is the number of cleared lines (lines).

As in FIG. 41, in the first four episodes, the gesture agent took slightly less time steps and slightly fewer cleared lines in each episode, with much less received gesture feedbacks than the keyboard agent. Thereafter, the gesture agent has less received feedbacks than the keyboard agent. After nine episodes, the learning performance of both agents was fairly close, and the number of feedbacks required to adjust the learned policy was similar.

Consequently, even without a predefined keystroke, the agent can well understand human intentions from gestures, perform learning from a limited or smaller number of feedbacks, and accurately capture information. In other words, according to the experiment using the present embodiment, it was confirmed that it is possible to effectively improve learning efficiency of the agent with low feedback of the human (with sufficient recognition accuracy) by using social signals of the human. The agent performing the learning from the gesture feedback as shown in the experimental result can obtain performance similar to that of an agent learning from feedback of a keyboard with a much smaller number of received feedbacks. Further, it is shown that it is possible to obtain the same performance in a case in which learning from the feedback of the face is performed, and as in a case in which learning from the feedback of the keyboard is performed, as shown in the experimental result.

Further, from the above experimental results, learning efficiency of the agent with less feedbacks of the human (with sufficient recognition accuracy) is effectively improved by using social signals (for example, facial expressions and gestures) of the human. Accordingly, the user does not need to learn a learning method in advance, and it is possible to reduce a cognitive burden or work load of the user. Accordingly, according to the present embodiment, because it is not necessary for the human to learn a training method in advance, it is possible to provide a natural method in which general people cause the agent to train a task execution method according to their preferences.

Further, in the above-described experimental results, an example in which the emotional agent and the gesture agent are used as examples of the agent has been described, but the present invention is not limited thereto. For the agents, social signals of other humans may be used. The agent may be, for example, a voice emotional agent using voice emotion.

As described above, in the present embodiment, the robot performs learning from the demonstration of the human through IRL and then performs learning from a human reward through TAMER. This IRL-TAMER consists of the following two algorithms executed in the order of I and II. I. IRL learns the reward function from demonstration provided by the human trainer, II. TAMER learns a prediction reward model from evaluation feedback of the human.

The feedback by the demonstration of the human is, for example, perception of facial expression of the human from images, and perception of the gesture of the human.

Accordingly, according to the present embodiment, it is possible for the robot to autonomously perform behavior learning from both demonstration and evaluation feedback provided by the human (for example, the user and the trainee).

As a result, according to the present embodiment, it is possible to enable the robot to perform learning from the demonstration and the evaluation feedback provided by the human, and to reduce the number of evaluations of the human required to obtain an optimal operation and, particularly, the number of mistakes (unexpected behaviors).

Although the robot 2001 has been described as an example in the embodiment, the agent and the like can also be applied to other devices such as an in-vehicle navigation device, a smartphone, or a tablet terminal. For example, when the agent is applied to the smartphone, a still image of the robot 2001 as illustrated in FIG. 26 may be displayed on the display unit of the smartphone. Alternatively, the gesture of the robot 2001 may be displayed as an animation on the display unit of the smartphone.

A program for realizing all or some of the functions of the social ability generation device 100, the generation device 1013, and the behavior control device 2100 in the present invention is recorded on a computer-readable recording medium, and the program recorded on this recording medium is loaded into the computer system and executed so that all or some of processing performed by the social ability generation device 100, the generation device 1013, and the behavior control device 2100 may be performed. The "computer system" described herein includes an OS or hardware such as a peripheral device. Further, the "computer system" also includes a WWW system including a homepage providing environment (or display environment). Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include a recording medium that holds a program for a certain period of time, such as a volatile memory (RAM) inside a computer system including a server and a client when the program is transmitted over a network such as the Internet or a communication line such as a telephone line.

Further, the program may be transmitted from a computer system in which the program is stored in a storage device or the like to another computer system via a transmission medium or by transmission waves in the transmission medium. Here, the "transmission medium" for transmitting the program refers to a medium having a function of transmitting information such as a network (a communication network) such as the Internet or a communication line such as a telephone line. Further, the program may be a program for realizing some of the above-described functions. Further, the program may be a so-called difference file (difference program) that can realize the above-described functions in combination with a program already recorded in a computer system.

Although a mode for carrying out the present invention has been described above using the embodiment, the present invention is not limited to the embodiment at all, and various modifications and substitutions can be made without departing from the gist of the present invention.

REFERENCE SIGNS LIST

1 Communication robot
101 Reception unit
102 Imaging unit
103 Sound pickup unit
104 Sensor
100 Social ability generation device
106 Storage unit
107 First database
109 Second database
111 Display unit
112 Speaker
113 Actuator
114 Transmission unit
105 Perception unit
108 Learning unit
110 Operation generation unit 1101 Image generation unit
1102 Audio generation unit
1103 Drive unit
1104 Transmission information generation unit
1001 Robot
1011 Acquisition unit
1012 Sensor
1013 Generation device
1014 Conversion unit
1015 Storage unit
1016 Operation generation unit
1017 Display unit
1018 Actuator
1019 Speaker
1020, 1020a, 1020b Imaging unit
1021 Sound pickup unit
1022 Audio processing unit
1023 Image processing unit
1141 Operation conversion unit
1142 File generation unit
1161 Image generation unit
1162 Drive unit
1163 Audio generation unit
1611 First image generation unit
1612 Second image generation unit
1621 First drive unit
1622 Second drive unit
1623 Third drive unit
1624 Fourth drive unit
1171, 1171a, 1171b First display unit
1172 Second display unit
1181 First actuator
1182 Second actuator
1183 Third actuator
1184 Fourth actuator
1120 Base
1121 Housing
1122 Boom
1123 Horizontal bar
1191, 1192, 1193, 1194a, 1194b Movable portion
2001 Robot
2101 Operation unit
2102 Imaging unit
2103 Sensor
2104 Sound pickup unit
2100 Behavior control device
2106 Storage unit
2107 Database
2111 Display unit
2112 Speaker
2113 Actuator
2115 Robot sensor
2105 Perception unit
2300 Agent
2301 Learning unit
2302 Reward learning management unit
2303 Allocation evaluation unit
2304 Behavior selection unit
3041 Image generation unit
3042 Audio generation unit
3043 Drive unit
3044 Output unit
2211 IRL algorithm

What is claimed is:

1. A social ability generation device comprising:
a perception unit configured to acquire person information on a person, extract feature information on the person from the acquired person information, perceive an action that occurs between a communication device performing communication and the person, and perceive an action that occurs between people;
a learning unit configured to multimodally learn an emotional interaction of the person using the extracted feature information on the person; and
an operation generation unit configured to generate a behavior on the basis of the learned emotional interaction information of the person,
wherein the learning unit
performs learning using an implicit reward and an explicit reward,
generates an implicit reaction system using the implicit reward and a social model,
generates an explicit reaction system using the explicit reward according to a social structure or social norm while evaluating the action of the communication device, and
performs an output incorporating at least one of the social model and a social structure concept by using the implicit reaction system and the explicit reaction system at a time of operating,
the implicit reward is a multimodally learned reward using the feature information on the person, and
the explicit reward is a reward based on a result of evaluating a behavior of the communication device with respect to the person generated by the operation generation unit.

2. The social ability generation device according to claim 1, further comprising:
a sound pickup unit configured to pick up an acoustic signal; and
an imaging unit configured to capture an image including a user,
wherein the perception unit performs speech recognition processing on the picked-up acoustic signal to extract feature information on voice, and performs image processing on the captured image to extract feature information on a human behavior included in the image,
the feature information on the person includes the feature information on a voice and the feature information on the human behavior,
the feature information on a voice is at least one of an audio signal, information on volume of sound, information on intonation of the sound, and a meaning of utterance, and
the feature information regarding a human behavior is at least one of facial expression information of the person, information on a gesture performed by the person, head posture information of the person, face direction information of the person, line-of-sight information of the person, and a distance between people.

3. The social ability generation device according to claim 1, wherein the learning unit performs learning using social norms, social components, psychological knowledge, and humanistic knowledge.

4. A social ability generation method comprising:
acquiring, by a perception unit, person information on a person, extracting feature information on the person from the acquired person information, perceiving an action that occurs between a communication device performing communication and the person, and perceiving an action that occurs between people;
multimodally learning, by a learning unit, an emotional interaction of the person using the extracted feature information on the person;

generating, by an operation generation unit, a behavior on the basis of the learned emotional interaction information of the person;

performing, by the learning unit, learning using an implicit reward and an explicit reward;

generating, by the learning unit, an implicit reaction system using the implicit reward and a social model, generating, by the learning unit, an explicit reaction system using the explicit reward according to a social structure or social norm while evaluating the action of the communication device, and performing, by the learning unit, an output incorporating at least one of the social model and a social structure concept by using the implicit reaction system and the explicit reaction system at a time of operating, the implicit reward is a multimodally learned reward using the feature information on the person, and the explicit reward is a reward based on a result of evaluating a behavior of the communication device with respect to the person generated by the operation generation unit.

5. A communication robot comprising:

a perception unit configured to acquire person information on a person, extract feature information on the person from the acquired person information, perceive an action that occurs between a communication device performing communication and the person, and perceive an action that occurs between people;

a learning unit configured to multimodally learn an emotional interaction of the person using the extracted feature information on the person; and an operation generation unit configured to generate a behavior on the basis of the learned emotional interaction information of the person, wherein the learning unit performs learning using an implicit reward and an explicit reward, generates an implicit reaction system using the implicit reward and a social model, generates an explicit reaction system using the explicit reward according to a social structure or social norm while evaluating the action of the communication device, and performs an output incorporating at least one of the social model and a social structure concept by using the implicit reaction system and the explicit reaction system at a time of operating, the implicit reward is a multimodally learned reward using the feature information on the person, and the explicit reward is a reward based on a result of evaluating a behavior of the communication device with respect to the person generated by the operation generation unit.

6. The communication robot according to claim 5, further comprising:

a display unit, wherein the operation generation unit generates an image that maintains a relationship with the person as a good relationship by causing the person to perform a behavior for maximizing positive emotion, and displays the generated image on the display unit.

* * * * *